(12) United States Patent
LaValley et al.

(10) Patent No.: US 11,236,558 B2
(45) Date of Patent: Feb. 1, 2022

(54) ATTACHMENT FOR MAKING UP OR BREAKING OUT PIPE

(71) Applicant: LAVALLEY INDUSTRIES, LLC., Bemidji, MN (US)

(72) Inventors: Jason LaValley, Bemidji, MN (US); Craig Larson, Lake George, MN (US); Matt Michel, Oakdale, MN (US); Rod Wurgler, York, ND (US); John Busuttil, Kirkland, WA (US)

(73) Assignee: LAVALLEY INDUSTRIES, LLC, Bemidji, MN (US)

( * ) Notice: Subject to any disclaimer, the term of this patent is extended or adjusted under 35 U.S.C. 154(b) by 1545 days.

(21) Appl. No.: 14/938,402

(22) Filed: Nov. 11, 2015

(65) Prior Publication Data

US 2016/0160588 A1    Jun. 9, 2016

Related U.S. Application Data

(60) Provisional application No. 62/079,235, filed on Nov. 13, 2014.

(51) Int. Cl.
*E21B 19/16* (2006.01)
*E02F 3/413* (2006.01)
(Continued)

(52) U.S. Cl.
CPC ............ *E21B 19/163* (2013.01); *B66C 1/427* (2013.01); *E02F 3/4135* (2013.01); *E02F 3/965* (2013.01);
(Continued)

(58) Field of Classification Search
CPC ...... E21B 19/16; E21B 19/168; E21B 19/161; E21B 9/163; E21B 9/164
See application file for complete search history.

(56) References Cited

U.S. PATENT DOCUMENTS 4,030,542 A    6/1977  Poe et al.
4,034,623 A  * 7/1977  Boone .................. A01B 73/065
                                        172/240

(Continued)

FOREIGN PATENT DOCUMENTS

CN    103277056 A    9/2013
CN    103702920 A    4/2014
(Continued)

OTHER PUBLICATIONS

International Search Report and Written Opinion issued in the corresponding International PCT application No. PCT/US2015/060132, dated Jan. 29, 2016, 15 pages.

(Continued)

*Primary Examiner* — Bryan R Muller
(74) *Attorney, Agent, or Firm* — Hamre, Schumann, Mueller & Larson, P.C.

(57) ABSTRACT

An attachment that is configured for attachment to an arm of a piece of heavy construction equipment. The attachment is configured to rotate a section of pipe during break-out (i.e. disconnection or disassembly) from another section of pipe and/or make-up (i.e. connection or assembly) with another section of pipe. The attachment is configured to break the joint or torque the joint, unthread or thread pipe, and lift the pipe under the power of the heavy construction equipment.

14 Claims, 49 Drawing Sheets

(51) Int. Cl.
  *E02F 3/96* (2006.01)
  *B66C 1/42* (2006.01)
  *F16L 1/06* (2006.01)
  *F16L 1/09* (2006.01)
  *F16L 1/10* (2006.01)

(52) U.S. Cl.
  CPC .......... *E21B 19/161* (2013.01); *E21B 19/164* (2013.01); *F16L 1/065* (2013.01); *F16L 1/09* (2013.01); *F16L 1/10* (2013.01)

(56) References Cited

U.S. PATENT DOCUMENTS

| | | | | |
|---|---|---|---|---|
| 4,271,711 | A * | 6/1981 | Vavra | A01B 73/04 |
| | | | | 172/311 |
| 6,505,531 | B2 * | 1/2003 | Stogner | E21B 19/18 |
| | | | | 81/57.16 |
| 7,849,929 | B2 * | 12/2010 | Littlely | E21B 19/168 |
| | | | | 166/380 |
| 8,235,104 | B1 * | 8/2012 | Sigmar | E21B 19/164 |
| | | | | 166/380 |
| 8,490,519 | B2 * | 7/2013 | Lavalley | E02F 3/965 |
| | | | | 81/57.15 |
| 8,550,174 | B1 * | 10/2013 | Orgeron | E21B 19/24 |
| | | | | 166/380 |
| 9,702,207 | B2 * | 7/2017 | Randall, Jr. | E21B 19/16 |
| 2009/0057019 | A1 | 3/2009 | LaValley et al. | |
| 2010/0180475 | A1 | 7/2010 | Ellett | |
| 2010/0308609 | A1 | 12/2010 | LaValley et al. | |
| 2013/0283589 | A1 | 10/2013 | LaValley et al. | |
| 2014/0042207 | A1 | 2/2014 | LaValley et al. | |
| 2014/0151124 | A1 | 6/2014 | Randall et al. | |
| 2014/0259597 | A1 | 9/2014 | LaValley et al. | |

FOREIGN PATENT DOCUMENTS

| | | |
|---|---|---|
| WO | 2011156099 | 12/2011 |
| WO | 2013159187 A1 | 10/2013 |

OTHER PUBLICATIONS

American Augers "Exit Side Wrench-Mid-Size", You Tube, Jul. 6, 2014, XP054978100, Retrieved from the Internet: URL:https://www.youtube.com/watch?v=1HulKZZU_al.

LaValley: "TONGHAND Video", You Tube, Jul. 2, 2015, XP054978099, Retrieved from the Internet: URL: https://www.youtube.com/watch?v=05IQA6oCjco.

The extended European Search Report issued in EP15859878.9 dated Feb. 26, 2018, 11 pages.

* cited by examiner

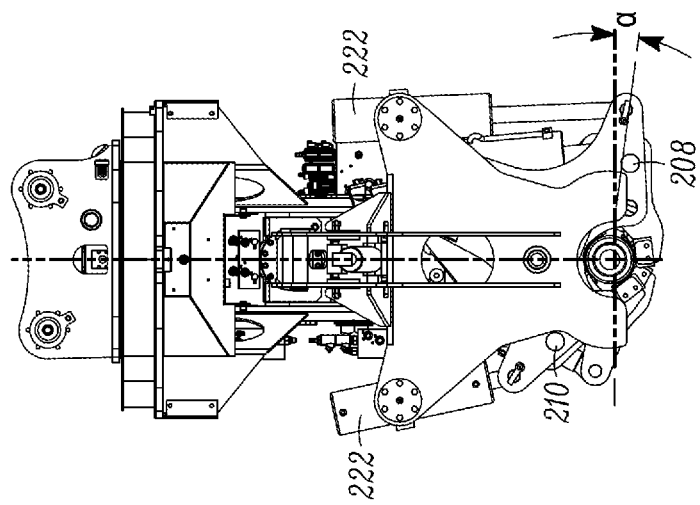
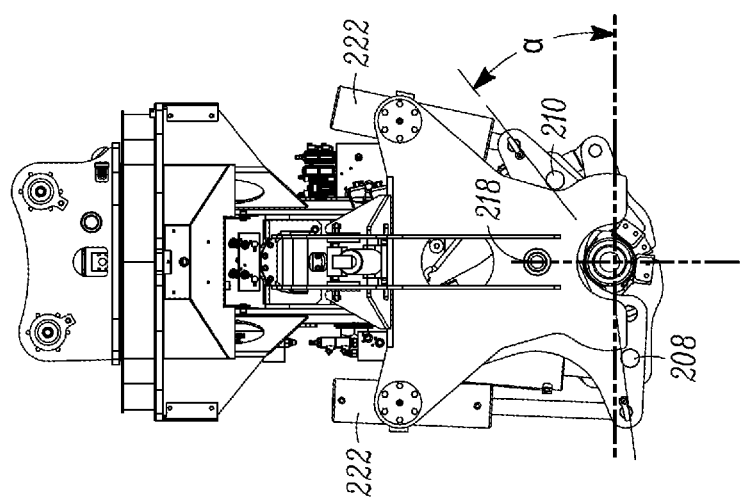

ATTACHMENT FOR MAKING UP OR BREAKING OUT PIPE

FIELD

This disclosure relates to a pipe handling attachment that is attachable to the end of an arm of a prime mover, for example an excavator, crane, knuckle boom loader, trackhoe, backhoe, or other piece of heavy construction equipment for use in making up or breaking out pipe during assembly or disassembly of pipe.

BACKGROUND

When making up (i.e. connecting) or breaking out (i.e. disconnecting) drill pipe, casing, tubing, or other pipe, tongs are used. Manual tongs, which are effectively large wrenches, are known for manually turning the pipe during make-up or break-out of pipe. Power tongs or power wrenches are also known that are pneumatically or hydraulically operated tools that operate to rotate the pipe during make-up or break-out.

Examples of attachments that are attachable to a prime mover for making up and breaking up pipe are described in U.S. Pat. No. 8,490,519 and US Publication No. 2014/0151124.

SUMMARY

A pipe handling attachment is described that is configured for attachment to an arm of a piece of heavy construction equipment, i.e. a prime mover, for example an excavator, crane, knuckle boom loader, a trackhoe, backhoe or the like. The attachment is configured to rotate a section of pipe during break-out (i.e. disconnection or disassembly) from another section of pipe and/or make-up (i.e. connection or assembly) with another section of pipe.

In one embodiment, the pipe handling attachment includes at least one pipe roller gripping assembly, and in another embodiment includes two or more pipe roller gripping assemblies. The pipe roller gripping assembly is configured to grip a pipe and rotate the pipe about a longitudinal axis of the pipe. The pipe roller gripping assembly is movable in any suitable manner, for example by pivoting, between a lowered position and a raised position. This permits the pipe roller gripping assembly to be moved out of the way during certain pipe handling operations. For example, when making up or breaking out a pipe accessory such as a reamer/hole opener, a crossover sub/thread adaptor, or a section of pipe containing a valve, the pipe roller gripping assembly can be moved out of the way to avoid interference with the pipe accessory while a vise assembly of the attachment is used to make-up or break-out the pipe accessory and an adjoining section of pipe. The lowered position of the pipe roller gripping assembly may also be referred to as a use position or as a retracted position. The raised position of the pipe roller gripping assembly may also be referred to as a non-use position or as an extended position.

As used throughout this description and claims, the word pipe, unless otherwise specified, is intended to encompass drill pipe, casing, tubing, or other pipe designed to be connected by threads with other sections of pipe. The pipe is hollow. The pipe can be made of any type of material including, but not limited to, metal or plastic. The word pipe also encompasses pipe accessories including, but not limited to, a reamer/hole opener, a crossover sub/thread adaptor, a valve, or any other accessory that is connected by threads to a section of pipe.

In addition, the pipes are described herein as having tool joints which are defined as enlarged and threaded ends of joints of drill pipe. However, the attachment can be used with pipe other than drill pipe, as long as the pipe is designed to connect to a section of pipe via rotation of the pipe.

As used herein, connecting/disconnecting one pipe section to/from another pipe section includes connecting/disconnecting a single pipe section or multiple pipe sections. For example, two or more pipe sections could be simultaneously connected to or disconnected from the end of a pipe string.

In one embodiment, the described attachment is configured to perform at least three primary functions. During a make-up operation where a first section of pipe is to be connected to a second section of pipe, the attachment can pick up the first section of pipe, position the first section of pipe relative to the second section of pipe for connection, rotate the first section of pipe relative to the second section of pipe to thread the pipe sections together, and then torque the joint between the pipe sections to complete the connection. During a break-out operation where a first section of pipe is to be disconnected from a second section of pipe, similar functions are performed but in reverse order. That is, during break-out, the attachment is configured to break the joint between the two pipe sections, rotate the first pipe section relative to the second pipe section to unscrew the first pipe section from the second pipe section, and lift the now disconnected first pipe section and place the first pipe section in another location, for example in a pipe stack on the ground or on a trailer.

Two of these functions involve rotation of the pipe by the attachment, one rotation occurring to initiate pipe break-out to begin disconnection of the pipe sections or to torque the joint to complete connection, and the other rotation occurring to unscrew the first pipe section from the second pipe section or to thread the first pipe section into the second pipe section. Therefore, it is to be understood that, unless otherwise noted, reference to rotation of the pipe section by the attachment encompasses either or both of the pipe break/joint torquing rotation and the pipe section unscrewing/screwing rotation.

It is also to be understood that, unless otherwise noted, reference to rotation of the pipe section by the attachment encompasses either or both of rotation during break-out and during make-up.

In one embodiment, a pipe handling attachment configured for attachment to a prime mover includes a head assembly that is configured to be attached to an arm of the prime mover, a main beam assembly pivotally mounted to the head assembly so that the main beam assembly is pivotable about a first pivot axis, at least one tilt actuator connected to the head assembly and to the main beam assembly to pivot the main beam assembly about the first pivot axis, and a vise assembly mounted on the main beam assembly. The vise assembly includes a stationary vise and a make/break vise that is rotatable relative to the stationary vise. In addition, at least one, for example two, pipe roller gripping assemblies are mounted on the main beam assembly. The pipe roller gripping assemblies are configured to grip a pipe and rotate a pipe gripped by the at least two pipe roller gripping assemblies about a longitudinal axis of the pipe. Each of the pipe roller gripping assemblies is movable relative to the vise assembly and the main beam assembly between a lowered position and a raised position, where at the lowered position each of the pipe roller gripping assemblies is disposed on one side of the first pivot axis and at the raised position each of the pipe roller gripping assemblies is disposed on an opposite side of the first pivot axis.

In another embodiment, a pipe handling attachment configured for attachment to a prime mover includes an upper head assembly that is configured to be attached to an arm of the prime mover, a lower head assembly rotationally attached to the upper head assembly to permit the lower head assembly to rotate relative to the upper head assembly about a rotation axis, a main beam assembly pivotally mounted to the lower head assembly so that the main beam assembly is pivotable about a first pivot axis, at least one tilt actuator connected to the lower head assembly and to the main beam assembly to pivot the main beam assembly about the first pivot axis, and a vise assembly mounted on the main beam assembly. The vise assembly includes a stationary vise and a make/break vise that is rotatable relative to the stationary vise. At least two gull-beam assemblies are pivotally mounted to the main beam assembly for pivoting movement upward and downward relative to the main beam assembly between a lowered position and a raised position about second pivot axes each of which is parallel to the first pivot axis. Pivot actuators are connected to the main beam assembly and connected to the gull-beam assemblies for pivoting the gull-beam assemblies about the second pivot axes. In addition, each gull-beam assembly includes a pipe roller gripping assembly mounted on the gull-beam assembly.

In still another embodiment, a pipe handling attachment configured for attachment to a prime mover includes a head assembly that is configured to be attached to an arm of the prime mover, a support assembly pivotally mounted to the head assembly so that the support assembly is pivotable about a first pivot axis, at least one tilt actuator connected to the head assembly and to the support assembly to pivot the support assembly about the first pivot axis, and a vise assembly mounted on the support assembly. A pipe roller gripping assembly is mounted on the support assembly that is configured to grip a pipe and rotate a pipe gripped by the pipe roller gripping assembly about a longitudinal axis of the pipe, and that is movable relative to the vise assembly and the support assembly between a lowered position and a raised position.

The pipe handling attachment(s) described herein can be configured without the head assembly and/or without one or more of the gull-beam assemblies. In other words, the pipe handling attachment can include just the vise assembly that is mounted on the main beam assembly/the support assembly which can be attached to any support structure including, but not limited to, an arm of a prime mover.

In addition, the pipe handling attachment(s) described herein can be oriented horizontally relative to the ground, vertically relative to the ground, or at any angle between horizontal and vertical.

DRAWINGS

FIGS. 7A and 7B are end views of the vise assembly showing different rotational positions of the make/break vise relative to the stationary vise during make/break connection.

In FIG. 17B, one of the plates of the arm housing is removed to show interior construction of the gripping assembly.

DETAILED DESCRIPTION

With reference to all figures in this application, when reference is made to the "a" side or the "b" side of the attachment, reference numbers will be followed with an "a" or "b" respectively as shown in the figures throughout this application. Unless otherwise noted herein or apparent from the drawings, the "a" and "b" side of the attachment are substantially identical in construction, operation and function.

In addition, directional terms such as right, left, up or upward, down or downward, forward, backward, raised, lowered, and the like may be used. All such directional terms are to be interpreted based on FIG. 1 where right and left are generally in the x-direction; up, down, raised, lowered or the like are generally in the y-direction or the x-y plane; and forward and backward or the like are generally in a z-direction into and out of the x-y plane of FIG. 1.

In some embodiments, the attachments described herein attach to a single arm of the construction equipment or prime mover, such as an excavator, track hoe, back hoe, or similar prime mover or heavy construction equipment.

In some embodiments, an attachment is defined herein as a tool that is removably mounted to the end of an arm of the construction equipment or prime mover, and when mounted modifies the construction equipment or prime mover to perform a completely new scope of work compared to a different type of attachment that can also be mounted to the end of the arm. The attachment can be removed from the arm of one piece of construction equipment or prime mover, and mounted to the arm of a different construction equipment or prime mover.

With reference to FIGS. 1-3A, 3B, an attachment 10 is illustrated that is configured to rotate a section of pipe during break-out (i.e. disconnection or disassembly) and/or make-up (i.e. connection or assembly) with another section of pipe. Together, these two operations can be referred to as make/break operations. In one embodiment, the attachment 10 is suitably configured to mount to a piece of heavy construction equipment or prime mover a portion of which is visible in FIG. 13. In the illustrated embodiment, the upper end of the attachment 10 includes an upper head 12 that is configured to mount to an end of an excavator boom arm 14. However, the upper head 12 can be configured to permit connection of the attachment 10 to other construction equipment or prime movers.

Figure 13:
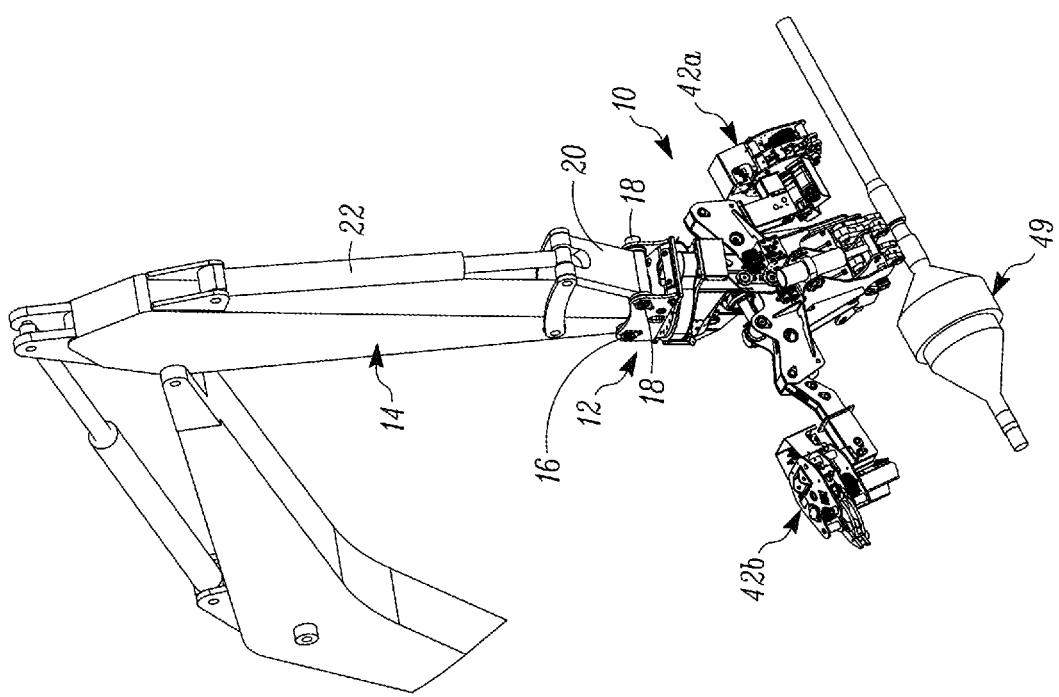
FIG. 13 shows the pipe handling attachment attached to an arm of a prime mover and handling attachment of a section of pipe to a reamer/hole opener.

As best seen in FIG. 13, the upper head 12 includes a connection point 16 that is pivotally connected to the boom arm 14 by a pivot pin to allow the attachment 10 to pivot relative to the boom arm 14 about an axis of the pivot pin, i.e. about the x-axis direction, and a connection point(s) 18 that is pivotally connected by a pivot pin(s) to boom arm linkage 20 so that the upper head 12 can pivot relative to the linkage 20. A hydraulic actuating cylinder 22 of the prime mover is connected to the linkage 20 for pivoting the attachment 10 about the pivot pin of the connection point 16.

Returning to FIGS. 1-3A, 3B, the upper head 12 is suitably rotatably connected to a lower head 24 so that the lower head 24 can rotate about an axis A relative to the upper head 12, i.e. rotate about the y-axis direction. Together, the upper head 12 and the lower head 24 form a head assembly.

Preferably, the lower head 24 is able to rotate continuously, i.e. 360 degrees, in either direction relative to the upper head 12. One example of rotatably connecting an upper head and a lower head is described in U.S. Pat. No. 8,490,519 which is incorporated herein by reference in its entirety.

A main beam 26 is pivotally connected to the lower head 24 by a pivot pin 28 to permit the main beam 26 to pivot relative to the lower head 24 about the axis of the pivot pin 28, i.e. about the z-axis direction, which is perpendicular to the x-axis direction and the y-axis direction. At least one tilt actuator 30 is provided for causing tilting of the main beam 26. In the illustrated embodiment, a single tilt actuator 30 is provided that is pivotally mounted within the lower head 24 by a pivot pin 32 to permit the tilt actuator 30 to pivot about the axis of the pin 32, with an opposite end 34 of the actuator 30 fixed to the main beam 26 by a pivot pin 36. The tilt actuator 30 can be, for example, a hydraulic, pneumatic, electrical or mechanical actuator that can extend and retract for pivoting the main beam 26 relative to the lower head 24. The axis of the pivot pin 32 is substantially parallel to the axis of the pivot pin 28 so that the main beam 26 and the tilt actuator 30 can pivot about parallel axes.

In another embodiment, two tilt actuators can be provided as described in U.S. Pat. No. 8,490,519.

Further information on pipe handling attachments that are attachable to an excavator arm, and having a pivoting main beam, lower head, tilt actuators and other features, can be found in US 2009/0057019 and US 2010/0308609, which are incorporated herein by reference in their entireties.

With continued reference to FIGS. 1-3A, 3B, a make/break vise assembly 40 and pipe roller gripping assemblies 42a, 42b are mounted on the main beam 26 via gull-beam assemblies 46a, 46b and tilt with the main beam. As will be described further below, the make/break vise assembly 40 is configured to be disposed over the joint between two pipe sections, and configured to clamp one pipe section while clamping and rotating the second pipe section in order to either initiate breaking of the joint in the case of pipe break-out or torqueing the joint between the two pipe sections in the case of pipe make-up. As will also be described further below, the pipe roller gripping assemblies 42a, 42b are configured to grip a section of pipe and rotate the pipe section to unthread the pipe section from another pipe section in the case of pipe break-out or thread the pipe section onto another pipe section in the case of pipe make-up. The pipe roller gripping assemblies 42a, 42b are also configured to securely grip a pipe section to enable the attachment 10 under the power of the prime mover to move a pipe section from one point to another and to pick up a pipe section, such as from a pipe stack or from the ground.

In the illustrated embodiment, the pipe roller gripping assemblies 42a, 42b are identical in construction and, as discussed further below, are mounted on the gull-beam assemblies 46a, 46b so that each assembly 42a, 42b can move axially in the x-axis direction (independently from each other or in synchronization with each other) relative to the main beam 26. In addition, as discussed further below, each pipe roller gripping assembly 42a, 42b is also mounted so as to be moveable in the y-axis direction (independently from each other or in synchronization with each other). The pipe roller gripping assemblies 42a, 42b need not be identical in construction, and different pipe roller gripping assembly configurations can be used on the same attachment 10.

In addition, each pipe roller gripping assembly 42a, 42b is mounted on the respective gull-beam assembly 46a, 46b and together they form an assembly 44a, 44b. The gull-beam assemblies 46a, 46b are pivotally attached to the main beam 26 on opposite sides of the pivot 28 to permit the gull-beam assemblies 46a, 46b to pivot in the x-y plane between the lowered position shown in FIG. 1 and the raised position shown in FIG. 2. A pair of actuators 48a, 48b (partially visible in FIGS. 1-3A, 3B) are disposed within the main beam 26 for actuating the gull-beam assemblies 46a, 46b between the lowered position (shown in FIG. 1) and the raised position (shown in FIGS. 2 and 3A, 3B).

Figure 2:
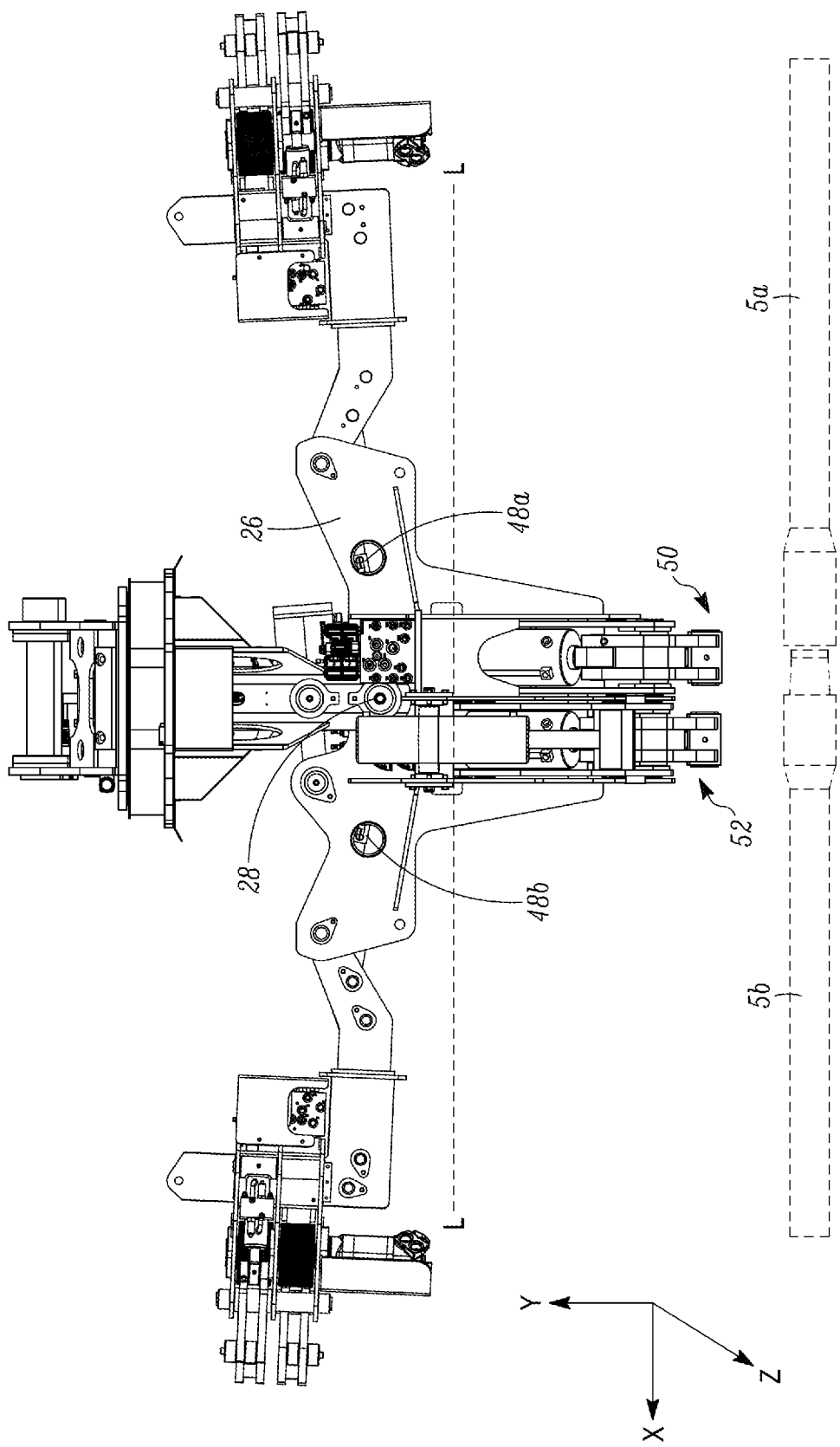
FIG. 2 is a side view of the pipe handling attachment of FIG. 1 with the gull-beam assemblies pivoted upward to the raised position.
Figure 3A:
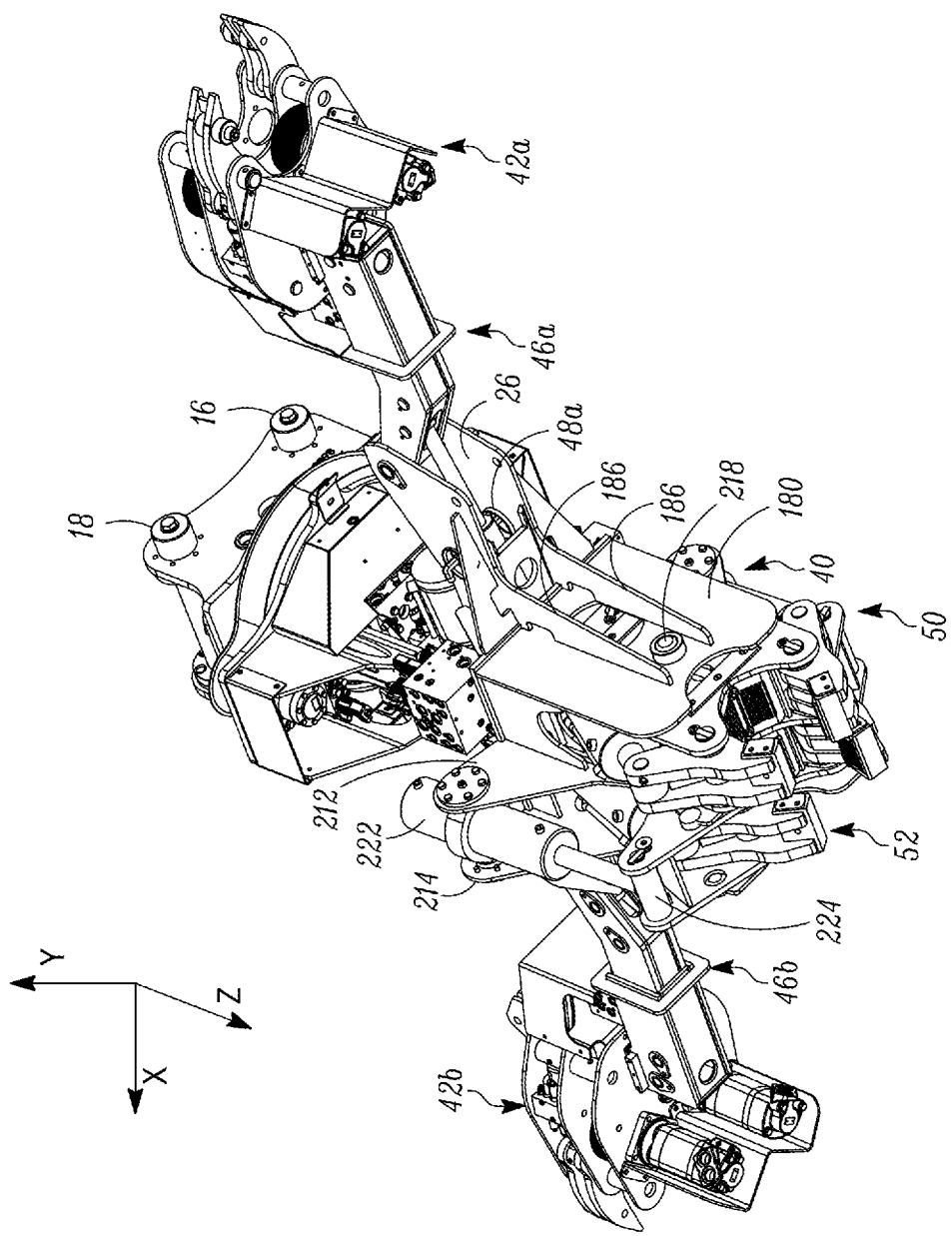
FIG. 3A is a bottom perspective view of the pipe handling attachment with the gull-beam assemblies pivoted upward to the raised position.
Figure 3B:
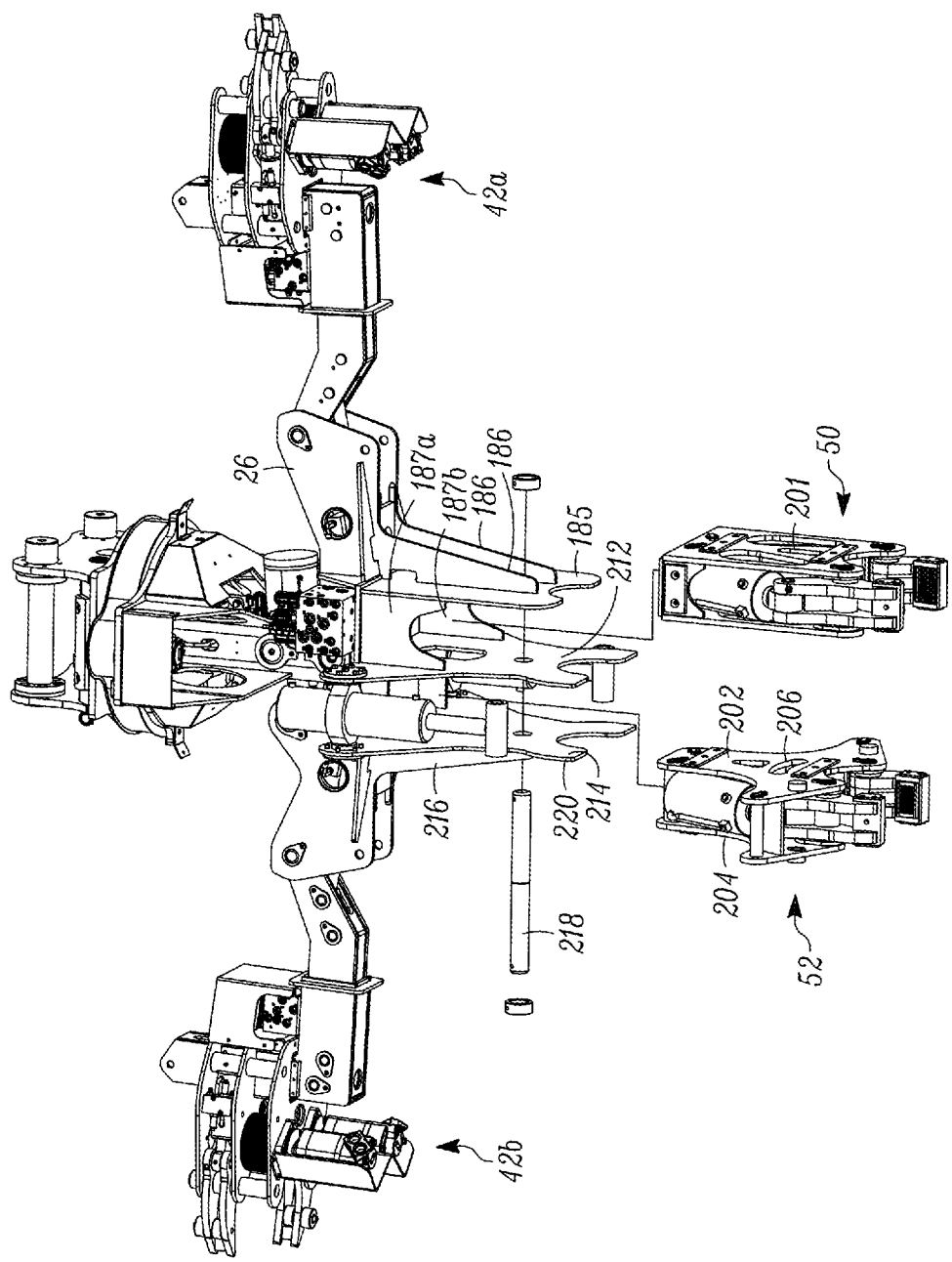
FIG. 3B is an exploded view of the pipe handling attachment showing the make/break vise and the stationary vise dropped from their housings.
Figure 14:
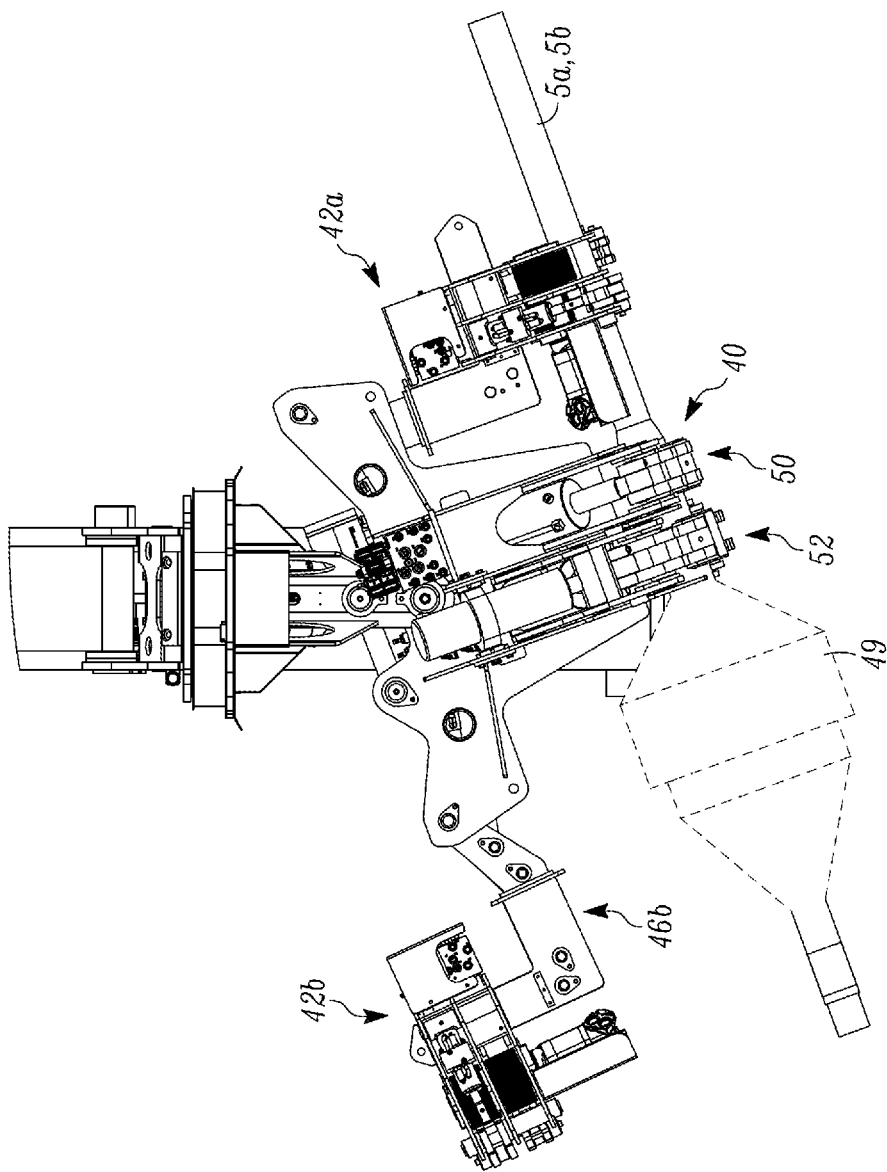
FIG. 14 is a side view of the pipe handling attachment of FIG. 13 engaged with the reamer/hole opener and the pipe section.

The gull-beam assemblies 46a, 46b can be individually actuated by the actuators 48a, 48b, or the gull-beam assemblies 46a, 46b can be actuated simultaneously. Thus, a single one of the gull-beam assemblies 46a, 46b can be pivoted to the raised position while the other gull-beam assembly remains in the lowered position, as shown in FIGS. 13 and 14. Or both of the gull-beam assemblies can be pivoted to the raised position as shown in FIGS. 2 and 3A, 3B. The actuators 48a, 48b can be, for example, hydraulic, pneumatic, electrical or mechanical actuators that can extend and retract for pivoting the gull-beam assemblies 46a, 46b relative to the main beam 26 to raise and lower the gull-beam assemblies, and the gripping assemblies 42a, 42b mounted thereon, between the lowered and the raised positions.

Movement of the gull-beam assemblies 46a, 46b to the raised position allows the pipe roller gripping assemblies 42a, 42b to be moved upward out of the way in certain circumstances to avoid interference with pipe accessories. For example, when making up or breaking out a pipe accessory such as a reamer/hole opener 49 as shown in FIGS. 13 and 14, a crossover sub, or a section of pipe containing a valve, one or both of the pipe roller gripping assemblies 42a, 42b can be moved out of the way to avoid interference with the pipe accessory while the make/break vise assembly 40 of the attachment 10 is used to make-up or break-out the pipe accessory and an adjoining section of pipe.

The gull-beam assemblies 46a, 46b can be pivoted upward to the raised position any distance that is suitable for avoiding interference with pipe accessories such as a reamer, crossover sub, or valve. With reference to FIG. 2, the gull-beam assemblies 46a, 46b can pivot upward to at least the level L-L so that the pipe roller gripping assemblies 42a, 42b are disposed above the level L-L. At this position, the pipe roller gripping assemblies 42a, 42b would be considered to be completely or substantially disposed above the pivot 28, completely or substantially disposed above the make/break vise assembly 40, or approximately or substantially level with the main beam 26. In addition, at this position, the openings defined by the grab arms of the pipe roller gripping assemblies 42a, 42b in which the pipe is gripped would face generally in the x-axis direction.

As discussed further below, the make/break vise assembly 40 includes a stationary vise 50 and a make/break vise 52. The vises 50, 52 are each designed to grip and securely hold a section of pipe on opposite sides of a joint between two sections of pipe, with the make/break vise 52 being configured to be rotatable relative to the stationary vise 50 to rotate its gripped pipe section to break the joint during break out/disconnection or to torque the joint during make-up or connection.

Specific details of the construction and operation of the make/break vise assembly 40 and the gull-beam assemblies 46a, 46b will be provided below. However, the general, overall operation will be explained with reference to FIGS. 4-14.

First, an explanation of making up or connecting two sections of pipe 5a, 5b will be explained. Breaking or disconnecting the two sections of pipe 5a, 5b is done similarly, but essentially in reverse order.

Figure 1:
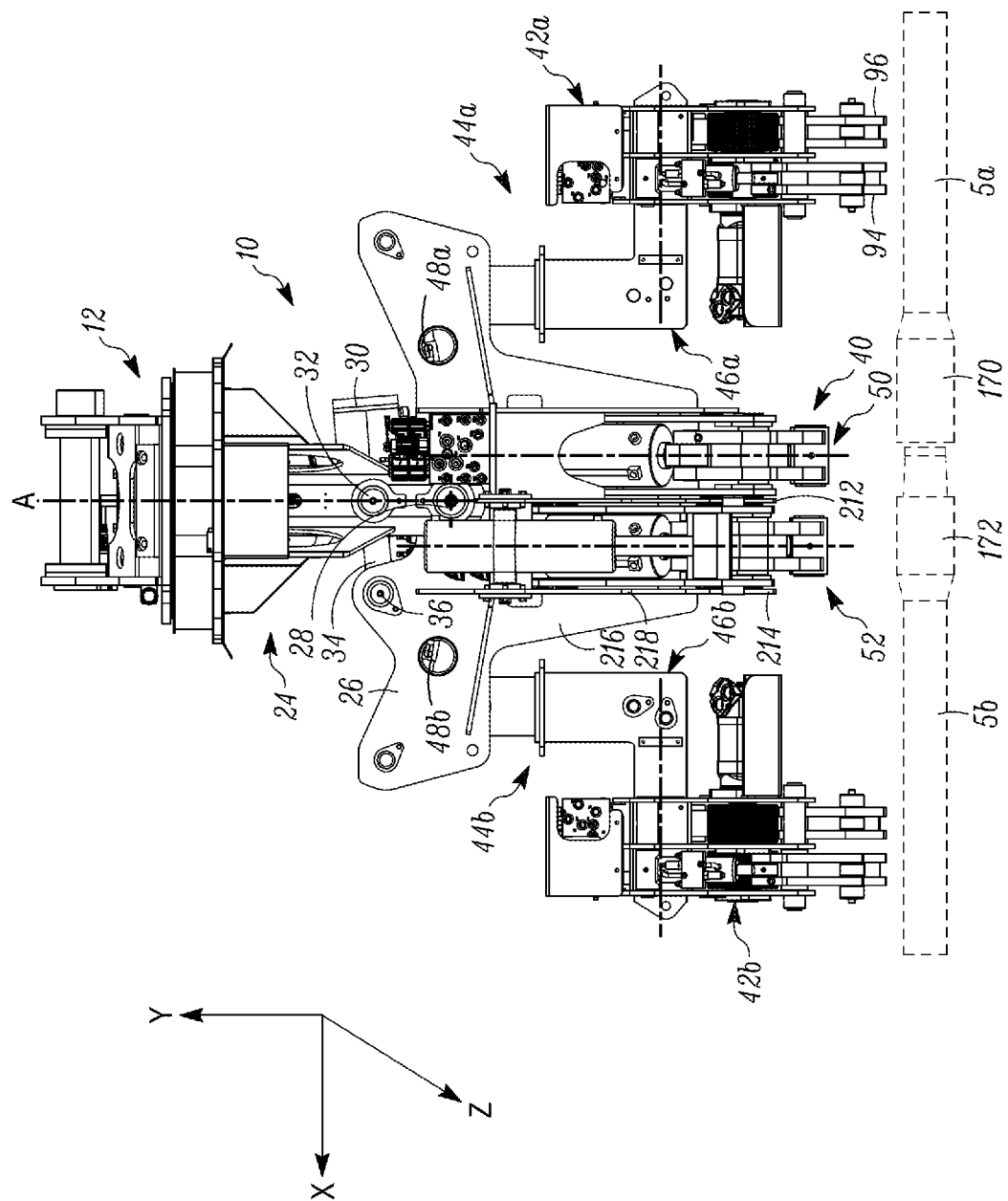
FIG. 1 is a side view of one embodiment of a pipe handling attachment with the gull-beam assemblies at the lowered position.
Figure 42A:
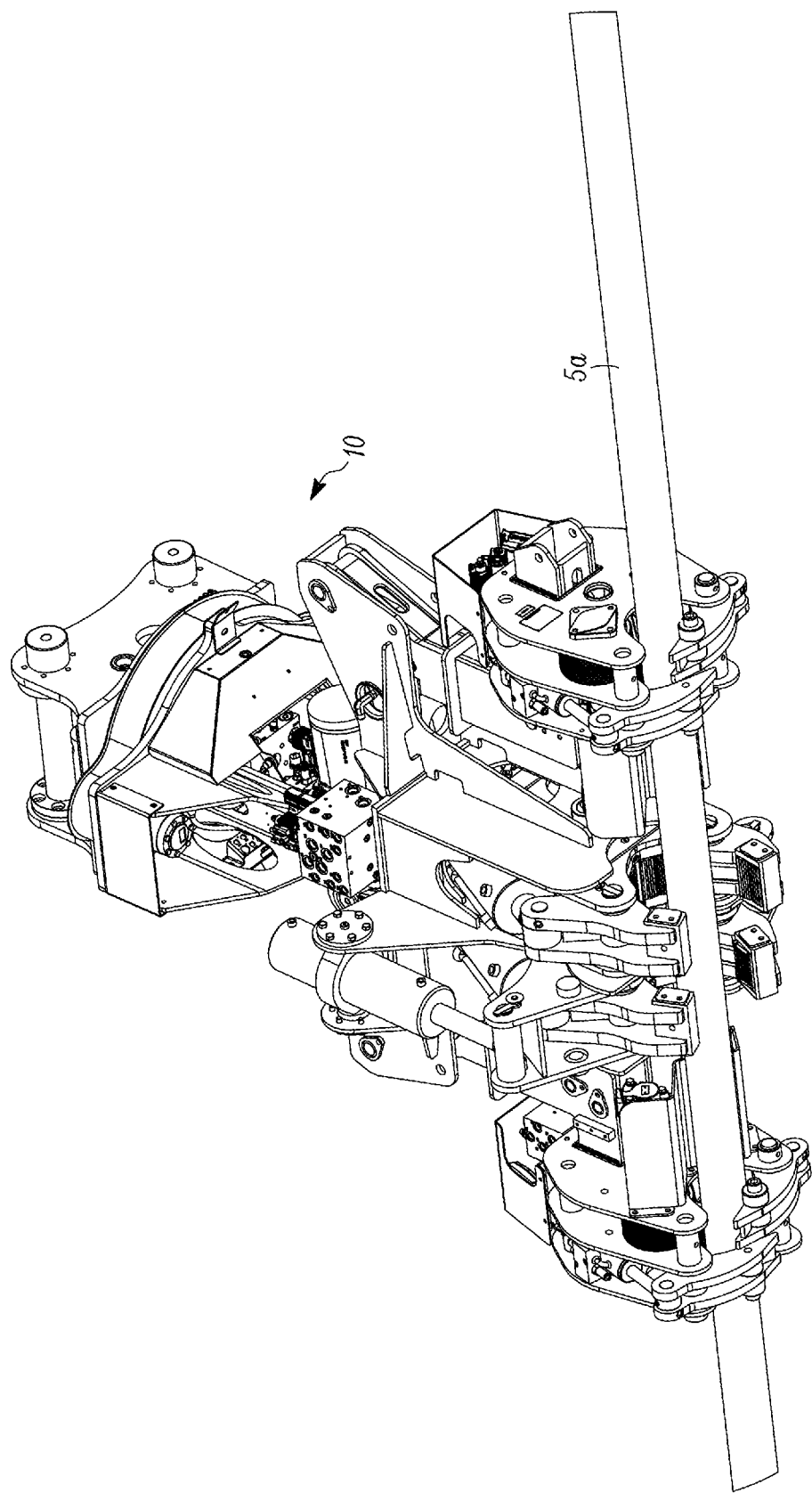
FIGS. 42A, 42B and 42C are perspective views of the pipe handling attachment described herein holding a section of pipe and shifting the pipe toward or away from another section of pipe.
Figure 42B:
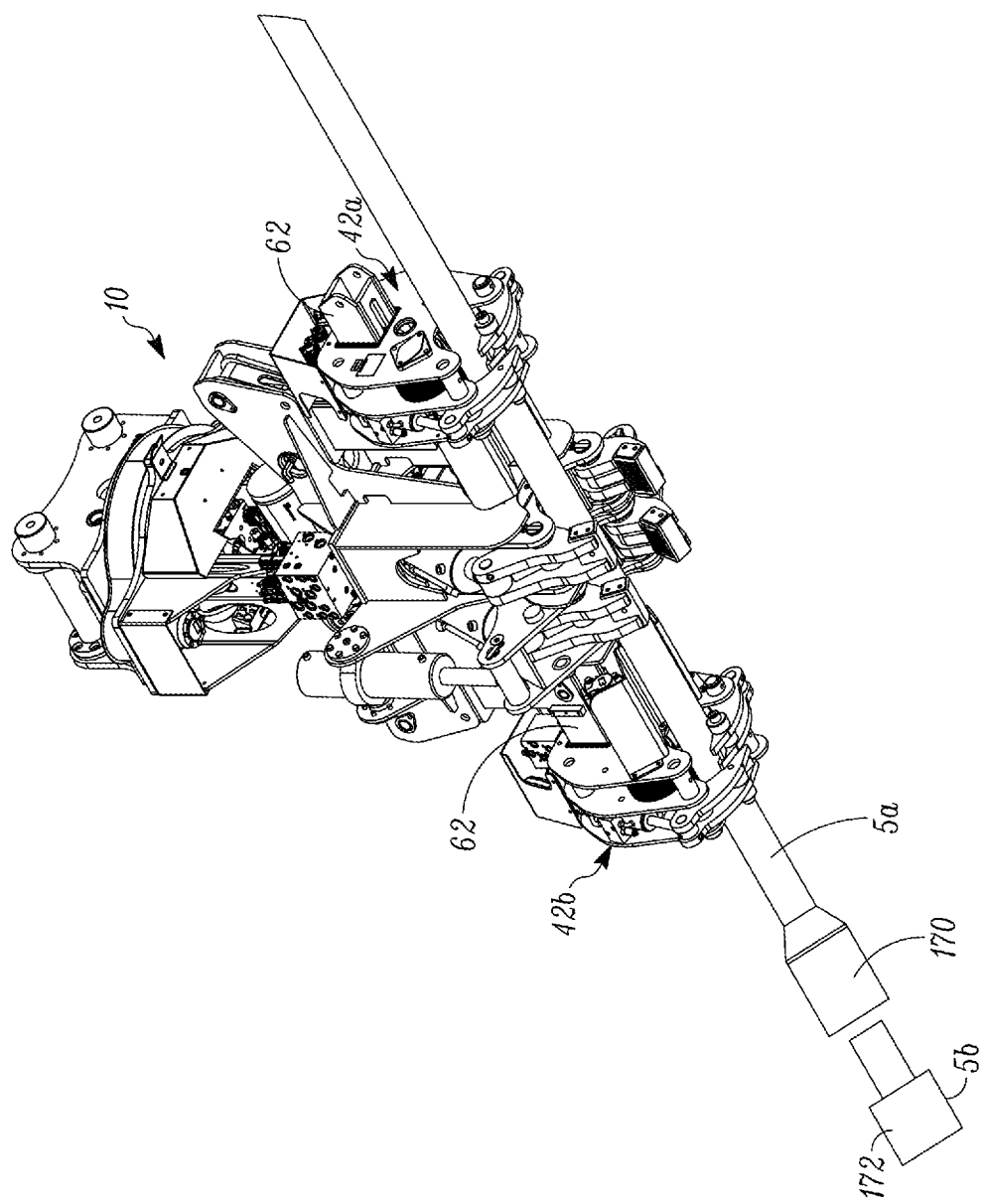

The two pipe sections 5a, 5b are initially brought close together end-to-end as shown in FIGS. 1 and 2. This can be done using the attachment 10 to carry and position one pipe section 5a next to the other pipe section 5b as shown in FIGS. 42A and 42B. In one embodiment, the attachment 10 can then be used to initiate threading of the new pipe section onto the end of the other pipe section, and once initiated, the attachment 10 can be repositioned to the position shown in FIG. 4 so that the stationary vise 50 is disposed over the end of the pipe section 5a and the pipe roller gripping assembly 42a is also disposed over the pipe section 5a, while the make/break vise 52 is disposed over the end of the pipe section 5b and the pipe roller gripping assembly 42b is disposed over the pipe section 5b. In another embodiment, once the new pipe section is brought close to the other pipe section, the attachment 10 can be repositioned to the position shown in FIG. 4.

Figure 5A:
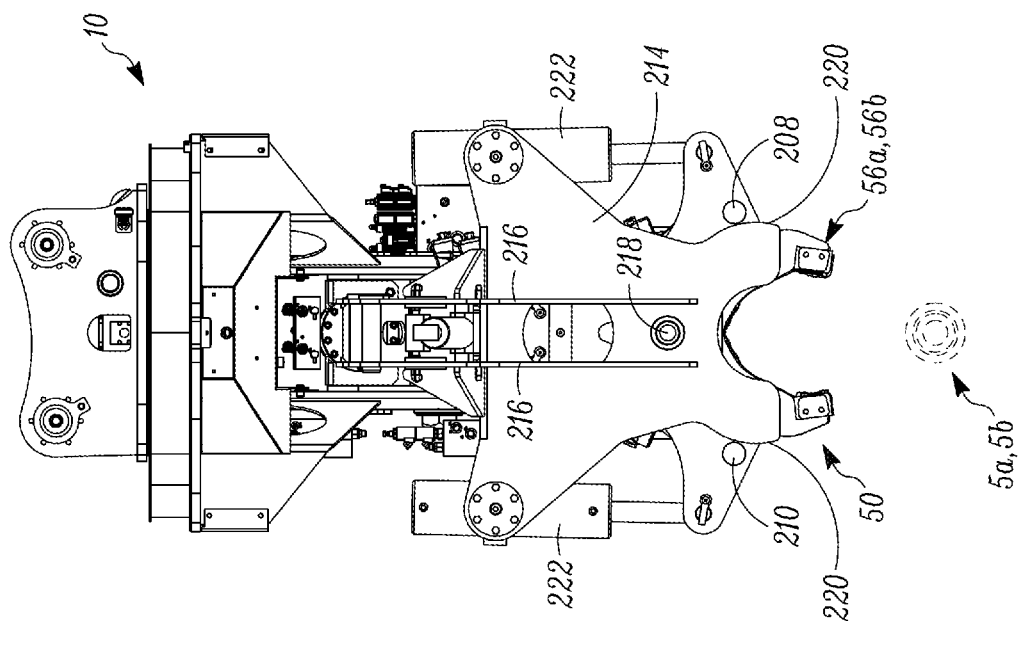
FIGS. 5A and 5B are end views of one of the pipe roller gripping assemblies and of the vise assembly, respectively, with the grab arms in an open position for engaging the pipe.
Figure 5B:
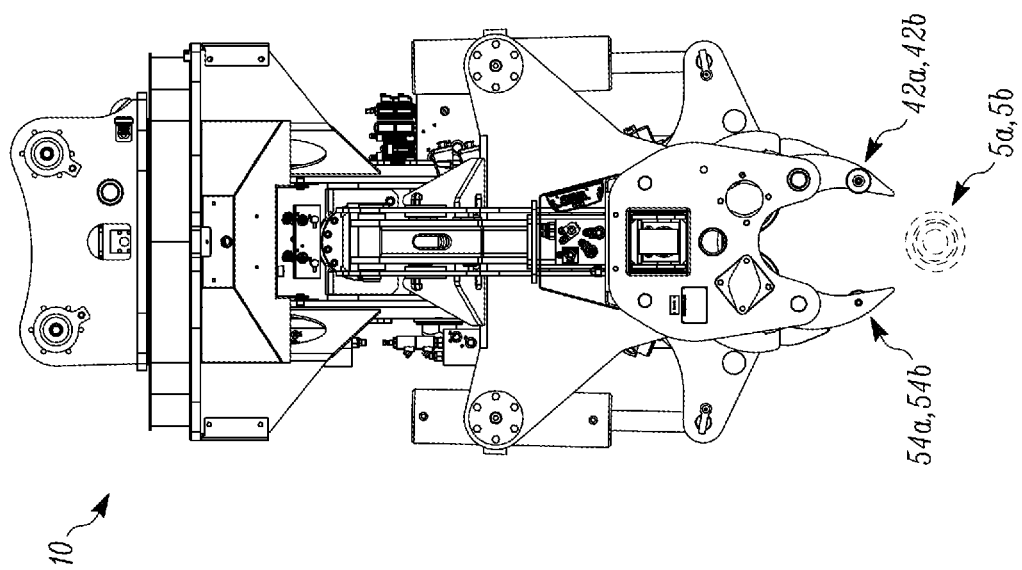

As shown in FIGS. 5A and 5B, the attachment 10 is lowered toward the pipe sections 5a, 5b with grab arm assemblies 54a, 54b of the pipe roller gripping assemblies 42a, 42b and vise arm assemblies 56a, 56b of the vises 50, 52 initially opened to allow the grab arm assemblies 54a, 54b and the vise arm assemblies 56a, 56b to fit over their respective pipe sections 5a, 5b.

Figure 6B:
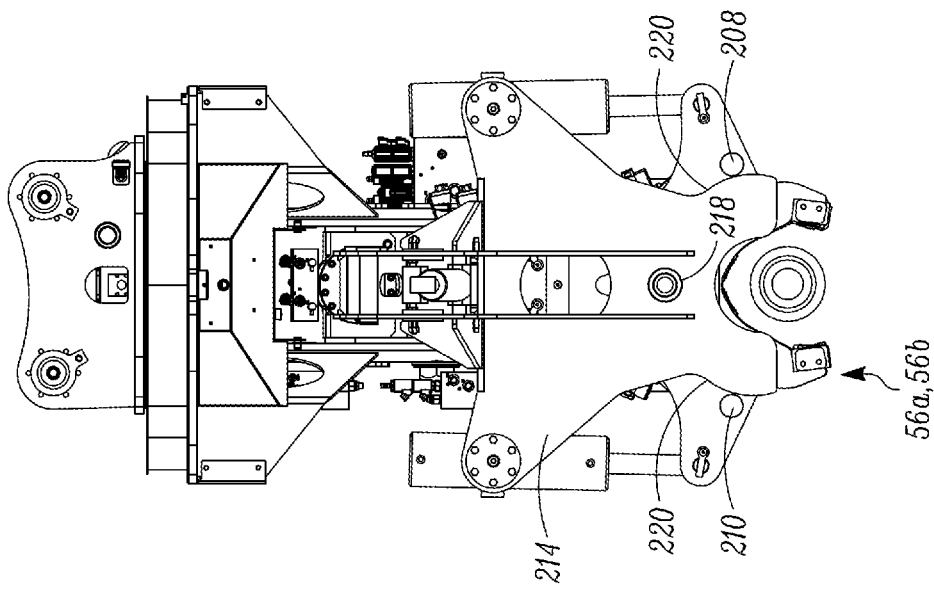
FIGS. 6A and 6B are end views similar to FIGS. 5A and 5B but moved into position over the pipe and with the grab arms of the pipe roller gripping assembly closed around the pipe.
Figure 6A:
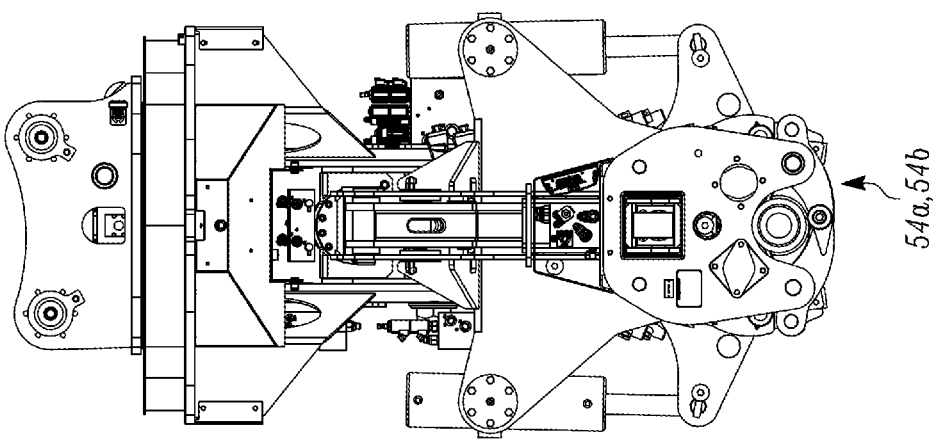
Figure 10:
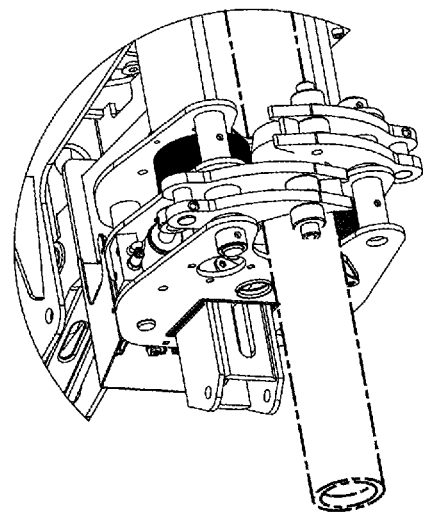
FIG. 10 is a close-up view of the portion contained in circle 10 of FIG. 8 illustrating a lateral offset between the grab arms of the pipe roller gripping assembly.
Figure 8:
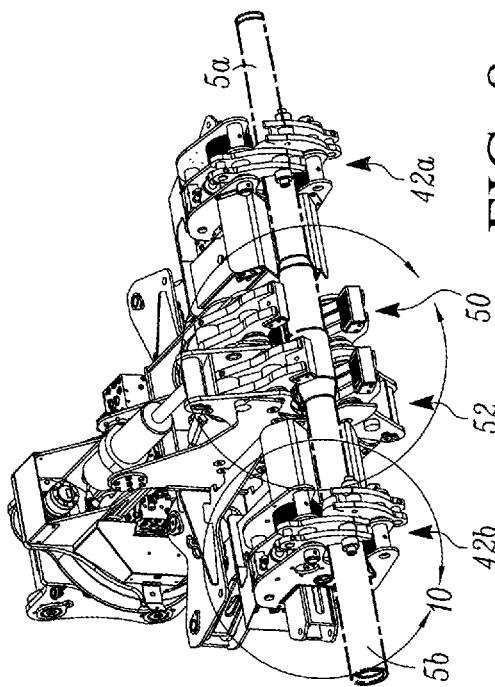
FIG. 8 is a bottom perspective view of the pipe handling attachment with the grab arms of the pipe roller gripping assemblies closed around the pipe and the grab arms of the vise assembly open.

With reference to FIGS. 6A, 6B and 8, once the attachment 10 is lowered into position over the pipe sections 5a, 5b, the grab arm assemblies 54a, 54b of the pipe roller gripping assemblies 42a, 42b are then closed as shown in FIGS. 6A and 10 while the vise arm assemblies 56a, 56b of the vises 50, 52 remain open.

One of the pipe sections, such as the pipe section 5b, is then rotated about its longitudinal axis by the pipe roller gripping assembly 42b to thread or finish threading the end of the pipe section 5b into or onto the pipe section 5a.

In one embodiment discussed further below with respect to FIGS. 41A-C, the pipe roller gripping assemblies 42a, 42b can be actuatable vertically upward relative to the gull-beam assemblies 46a, 46b so as to be able to lift the pipe sections 5a, 5b upward and into the arm assemblies of the vises 50, 52.

Figure 11:
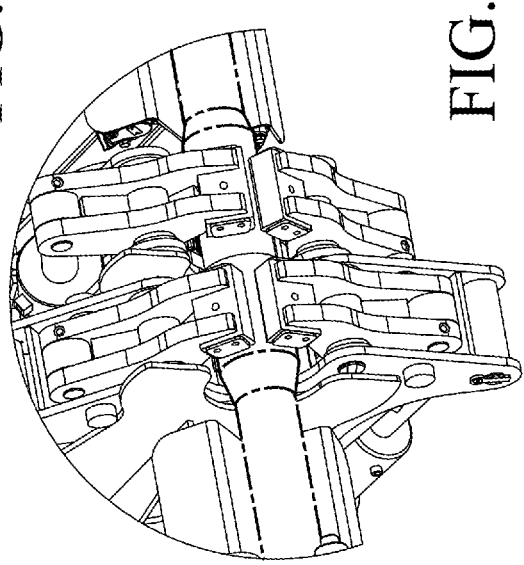
FIG. 11 is a close-up view of the portion contained in circle 11 of FIG. 9 showing the grab arms of the vise assembly clamped around the pipe joint.
Figure 9:
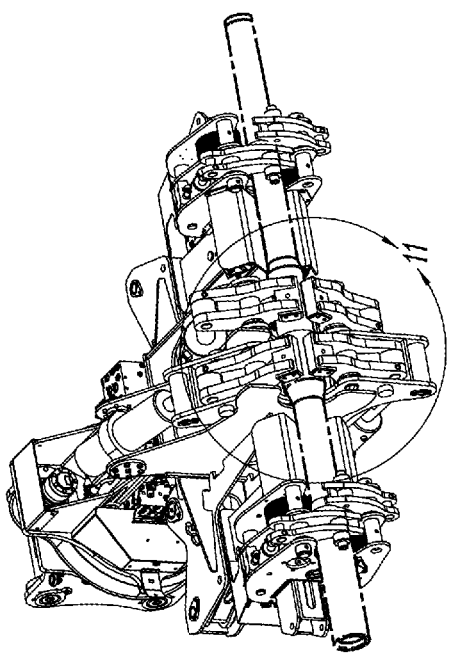
FIG. 9 is a bottom perspective view of the pipe handling attachment with the grab arms of the pipe roller gripping assemblies closed around the pipe and the grab arms of the vise assembly closed for make/break connection.

Once the pipe sections 5a, 5b are threaded together, the vise arm assemblies 56a, 56b are then actuated closed to grip each pipe section 5a, 5b on opposite sides of the joint as shown in FIGS. 9 and 11 to torque the joint to finish the making up or connection process. The make/break vise 52 is then rotated relative to the stationary vise 50. Since the vise arm assembly 56b of the make/break vise 52 is gripping the pipe 5b, rotation of the make/break vise 52 rotates the pipe 5b to complete the connection. FIG. 7A shows that the make/break vise 52 can be rotated in a counterclockwise direction (when viewing FIG. 7A) over an angle α from its home position. This counterclockwise rotation direction is suitable for achieving torqueing of the joint to finish the make-up process. The make/break vise 52 is also rotatable in a clockwise direction (when viewing FIG. 7B) over an angle α from its home position. This clockwise rotation direction is suitable for initiating break-out or disconnection of the joint during a break-out process.

Figure 12:
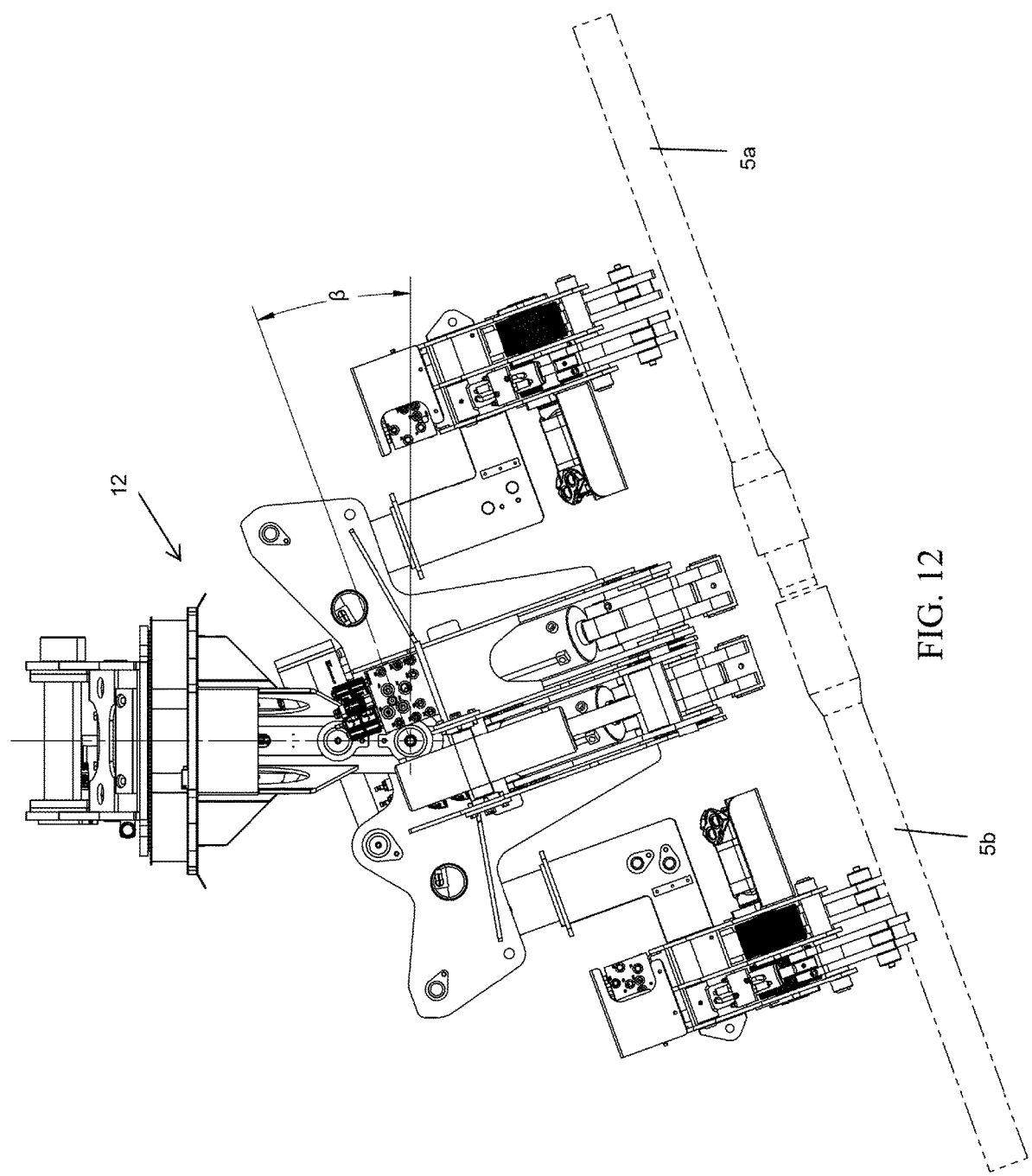
FIG. 12 shows the pipe handling attachment tilted at an angle for handling angled sections of pipe.

With reference to FIG. 12, the two pipe sections 5a, 5b may be disposed at an angle. In such a situation, the attachment 10 can be pivoted about the pivot 28 by the tilt actuator 30 so that it is disposed at a corresponding angle β from horizontal.

Figure 43:
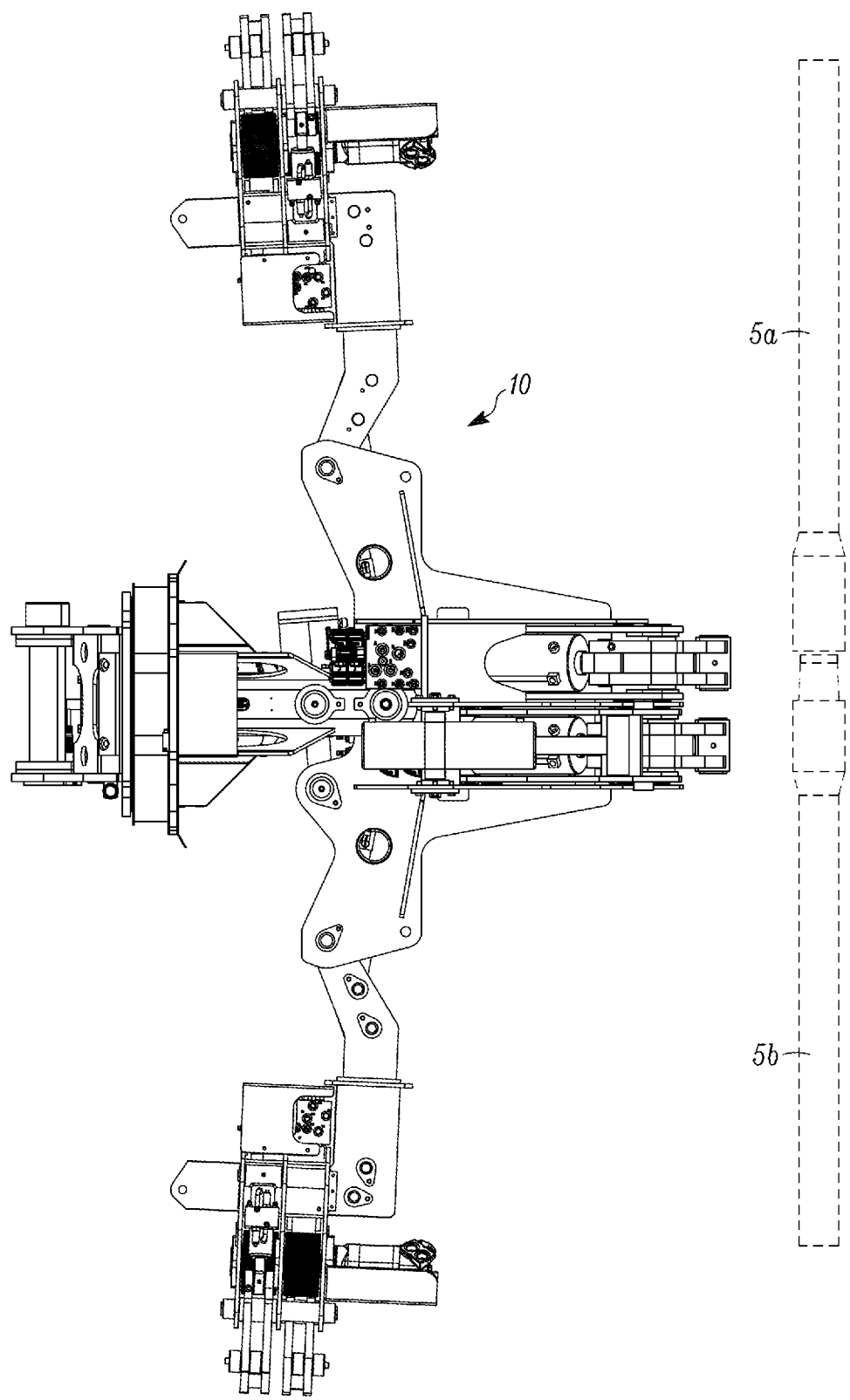
FIG. 43 illustrates the pipe handling attachment described herein being oriented vertically for handling vertical pipe.

In another embodiment illustrated in FIG. 43, the pipe sections 5a, 5b can be oriented vertically in which case the attachment 10 can also be oriented vertically. In this embodiment, the attachment 10 can be oriented vertically in any suitable manner including, but not limited to, rotation of the lower head 24 relative to the upper head 12 together with any suitable manipulation of the arm 14 of the prime mover, or by mounting the attachment 10 in a vertical orientation on a suitable mounting structure other than the arm 14 of a prime mover.

Figure 44:
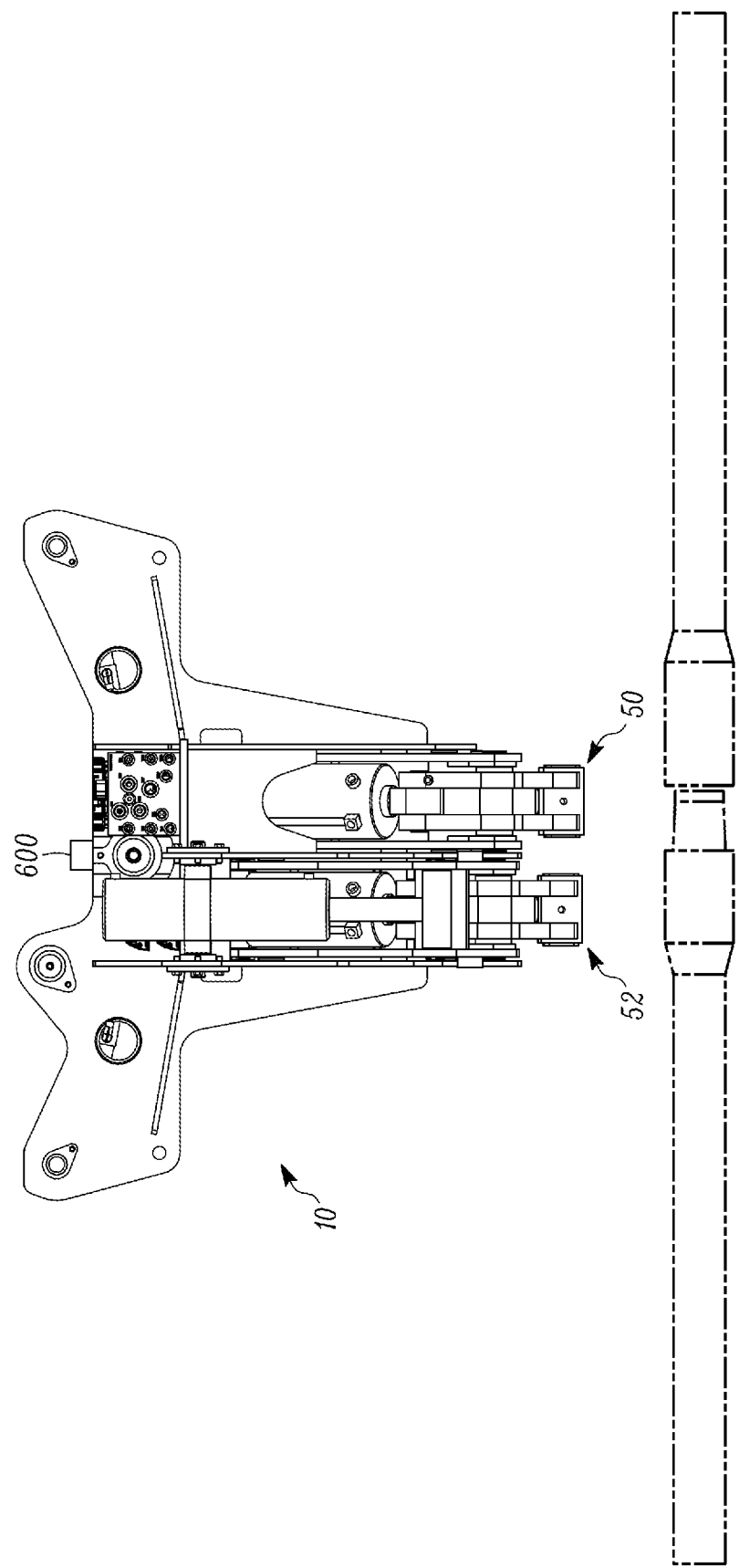
FIG. 44 illustrates another embodiment of a pipe handling attachment described herein.

FIG. 44 illustrates another embodiment of the attachment 10 where the upper head 12 and the lower head 24 are removed. Instead, a generic mounting structure 600 is illustrated in FIG. 44 to indicate that the attachment 10 can be attached in any suitable manner to any suitable mounting structure, in a horizontal orientation, a vertical orientation and any angle between horizontal and vertical. FIG. 44 also illustrates that the attachment 10 can be used without the gull-beam assemblies 46a, 46b and the pipe roller gripping assemblies. Therefore, the attachment 10 can be used with just the stationary vise 50 and the make/break vise 52.

FIGS. 13 and 14 illustrate operation of the attachment 10 in the case of the reamer 49 being connected to one of the pipe sections 5a, 5b. Due to the size of the reamer 49 and its proximity to the joint, if the attachment 10 is brought down toward the reamer 49 and the pipe section, with the pipe roller gripping assemblies 42a, 42b in the lowered position, the gripping assembly 42b will contact the reamer 49 and prevent correct positioning of the attachment 10. Therefore, the gull-beam assembly 46b is pivoted upwardly out of the way to the raised position to permit correct positioning of the make/break vise assembly 40 over the joint for connecting the reamer 49 to the pipe section.

Gull-Beam Assemblies

Figure 15A:
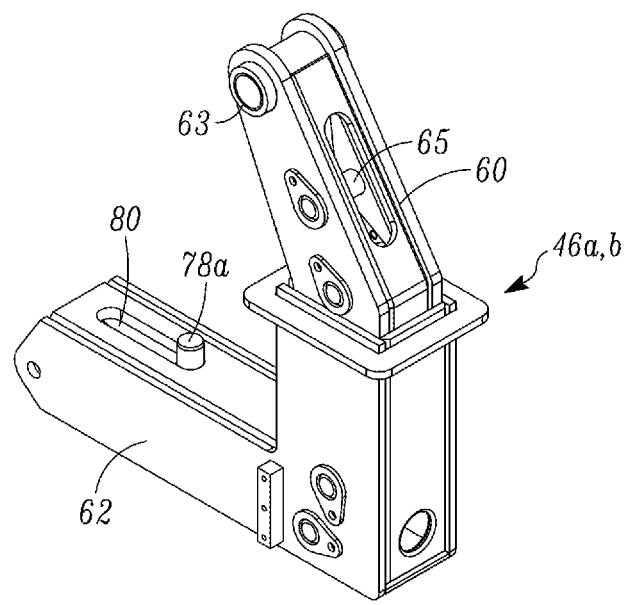
FIGS. 15A and 15B are perspective and sectional views, respectively, of one embodiment of a gull-beam assembly that can be used on the pipe handling attachment.

The construction of the gull-beam assemblies 46a, 46b will now be described with reference to FIGS. 15A and 15B. The assemblies 46a, 46b are identical in construction so only the assembly 46a will be described in detail.

The gull-beam assembly 46a supports the pipe roller gripping assembly 42a. The gull-beam assembly 46a includes an upper gull-beam 60 and a lower gull-beam 62. In the illustrated embodiment, the upper gull-beam 60 is telescoped within the lower gull-beam 62 in a manner that permits the upper gull-beam 60 and the lower gull-beam 62 to move relative to one another in the vertical or y-axis direction. An upper end 63 of the upper gull-beam 60 is configured for pivoting attachment to the main beam 26 to permit the entire gull-beam assembly 46a to pivot as discussed above. In addition, the upper gull-beam beam 60 defines an attachment location 65 for attaching to the actuator 48a.

Figure 15B:
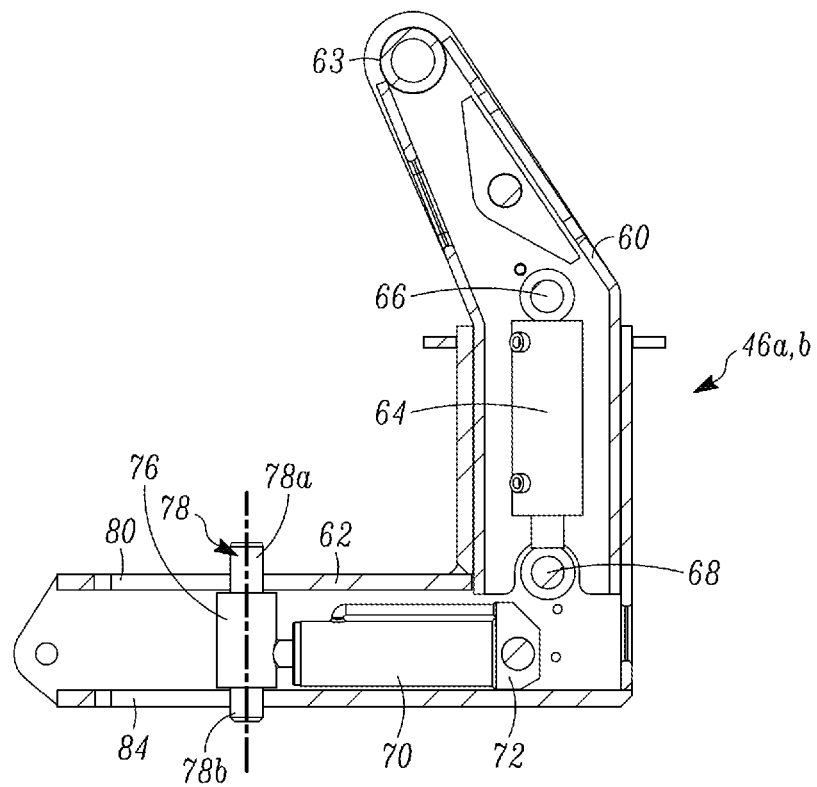

As shown in FIG. 15B, an actuator 64 is disposed within the upper gull-beam 60 and is attached at one end 66 to the upper gull-beam 60 and is attached at its opposite end 68 to the lower gull-beam 62. The actuator 64 can be, for example, a hydraulic, pneumatic, electrical or mechanical actuator that can extend and retract. When the actuator 64 extends, the lower gull-beam 62 is forced downward, thereby lowering the pipe roller gripping assembly 42a mounted on the lower gull-beam 62 in the vertical or y-axis direction.

The lower gull-beam 62 also includes an actuator 70 disposed inside thereof that can be, for example, a hydraulic, pneumatic, electrical or mechanical actuator that can extend and retract. One end 72 of the actuator 70 is attached to the lower gull-beam 62 and the other end 76 of the actuator 70 is attached to a pin 78. The pin 78 includes an upper end 78a that extends through and is slidable in a slot 80 formed in the lower gull-beam 62. Similarly, a lower end 78b of the pin 78 extends through and is slidable in a second slot 84 formed in the lower gull-beam 62.

As discussed further below with respect to FIGS. 17-22, the pipe roller gripping assembly 42a includes a rectangular opening formed therein that allows the pipe roller gripping assembly 42a to be slidably disposed on the lower gull-beam 62. The pin 78 is attached to the pipe roller gripping assembly 42a such that when the actuator 70 extends and retracts, the pipe roller gripping assembly 42a is moved relative to the lower gull-beam 62 horizontally or in the x-axis direction.

Therefore, the gull-beam assembly 46a achieves the vertical or y-axis movements and the horizontal or x-axis movements of the pipe roller gripping assembly 42a, and the pivoting movement of the pipe roller gripping assembly 42a between the raised and lowered positions.

In another embodiment, the gripping assembly 42a can be fixed in position on the lower gull-beam 62, but the lower gull-beam can be movable in the x-axis direction to shift the position of the gripping assembly 42a.

Figure 16A:
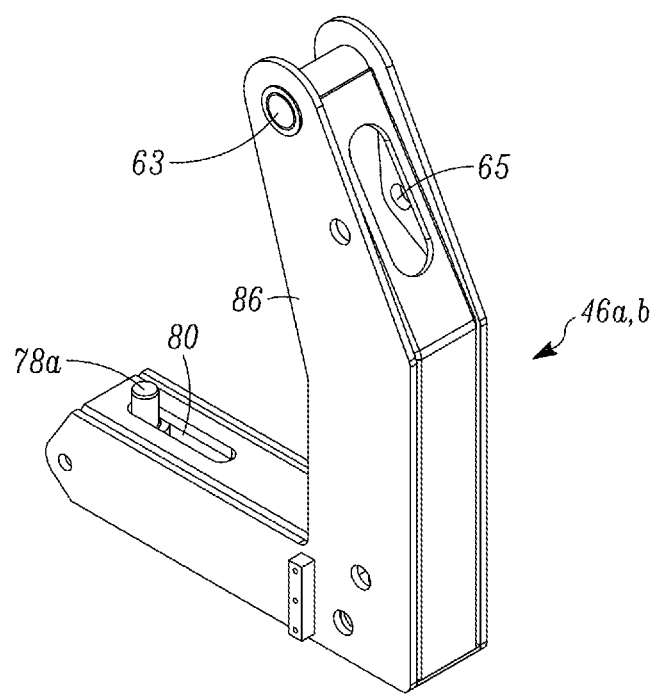
FIGS. 16A and 16B are perspective and sectional views, respectively, of another embodiment of a gull-beam assembly that can be used on the pipe handling attachment.
Figure 16B:
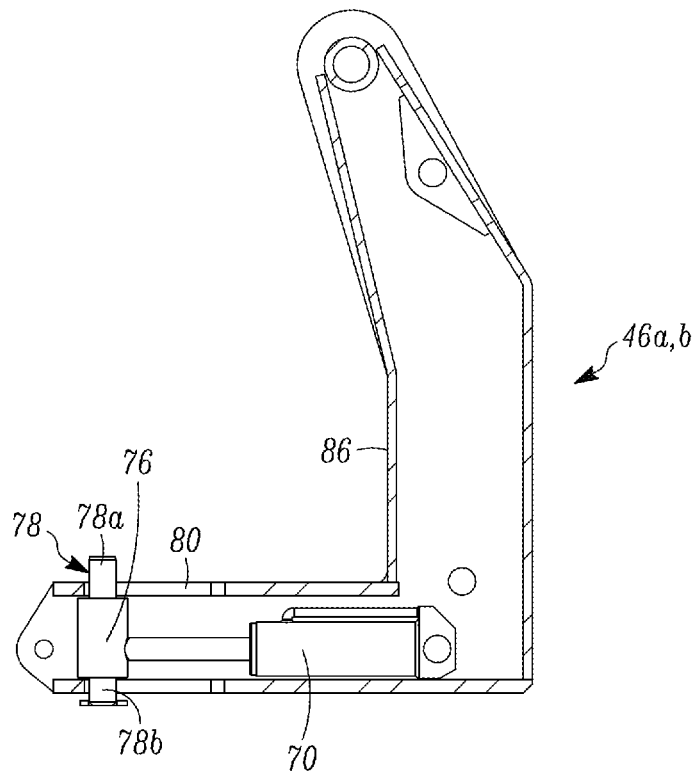

FIGS. 16A and 16B illustrate another embodiment of the gull-beam assembly 46a,b that is constructed of a single beam structure 86. In this embodiment, the gull-beam assembly 46a cannot move the pipe roller gripping assembly 42a vertically or in the y-axis direction. Instead, the gull-beam assembly 46a can move the pipe roller gripping assembly 42a horizontally or in the x-axis direction, as well as pivot the pipe roller gripping assembly 42a between the raised and lowered positions.

Pipe Roller Gripping Assemblies

Embodiments of the pipe roller gripping assemblies 42a, 42b will now be described with reference to FIGS. 17-22. For sake of convenience, the gripping assemblies will be assumed to be identical in construction to one another, so only the assembly 42a will be described in detail. It is to be understood that the assembly 42b can be identical in construction and operation to the assembly 42a. Alternatively, the assemblies 42a, 42b can have different constructions from one another, for example the assembly 42a could have the construction described in FIGS. 17A-C and the assembly 42b could have the construction described in FIG. 18.

Regardless of the specific construction, each pipe roller gripping assembly has an arm housing with an opening in the arm housing allowing the arm housing to be disposed on the respective gull-beam assembly, grab arm assemblies such as the grab arm assemblies 54a, 54b, means for actuating the grab arm assemblies between open and closed positions for gripping the pipe sections, and means for causing rotation of the pipe section while the pipe section is gripped by the grab arm assemblies.

Figure 17B:
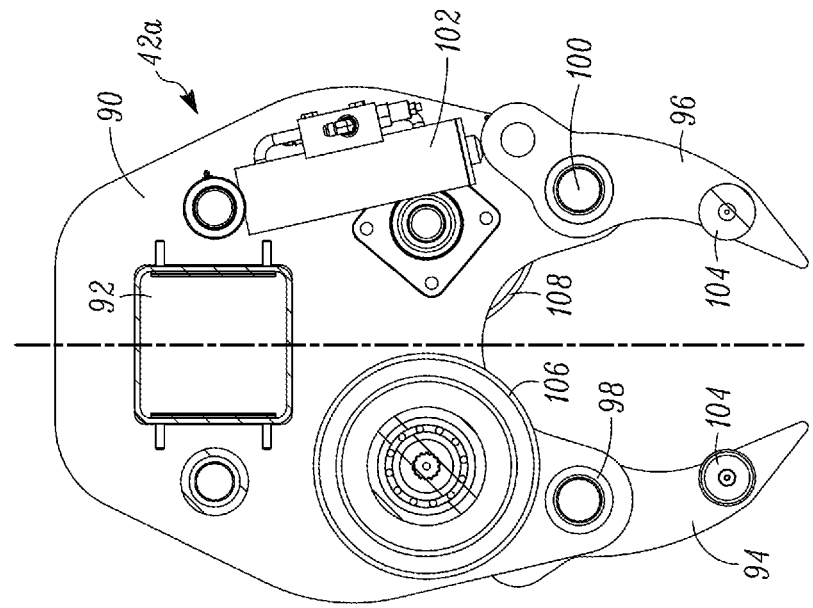
FIGS. 17A, 17B and 17C are perspective, end and top views, respectively, of one embodiment of a pipe roller gripping assembly that can be used on the pipe handling attachment.
Figure 17A:
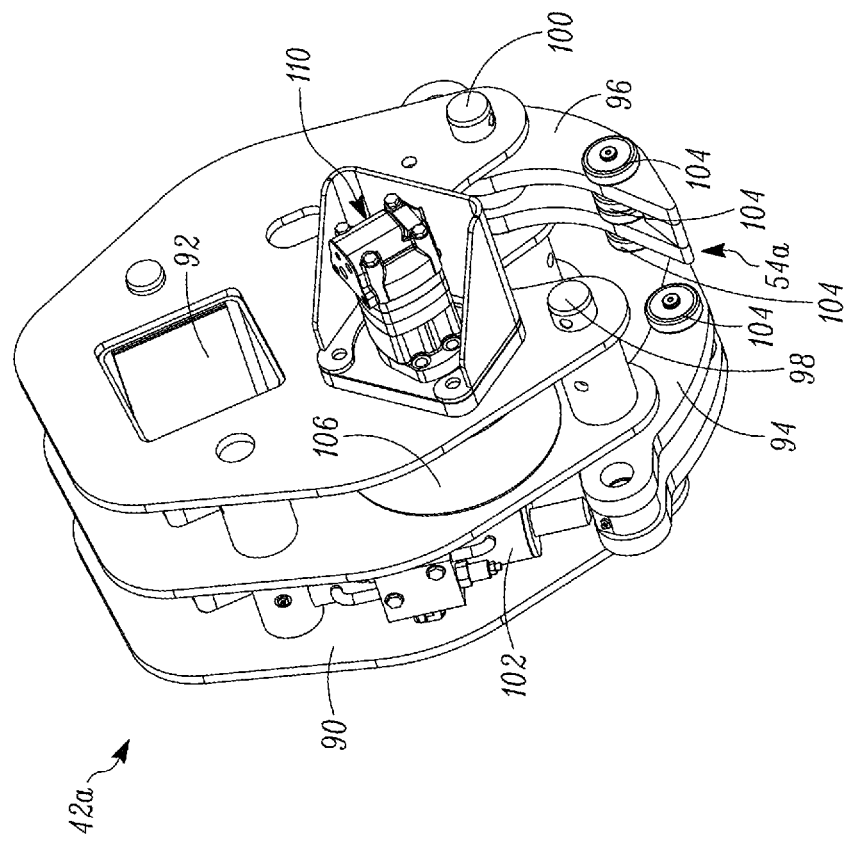
Figure 17C:
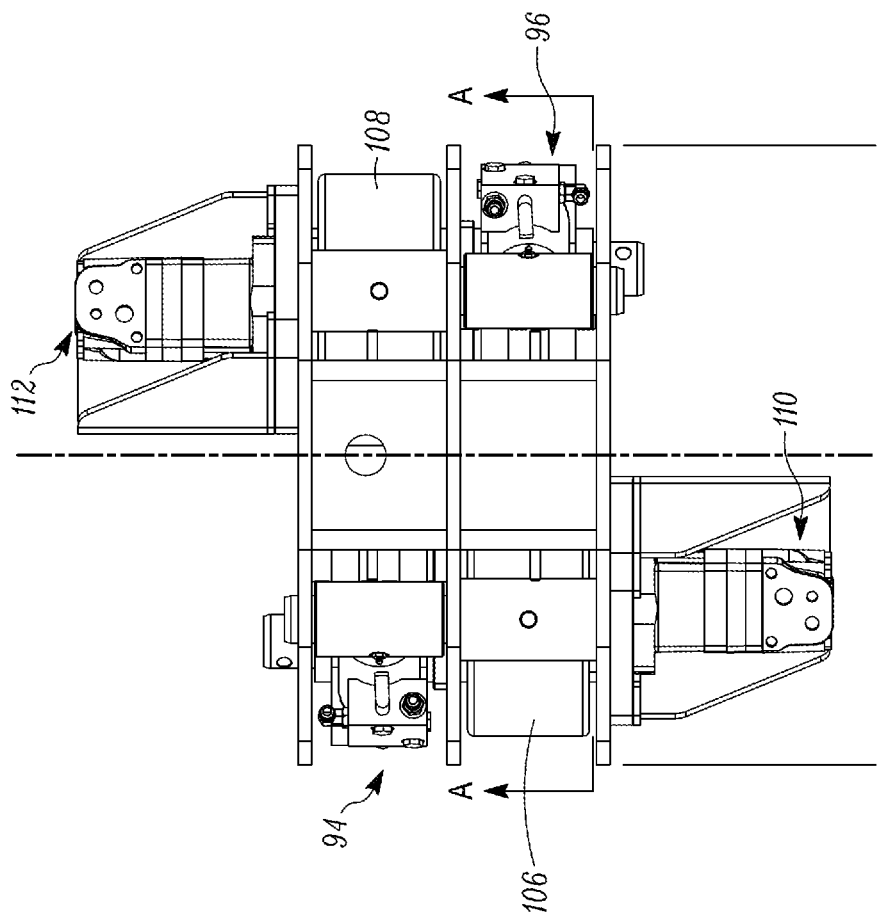

With reference to FIGS. 17A-C, a first embodiment of the pipe roller gripping assembly 42a is illustrated. In this embodiment, the assembly 42a includes an arm housing 90 formed by plates that are arranged parallel to each other. The plates include aligned rectangular openings that form a combined rectangular opening 92 through which the lower gull beam 62 of the gull-beam assembly 46a extends.

The grab arm assembly 54a includes a pair of grab arms 94, 96, with the grab arm 94 pivotally mounted between two of the plates of the arm housing 90 by a pivot pin 98, and the grab arm 96 pivotally mounted between two other plates of the arm housing 90 by a pivot pin 100 so that, as seen in FIGS. 1 and 17A, the grab arms 94, 96 are horizontally offset from one another in the x-axis direction. Actuators 102 are attached to ends of the grab arms 94, 96 for pivoting the grab arms about the axes of the pivot pins to move the grab arms 94, 96 between an open position (shown in FIG. 17B) and a closed, gripping position shown in FIG. 17A. The actuators 102 can be, for example, hydraulic, pneumatic, electrical or mechanical actuators that can extend and retract.

Each of the grab arms 94, 96 includes idler rollers 104 mounted thereon. When a pipe section 5a is held by the gripping assembly 42a in the grab arms 94, 94, the idler rollers 104 allow the pipe section to rotate relative to the gripping assembly 42a about the longitudinal axis of the pipe section.

Rotation of the pipe section is caused by a pipe drive mechanism disposed on the pipe roller gripping assembly 42a. In particular, as shown in FIGS. 17A-C, two pipe drive rollers 106, 108 are rotatably mounted between the plates of the arm housing 90 at a location above the pipe section. When the pipe section is grabbed by the grab arms 94, 96, the pipe drive rollers 106, 108 are engaged with the upper surface of the pipe section. The pipe drive rollers 106, 108 are driven by respective drive motors 110, 112 that are disposed on opposite sides of the arm housing 90. The drive motors 110, 112 are preferably reversible motors to permit rotation of the drive rollers 106, 108 in each direction.

Any form of drive connection between the drive rollers 106, 108 and the drive motors 110, 112 can be used. In the embodiment illustrated in FIGS. 17A-C, the drive motors 110, 112 directly drive the drive rollers 106, 108.

When the pipe drive rollers 106, 108 are rotated, the engagement between the drive rollers and the pipe section 5a causes the pipe section 5a to rotate about its longitudinal axis. Because of the idler rollers 104, the pipe section 5a rotates relative to the grab arms. The drive rollers 106, 108 can be formed from high friction rubber and/or can be provided with other friction enhancing features to increase the friction between the rollers and the pipe surface.

Figure 18:
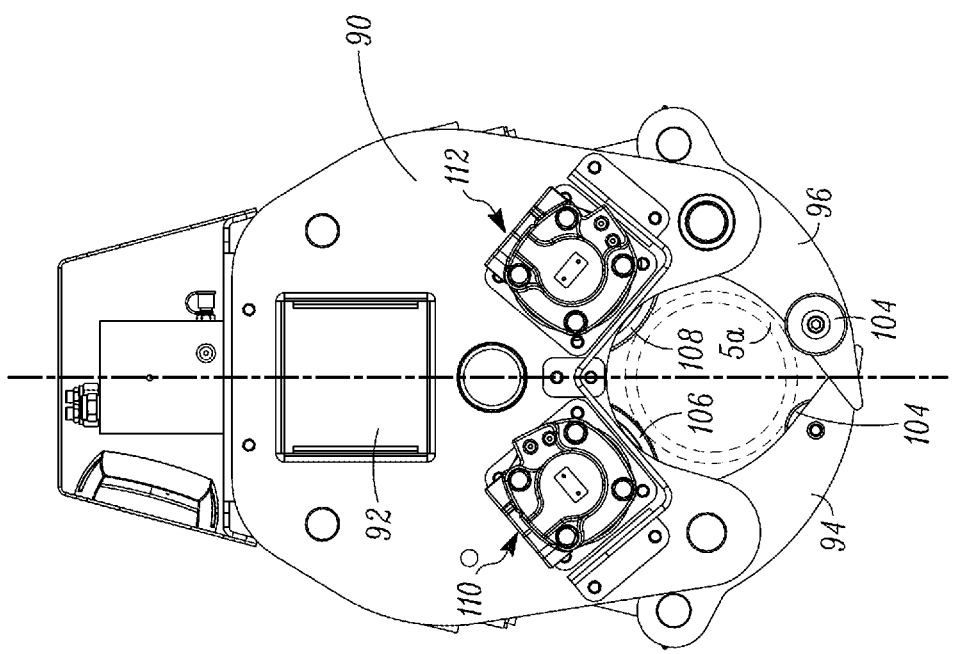
FIG. 18 is an end view of another embodiment of a pipe roller gripping assembly that can be used on the pipe handling attachment.

FIG. 18 illustrates an embodiment of a pipe roller gripping assembly that is similar to the embodiment in FIGS. 17A-C and like elements are referenced using like reference numbers. The embodiment in FIG. 18 differs in that the two drive motors 110, 112 are disposed on the same side of the grab arm housing 90.

Figure 19:
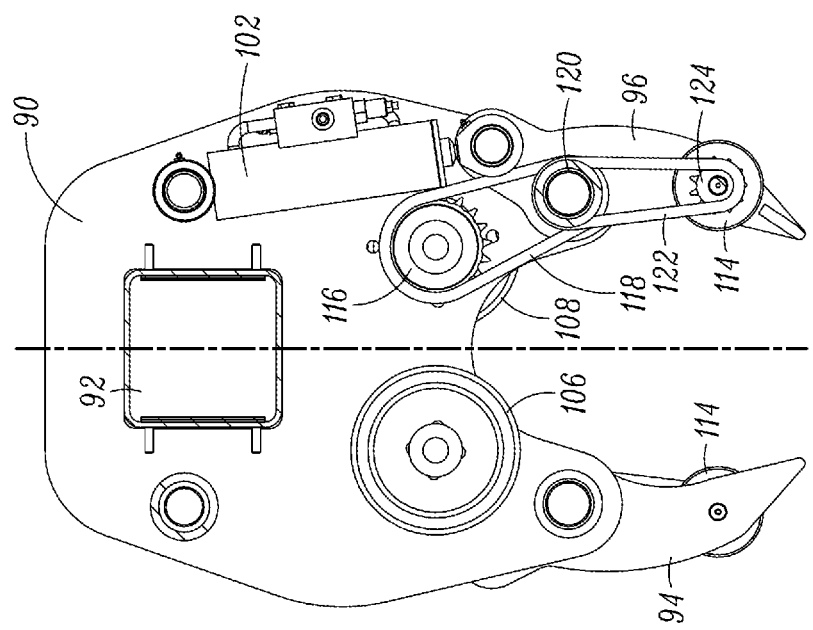
FIG. 19 is an end view of another embodiment of a pipe roller gripping assembly that can be used on the pipe handling attachment.

FIG. 19 illustrates an embodiment of a pipe roller gripping assembly that is similar to the embodiments in FIGS. 17A-C and 18 and like elements are referenced using like reference numbers. The embodiment in FIG. 19 differs in that the grab arms 94, 96 include at least one drive roller 114 in place of or in addition to the idler rollers. Each drive roller 106, 108 includes a sprocket 116 connected thereto that drives a first endless drive 118 such as a chain, belt, cable, rope or the like which in turn drives an intermediate sprocket 120 disposed on the grab arms 94, 96. A second endless drive 122 such as a chain, belt, cable, rope or the like extends from the intermediate sprocket 120 to a sprocket 124 connected to the drive roller 114. With this drive chain, rotation of the drive rollers 106, 108 by the drive motor(s) also causes rotation of the drive rollers 114. So the pipe section 5a is rotated by the drive rollers 106, 108 and by the drive rollers 114 on the grab arms 94, 96.

Figure 20:
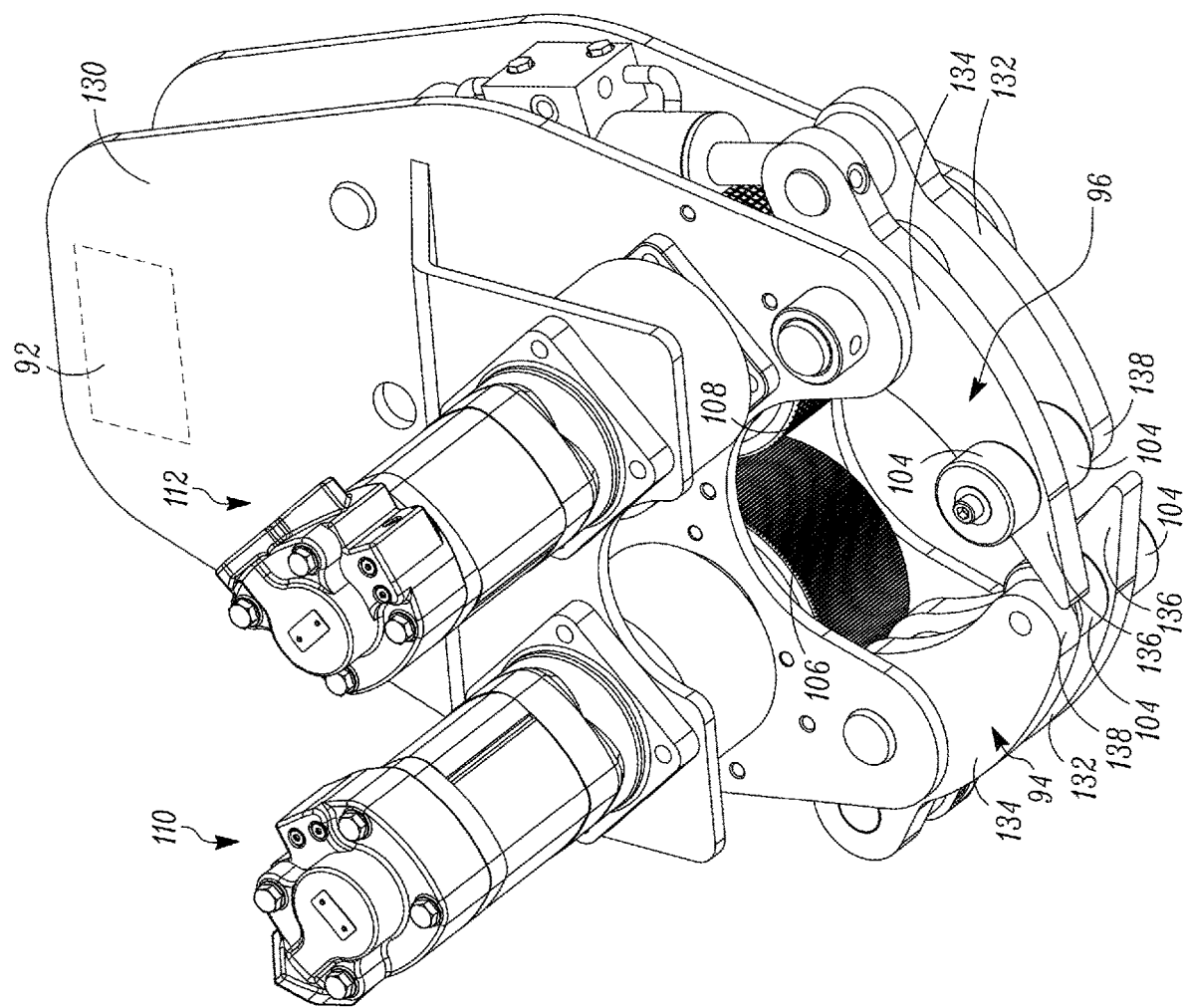
FIG. 20 is an end view of another embodiment of a pipe roller gripping assembly that can be used on the pipe handling attachment.

FIG. 20 illustrates an embodiment of a pipe roller gripping assembly that is similar to the embodiments in FIGS. 17A-C, 18, and 19 and like elements are referenced using like reference numbers. In this embodiment, the drive motors 110, 112 are mounted on the same side of the grab arm housing as in FIG. 18. The embodiment in FIG. 20 differs in that the grab arm housing 130 is formed by a pair of plates and each of the grab arms 94, 96 are disposed between the two plates so that the grab arms 94, 96 are aligned with or positioned opposite one another. The tips of the grab arms 94, 96 are modified to permit the tips to overlap when the grab arms are closed. For example, as shown in FIG. 20, each grab arm 94, 96 can be formed by a pair of grab arm plates 132, 134. The grab arm plate 132 of the grab arm 94 has an extended tip 136 while the grab arm plate 132 of the grab arm 96 has a truncated tip 138. The grab arm plate 134 of the grab arm 94 has a truncated tip 138 while the grab arm plate 134 of the grab arm 96 has an extended tip 136. When the grab arms 94, 96 are closed, the extended tips 136 overlap the opposing truncated tips 138, allowing the pipe section to be substantially encircled by the gripping assembly.

In addition, the drive rollers 106, 108 are disposed between the two plates and are horizontally aligned with one another along the x-axis direction.

Figure 21:
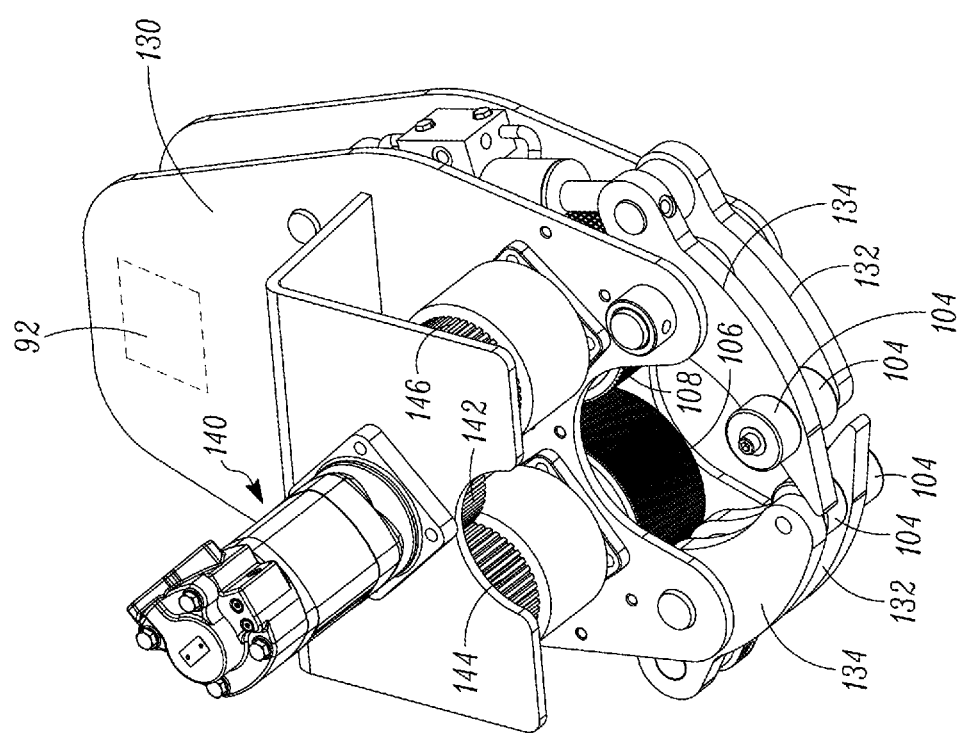
FIG. 21 is an end view of another embodiment of a pipe roller gripping assembly that can be used on the pipe handling attachment.

FIG. 21 illustrates an embodiment of a pipe roller gripping assembly that is similar to the embodiment in FIG. 20 and like elements are referenced using like reference numbers. In this embodiment, a single drive motor 140 is used to drive the drive rollers 106, 108 via a drive train that includes a central pinion gear 142 driven by the motor 140 that is engaged with driven gears 144, 146 which in turn are connected via respective shafts to the drive rollers 106, 108.

Figure 22A:
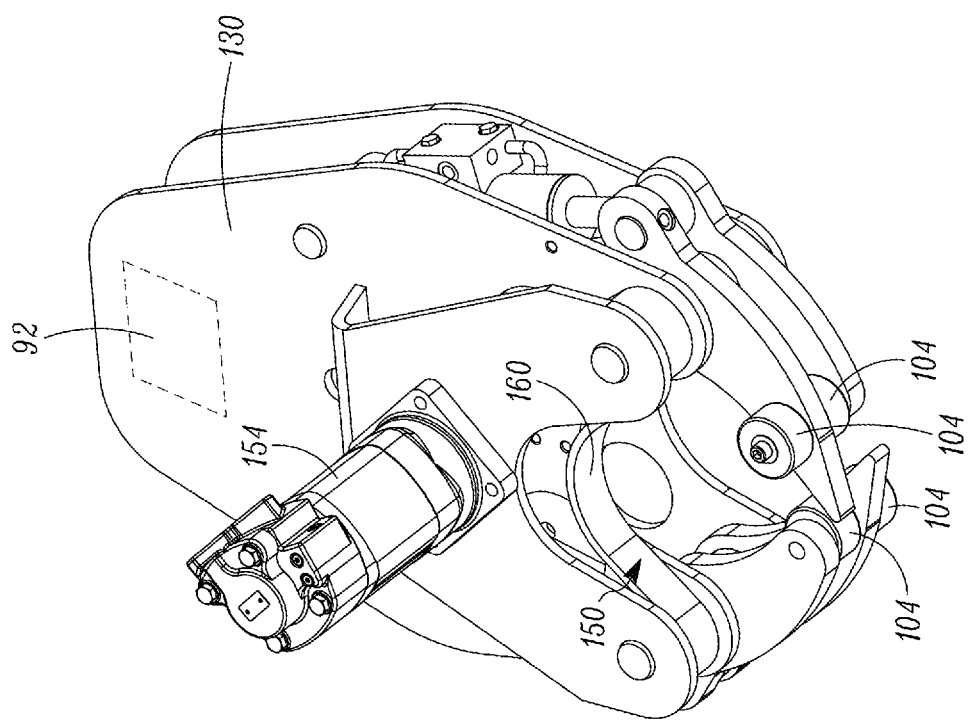
FIGS. 22A, 22B and 22C are perspective, a first sectional end view, and a second sectional end view, respectively, of another embodiment of a pipe roller gripping assembly that can be used on the pipe handling attachment.
Figure 22C:
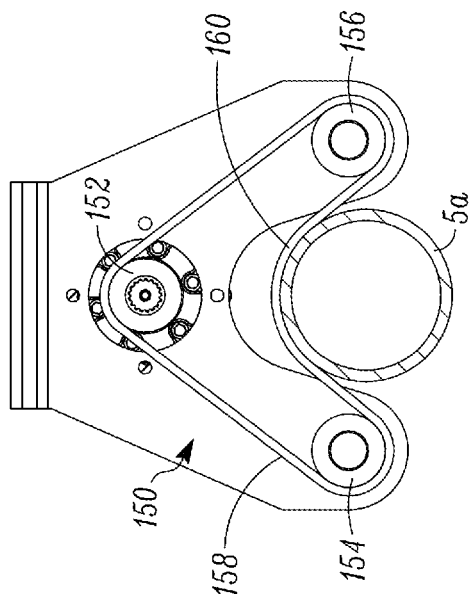
Figure 22B:
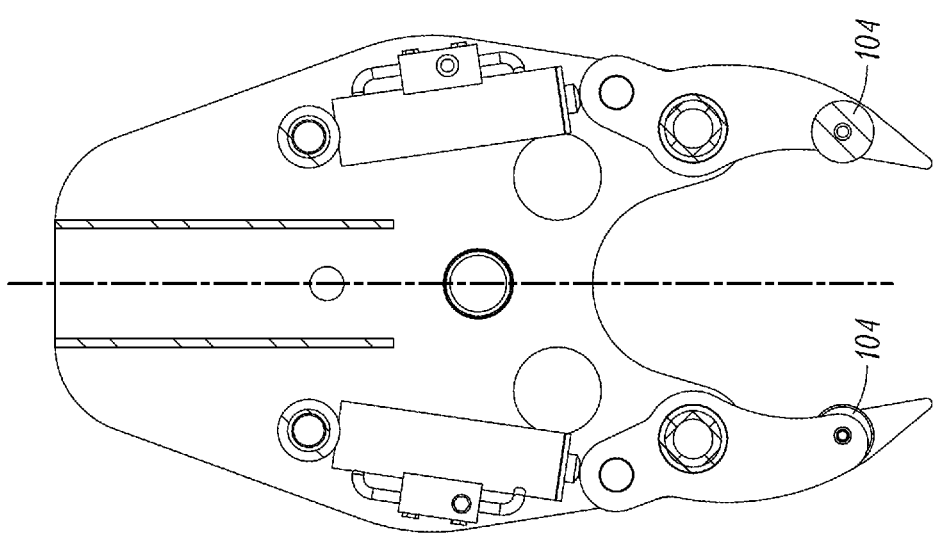

FIGS. 22A-C illustrates an embodiment of a pipe roller gripping assembly that is similar to the embodiment in FIG. 20 and like elements are referenced using like reference numbers. In this embodiment, instead of using drive rollers 106, 108 to rotate the pipe, an endless drive mechanism 150 is used to rotate the pipe 5a.

As shown in FIG. 22A, the endless drive mechanism 150 is mounted to one side of the grab arm housing 130 and includes a first driven pulley 152 driven by a drive motor 154, and a pair of idler pulleys 154, 156. As best seen in FIG. 22C, an endless drive member 158 extends around the pulleys 152, 154, 156 so that it can be rotated by the driven pulley 152. The endless drive member 158 can be any type of endless member that is suitable for driving the pipe, for example a belt, chain, cable, rope or the like. In one embodiment, the endless drive member 158 can be a belt made of a high friction, no-slip material such as rubber or other elastomeric material. The drive member 158 is long enough such that between the pulleys 154, 156, the drive member 158 can curve upward to form a curved drive section 160. In use, the drive section 160 engages the upper surface of the pipe 5a as shown in FIG. 22C such that when the drive member 158 is rotated, it causes the pipe 5a to rotate.

The pipe roller gripping assemblies illustrated in FIGS. 20, 21 and 22A-C can be used with the attachment shown in FIG. 1 in which case the grab arm housings 130 would include the rectangular opening 92 for the beam as illustrated in dashed lines in FIGS. 20, 21, 22A-C.

Figure 45:
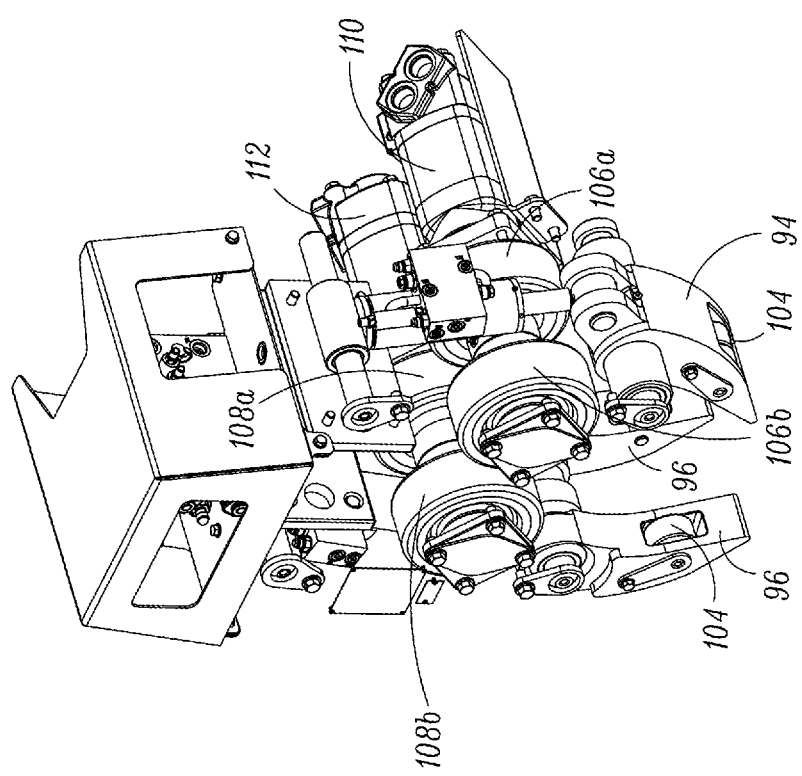
FIG. 45 illustrates still another embodiment of a pipe roller gripping assembly that can be used on the pipe handling attachment.

FIG. 45 illustrates another embodiment of a pipe roller gripping assembly can be used with the attachment shown in FIG. 1 or with any of the other attachments described and/or illustrated herein. Certain portions of the pipe roller gripping assembly, such as the grab arm housing (similar to the housing 130) having an opening (similar to the opening 92) to allow the pipe roller gripping assembly to be slidably disposed on lower gull beam 62 of the attachment, are not illustrated to better illustrate the interior components of the pipe roller gripping assembly.

In the embodiment illustrated in FIG. 45, the pipe roller gripping assembly includes the pair of drive motors 110, 112 mounted on the same side of the grab arm housing (similar to FIGS. 18 and 20). However, in this embodiment, each drive motor 110, 112 drives a pair of the drive rollers 106a, 106b, 108a, 108b. The drive rollers 106a, 106b are spaced apart from one another and rotate about the same axis. Similarly, the drive rollers 108a, 108b are spaced apart from one another and rotate about the same axis. In this illustrated example, the drive rollers 106a, 106b function together with the single grab arm 94 that includes one or more of the idler rollers 104 mounted thereon. The drive roller 108a, 108b function together with a pair of the grab arms 96 each of which includes one or more of the idler rollers 104 mounted thereof. In some situations, the use of the spaced drive roller pairs 106a, 106b, 108a, 108b achieves increased driving engagement with the outside surface of the pipe to better rotate the pipe. The use of the drive rollers pairs 106a, 106b, 108a, 108b helps to reduce or eliminate scissoring action or forces on the pipe causing the pipe to skew that can sometimes occur in the case of using a single drive roller pair.

Figure 40:
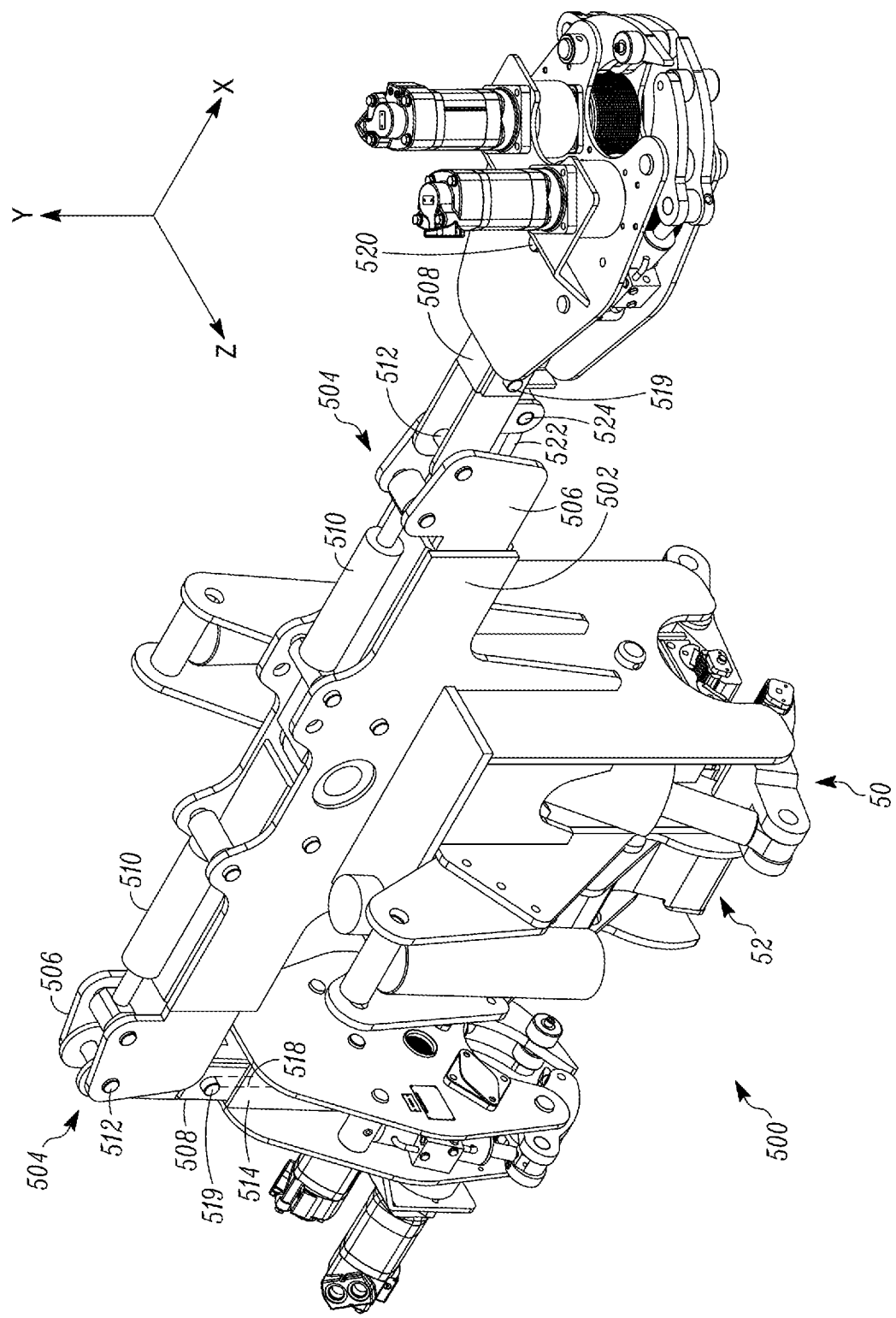
FIG. 40 illustrates another embodiment of a pipe handling attachment described herein.

In one embodiment, the pipe roller gripping assemblies illustrated in FIGS. 20, 21, 22A-C, and 45, or any of the other gripping assemblies described herein, can be used with a pipe handling attachment 500 illustrated in FIG. 40. In the attachment 500, elements that are similar or identical to elements in the pipe handling attachment 10 are referenced using the same reference numbers.

The attachment 500 includes a main beam 502 that is similar in function to the main beam 26 and which can be pivotally mounted to a lower head (not shown) which in turn can be rotatably connected to an upper head (not shown) which can be similar to those shown in FIG. 1. A pair of gull-beam assemblies 504 are provided, each of which includes an upper gull-beam 506 and a lower gull-beam 508. The upper gull-beams 506 are slidably disposed in opposite ends of the main beam 502. The upper gull-beams 506 are each slidable in the x-axis direction via an actuator 510 attached at one end to the main beam 502 and attached at its other end to the upper gull-beam 506.

Each lower gull-beam 508 is pivotally attached to the upper gull-beam 506 by pivot pin 512 that allows the lower gull-beam 508 to swing upward in the x-y plane to a raised position similar to the gull-beam assemblies 46a, 46b discussed above. The lower end of the lower gull-beam 508 is disposed between the two plates and two cross-plates that form a housing 514 on the arm housing. Therefore, the pipe roller gripping assembly is slidable on and relative to the lower gull-beam 508 in the y-axis direction.

An actuator 518 partially illustrated in dashed lines in FIG. 40 is disposed within each of the lower gull-beams 508 and is attached at one end to the lower gull-beam 508 by a pin 519 and is attached at its other end to the pipe roller gripping assembly by a pin 520. The actuator 518 can extend and retract to slide the pipe roller gripping assembly vertically up and down relative to the lower gull-beam 508 or in the y-axis direction. Extension and retraction of the actuator 510 slides the upper gull-beam 506, together with the lower gull-beam 508 and the pipe roller gripping assembly mounted thereon, horizontally or in the x-axis direction.

A third actuator 522, partially visible in FIG. 40, is disposed within the main beam 502 and is fixed to the main beam 502 and to the lower gull beam 508 by a pin 524 to swing the lower gull-beam 508 and the pipe roller gripping assembly mounted thereon upward in the x-y plane to a raised position as shown in FIG. 40 similar to the gull-beam assemblies 46a, 46b discussed above as well as back down to the lowered position shown on the left side of FIG. 40.

The operation of the pipe roller gripping assemblies will now be described. The operation will be discussed relative to one exemplary make-up operation where a section of pipe is unloaded from a pile of pipe, threading of the pipe onto a section of pipe at the tail end of a pipe string is initiated by the attachment before repositioning the attachment to the position shown in FIG. 1, once repositioned the attachment completes threading, and then the vise assembly is used to torque the joint to the proper value. It is to be realized that other sequences in the make-up operation can be used, such as the attachment being positioned as shown in FIG. 1 to initiate and complete threading of the pipe section onto the tail end of the pipe string. In addition, it is to be realized that the reverse order of operation can be used during a pipe break-out operation where after the joint is initially broken, the pipe roller gripping assemblies unthread the pipe section and then stack the pipe section in a pipe rack.

The attachment 10 is lowered toward the pile of pipe using the boom arm 14 (FIG. 13) in order to pick up the section of pipe to be threaded onto the pipe string. The orientation of the main beam 26 relative to the pipe can be adjusted, if necessary, via the various adjustment capabilities of the attachment 10 discussed above, including using the prime mover actuator 22 to tilt the attachment 10, rotating the lower head 24 about the y-axis, using the tilt actuator 30 to tilt the main beam 26 about the axis z-axis as described above, and adjusting the positions of the pipe roller gripping assemblies.

Once the main beam 26 is correctly aligned with the pipe, the attachment 10 is lowered further toward the pipe. Once the pipe is positioned in the area between the grab arms and the pipe drive rollers 106, 108 with the pipe drive rollers firmly positioned tangent to the pipe, the grab arms are actuated to the closed position.

Once the pipe is secured in the pipe roller gripping assemblies, the pipe is picked up. Referring to FIG. 1, the pipe 5a is then carried by the attachment 10 to a position adjacent to a tool joint 172 of a pipe 5b that is sticking out of the ground and to which a tool joint 170 of the pipe 5a will be connected. The prime mover operator then uses the various adjustment capabilities of the attachment to align the tool joint 170 of the pipe 5a to the tool joint 172 of the pipe 5b. It is expected that the operator would typically position the tool joints of the pipes to, for example, approximately one inch apart using the prime mover. The pipe roller gripping assemblies 42a, 42b can be shifted left or right in the x-axis direction relative to the main beam 26 in order to permit axial shifting of the gripping assemblies 42a, 42b during the threading (or unthreading during break-out) operation.

Figure 42C:
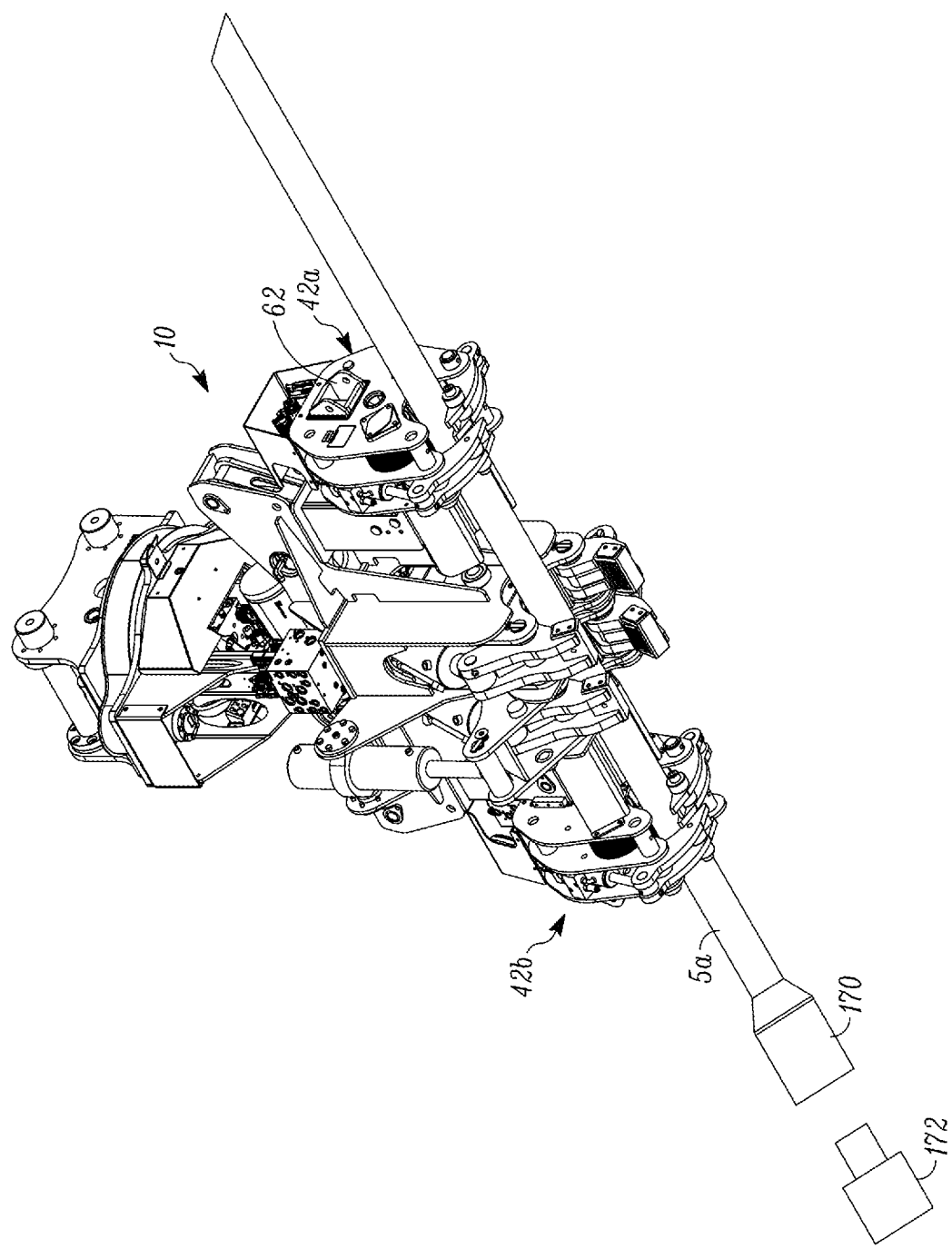

For example, with reference to FIGS. 42A-C, an example of the attachment 10 being used to pick up a pipe section 5a, for example from the ground or from a pipe stack, and maneuvering the pipe section 5a to bring it close to the pipe section 5b for threading is illustrated. In FIG. 42A, the pipe section 5a has been picked up by the attachment 10. The pipe section can then be brought toward the pipe section 5b to which the pipe section 5a is to be threaded onto.

FIG. 42B shows the attachment 10 holding the pipe section 5a close to the pipe section 5b, and the pipe roller gripping assemblies 42a, 42b being shifted to the left on the lower gull-beams 62 which shifts the pipe section 5a in the x-direction toward the end of the pipe section 5b. The pipe roller gripping assemblies 42a, 42b are shifted on the lower gull-beams 62 using the actuators 70 and the pins 78 as described above.

Instead of shifting the pipe section 5a to the left, FIG. 42C illustrates the pipe roller gripping assemblies 42a, 42b being shifted to the right on the lower gull-beams 62 which shifts the pipe section 5a in the x-direction away from the end of the pipe section 5b using the actuators 70 and the pins 78 as described above.

Once the tool joints 170, 172 are aligned, the gripping assemblies 42a, 42b are then axially shifted in the appropriate direction until the threads on the tool joints 170, 172 just engage to permit threading. Once the tool joints 170, 172 are touching, the pipe rotator motors are started which rotate the pipe drive rollers 106, 108 thereby rotating the pipe 5a about its longitudinal axis. This threads the tool joint 170 of the pipe 5a onto the tool joint 172 of the pipe 5b until the threads are fully seated. The pipe grab arms are then opened to allow repositioning of the attachment 10 to the position shown in FIG. 1 over the joint. If the pipe roller gripping assemblies 42a, 42b are not needed to further rotate the pipe 5a, the gull-beam assemblies 46a, 46b can be pivoted upward to the raised position shown in FIG. 2. Or, in the case of standard pipe not involving a pipe accessory such as a reamer, the gull-beam assemblies 42a, 42b and the gripping assemblies 42a, 42b mounted thereon can remain in position.

During threading and unthreading, the threads on the tool joints 170, 172 will tend to cause one or both of the pipes 5a, 5b to move axially toward each other. Typically, in a long pipe string, the pipe 5b will not be able to move axially in which case the pipe 5a must be allowed some axial movement. Since the pipe 5a is securely gripped by the assemblies 42a, 42b, axial movement of the pipe 5a relative to the assemblies 42a, 42b is not permitted. Instead, it is believed that the boom arms 14 on many prime movers, such as excavators, have enough play in them to permit the boom arm 14 to move in a direction to allow the pipe 5a to move axially toward the pipe 5b. In the event that the boom arm 14 does not have any or a sufficient amount of play, another means of accommodating the axial movement will need to be provided.

For example, as discussed above in FIGS. 15A-B and 16A-B, the gripping assemblies 42a, 42b can be shifted axially using the cylinder 70. During threading or unthreading when axial shifting of the pipe 5a is required, the cylinders 70 of the gull-beam assemblies 46a, 46b can be put into a floating mode allowing free axial shifting of the assemblies 42a, 42b on the gull-beam assemblies 46a, 46b. This will permit the axial shifting of the pipe 5a during threading and unthreading. Once threading or unthreading is complete, the cylinders 70 can be locked to maintain the axial positions of the assemblies 42a, 42b.

The prime mover then lifts the attachment 10 off of the pipe 5a to reposition the attachment for use of the make/break vise assembly 40. The pipe 5a is now self-supporting since it is now threaded onto the pipe 5b. The make/break vise assembly 40 is then used to torque the joint between the pipes 5a, 5b and complete the threading of the pipe 5a onto the pipe 5b.

The gripping of the pipe 5a by the assemblies 42a, 42b is sufficient to securely hold the pipe 5a at all angles, including holding the pipe 5a vertically for connection to a vertical pipe that is extending out of the ground.

Make/Break Vise Assembly

The make/break vise assembly 40 will now be described with reference to FIGS. 23A-B, 24A-B and 25-39. The make/break vise assembly 40 is used to torque the tool joint 170, 172 between the pipes 5a, 5b and finish connecting the pipes, or to initiate breaking of the tool joints between the two pipes.

As described above, the make/break vise assembly 40 includes the stationary vise 50 and the make/break vise 52.

The stationary vise 50 is configured to clamp onto and hold a tool joint on one side of the joint using the vise arm assembly 56a, while the make/break vise 52 is configured to clamp onto the other tool joint of the second pipe on the other side of the joint using the vise arm assembly 56b and rotate the second pipe relative to the first pipe.

Many different configurations of the stationary vise 50 and the make/break vise 52 are possible. Regardless of the specific construction, the stationary vise 50 and the make/break vise 52 each include a vise arm assembly for securely clamping onto and holding a respective tool joint. In addition, the make/break vise 52 is configured to be rotatable relative to the stationary vise 50 torque the joint between the two pipes or break the joint between the two pipes.

It is to be understood that the stationary vise 50 could instead be the make/break vise, and the make/break vise 52 could instead be the stationary vise. In addition, it is to be understood that the stationary vise 50 could also be configured as a make/break vise 52 so that the make/break vise assembly 40 includes two make/break vises, with the make/break vises being configured to permit one of them to be selectively fixed so as to function as the stationary vise.

The stationary vise 50 and the make/break vise 52 are each configured to be removable/replaceable as discussed further below with respect to FIG. 3B.

Figure 23B:
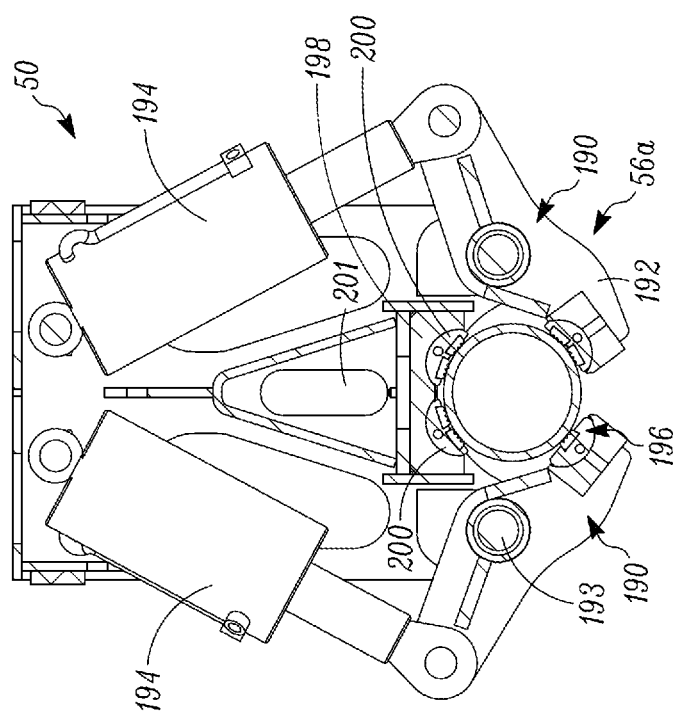
FIGS. 23A and 23B are perspective and end views, respectively, of the stationary vise of the vise assembly.
Figure 23A:
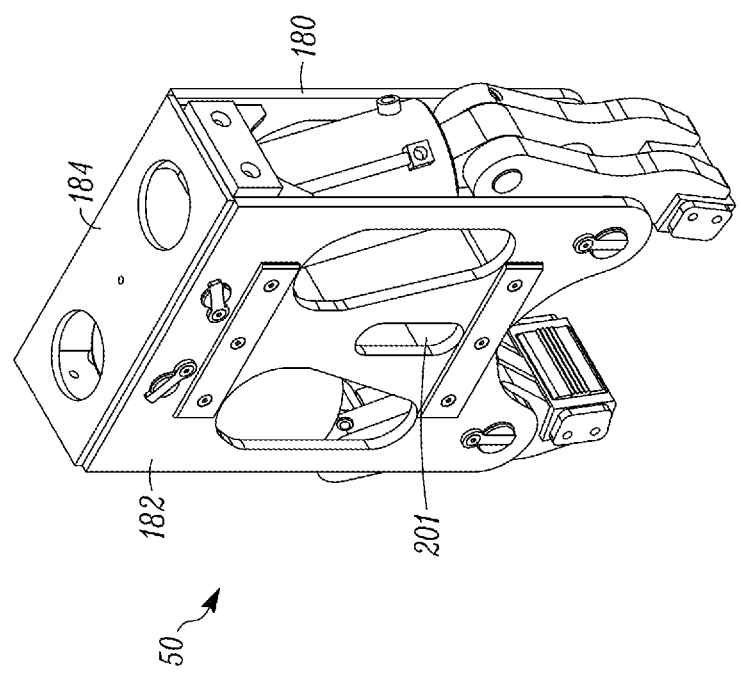

With reference to FIGS. 23A-B, in one embodiment the stationary vise 50 is configured generally similar to a box with a pair of spaced side plates 180, 182 and a top plate 184. As best seen in FIGS. 3A and 3B, the stationary vise 50 is attached to the main beam 26 by being removably disposed within a housing structure formed by a side plate 185, a side plate 212, and front and rear plates 187a, 187b. The plates 185, 212, 187a, b are fixed to the main beam 26 and define a generally rectangular housing that receives the stationary vise 50 therein. Gusset plates 186 are connected between the main beam 26 and the side plate 185 to help stiffen the side plate 185.

As shown in FIGS. 23A and 23B, aligned vertical slots 201 are formed in the side plates 180,182. A pin 218 extends through the slots 201 and through the make/break vise 52 to secure the stationary vise 50 in the housing structure. The slots 201 permit vertical movements of the stationary vise 50 within the housing structure formed by the plates 185, 212, 187a, 187b so that the stationary vise 50 can freely float vertically up and down a distance determined by the pin 218 in the slots 201.

With reference to FIG. 23B in which the plate 182 is removed for clarity, the vise arm assembly 56a of the stationary vise 50 is visible. The vise arm assembly 56a includes a pair of opposing, identical arm assemblies 190. Each arm assembly 190 includes a grab arm 192 that is pivotally mounted by a pivot pin 193 to the side plates 180, 182. One end of the grab arm 192 is attached to an actuator 194 which can be, for example, a hydraulic, pneumatic, electrical or mechanical actuator that can extend and retract to pivot the grab arm 192. The other end of the grab arm 192 has a gripping die 196 mounted thereto that is configured to securely grip and hold the outer surface of the pipe and prevent slipping between the pipe and the gripping die 196. FIG. 23A shows the actuators 194 retracted so that the arm assemblies 190 are pivoted to an open position so as to receive the respective tool joint. FIG. 23B shows the actuators 194 extended so that the arm assemblies are pivoted to a closed position securely gripping the pipe.

Referring again to FIG. 23B, to further help securely hold the pipe, the stationary vise 50 further includes a vise block assembly 198 mounted therein at the top of the pipe receiving area. The vise block assembly 198 includes a pair of fixed gripping dies 200 that are arranged relative to each other to form generally a V-shape to help clamp and hold the pipe when the arm assemblies 190 are closed.

Figure 24B:
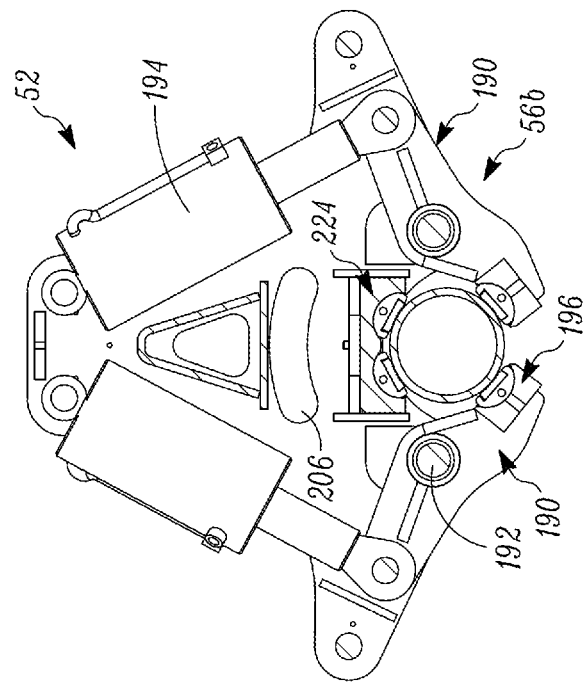
FIGS. 24A and 24B are perspective and end views, respectively, of the make/break vise of the vise assembly.
Figure 24A:
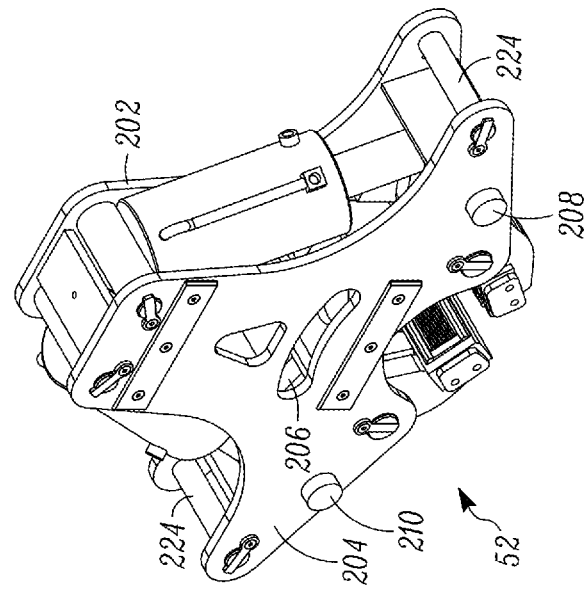

With reference to FIGS. 24A-B, in one embodiment the make/break vise 52 includes a pair of spaced side plates 202, 204. Each plate 202, 204 includes a curved guide slot 206 formed therein (the guide slot 206 in the plate 202 is visible in FIG. 3B). Each plate 202, 204 also includes a pair of guide pins 208, 210 (the guide pins 208, 210 on the plate 202 are visible in FIG. 3B).

Figure 4:
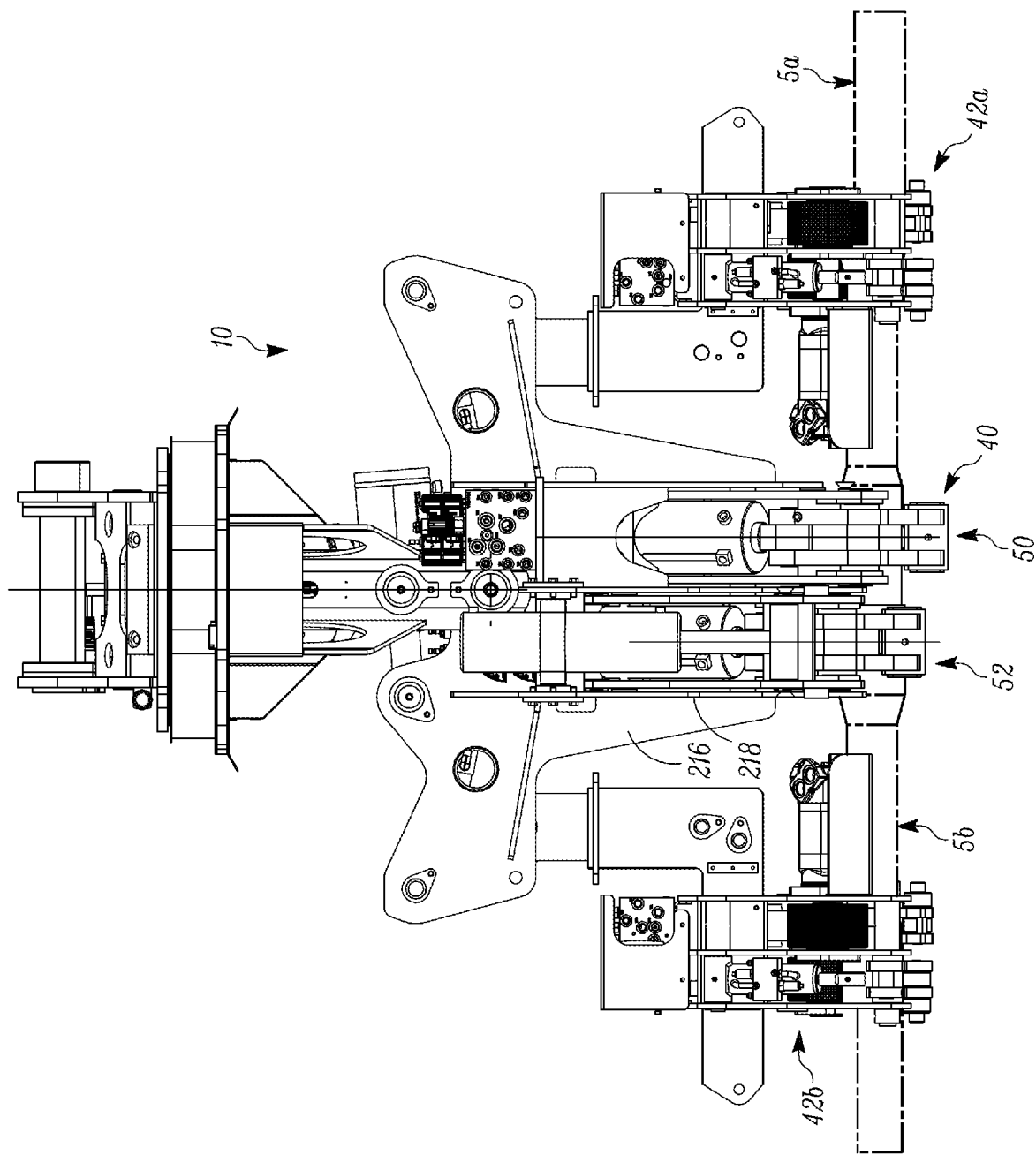
FIG. 4 is a side view of the pipe handling attachment shown gripping two sections of pipe and with the vise assembly ready to initiate pipe break-out to begin disconnection of the pipe sections or to torque the joint to complete connection.

As best seen in FIGS. 1, 3A, 3B, 4, 5B, 6B, 7A and 7B, the side plates 202, 204 are rotatably disposed between the plate 212 and a similar plate 214. Gusset plates 216 extend between the plate 214 and the main beam 26. As best seen in FIGS. 1, 3B and 4, the pin 218 extends through the plates 212, 214, and through the guide slots 206, to secure the make/break vise 52 between the plates 212, 214. Because the pin 218 extends through the guide slots 206, the make/break vise 52 can rotate relative to the stationary vise 50 and relative to the plates 212, 214 a distance determined by the length of the guide slots 206. If the pin 218 is removed as shown in FIG. 3B, the stationary vise 50 and the make/break vise 52 can drop from their respective housings for removal.

In addition, as best seen in FIGS. 5B, 6B and 7A-B, the guide pins 208, 210 ride on contoured edges 220 of the plates 212, 214 to help guide the movement of the make/break vise 52 as it rotates.

With reference to FIGS. 1, 3A, 7A-B and 24A, rotation of the make/break vise 52 is achieved using a pair of actuators 222 that are attached to the plates 212, 214 at one end and attached at the other end to pins 224 on the plates 202, 204. The actuators 222 can be, for example, hydraulic, pneumatic, electrical or mechanical actuators that can extend and retract to rotate the make/break vise 52 in either the counterclockwise or clockwise directions shown in FIGS. 7A-B.

With reference to FIG. 24B in which the plate 204 is removed for clarity, the vise arm assembly 56b of the make/break vise 52 is visible. The vise arm assembly 56b is substantially identical in construction and operation to the vise arm assembly 56a of the stationary vise 50 and like elements are referenced using the same reference numbers, and is therefore not described herein in detail. The make/break vise 52 also includes a vise block assembly 224 that is substantially identical in construction and operation to the vise block assembly 198 in the stationary vise 50 and like elements are referenced using the same reference numbers, and the vise block assembly 224 is therefore not described herein in detail.

Vise Block Assemblies

Different embodiments of the vise block assemblies 198 and 224 will now be described. As indicated above, the vise block assemblies 198, 224 can be identical in construction to one another and for the sake of convenience, the vise block assemblies 198, 224 will be described as being identical to one another. However, the construction of the vise block assemblies 198, 224 need not be the same so that the construction of the vise block assembly 198 can be different from the construction of the vise block assembly 224.

Figure 25A:
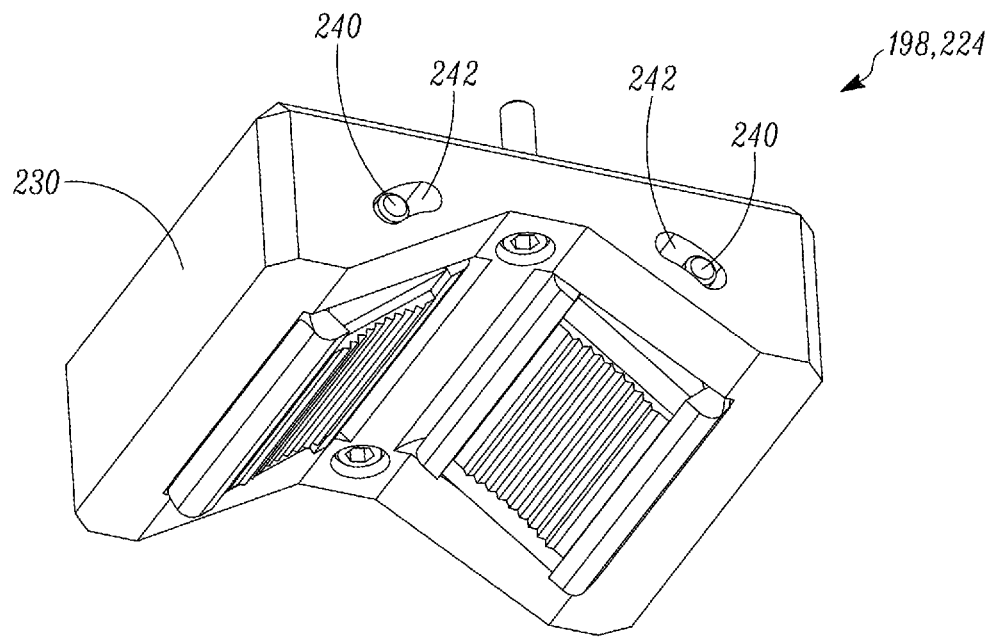
FIGS. 25A and 25B are perspective and end sectional views, respectively, of one embodiment of a vise block assembly that can be used in either or both of the make/break vise and the stationary vise.
Figure 25B:
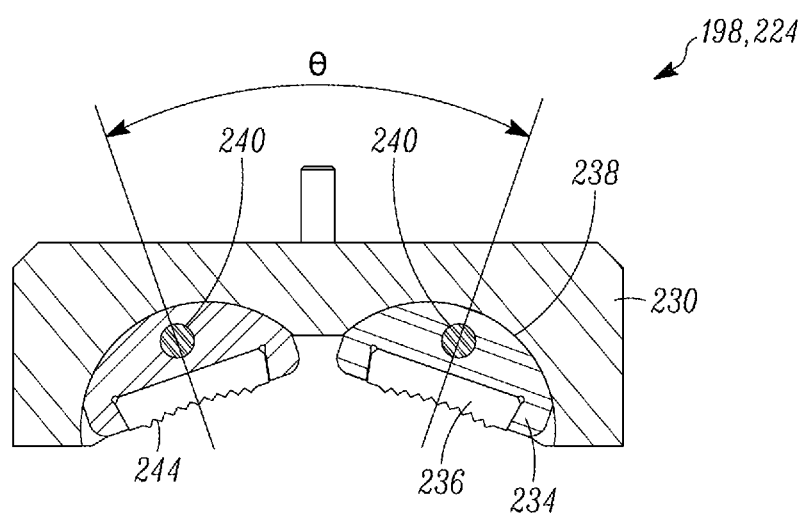

With reference to FIGS. 25A-B, one embodiment of the vise block assemblies can include a die mount 230 with one or more fasteners 232 that fix the die mount 230 to the stationary vise 50 or the make/break vise 52. The pipe facing surface of the die mount 230 is generally V-shaped and defines a pair of die holding areas that receive a pair of die holders 234 on which tong dies 236 are mounted. In this embodiment, the die holding areas are curved, and an upper side 238 of each die holder 234 is correspondingly curved. A guide pin 240 extends through each die holder 234 and into slots 242 formed in the sides of the die mount 230.

With the described construction, the tong dies 236 are generally oriented in a V-shape at an angle θ. In addition, each tong die 236 can self-adjust its position via the die holder 234 rotating in the die mount 230 guided by the guide pin 240.

Each tong die 236 includes a pipe facing surface 244 that is serrated, knurled or provided with other grip enhancing features to increase the grip on the pipe surface.

Figure 26A:
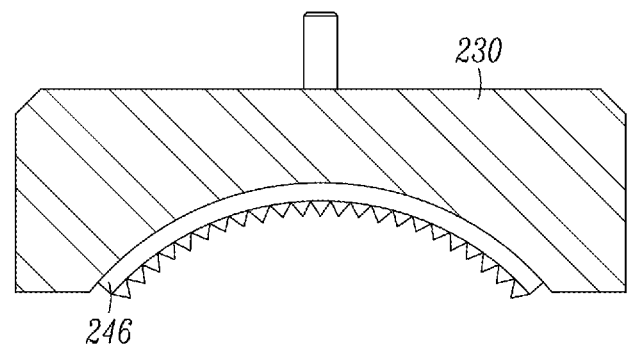
FIG. 26A is an end sectional view of another embodiment of a vise block assembly that can be used in the either or both of the make/break vise and the stationary vise.
Figure 26:
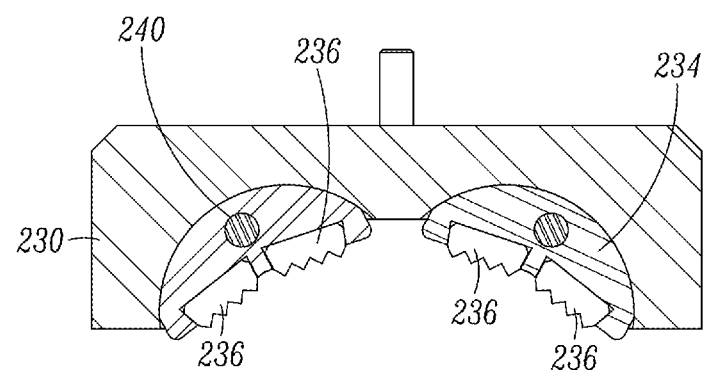
FIG. 26 is an end sectional view of another embodiment of a vise block assembly that can be used in the either or both of the make/break vise and the stationary vise.

FIG. 26 illustrates an embodiment that is similar to FIGS. 25A-B, but instead of a single tong die 236 on each die holder, each die holder 234 supports a pair of tong dies 236. The construction and operation of the embodiment in FIG. 26 is otherwise identical to FIGS. 25A-B and like elements are referenced using the same reference numbers.

FIG. 26A illustrates an embodiment that is similar to FIG. 26 but uses a single, continuous rounded tong die 246 removably mounted on the die mount 230.

Figure 27A:
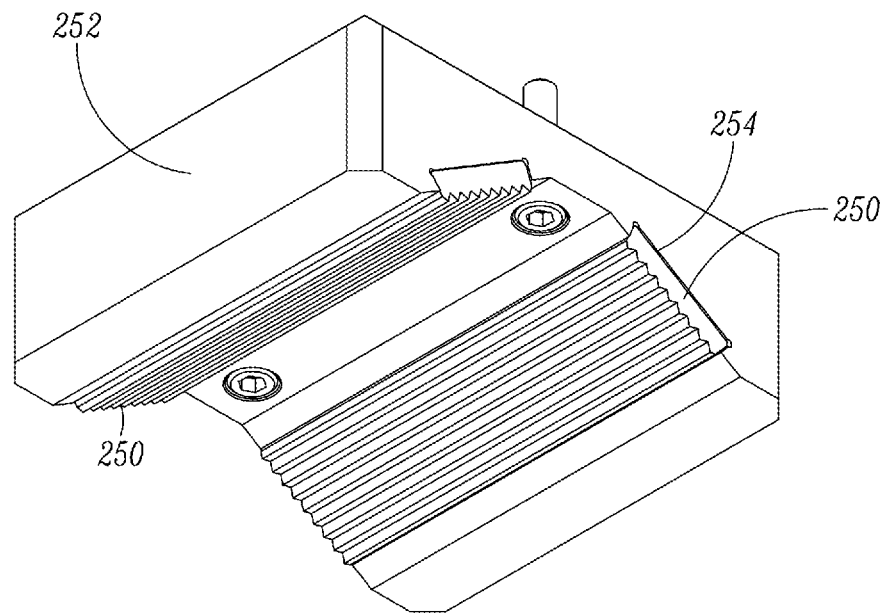
FIGS. 27A and 27B are perspective and end sectional views, respectively, of another embodiment of a vise block assembly that can be used in either or both of the make/break vise and the stationary vise.
Figure 27B:
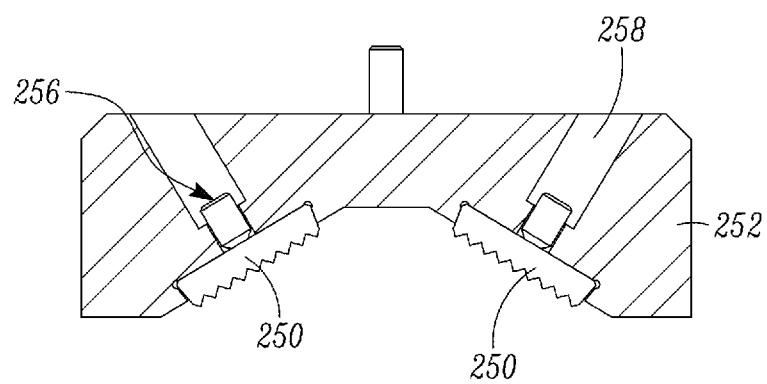

FIGS. 27A-B illustrate an embodiment with tong dies 250 that are fixed in position on a die mount 252. In this embodiment, the tong dies 250 are slid into channels 254 formed in the die mount 252, and are locked in position in the channels 254 via one or more fasteners 256 disposed on the backsides of the tong dies 250 that are accessible via one or more corresponding holes 258 formed on the backside of the die mount 252.

Arm Assemblies

Different embodiments of the arm assemblies 190 of the vise arm assemblies 56a, 56a of the stationary vise 50 and the make/break vise 52 will now be described. As indicated above, the arm assemblies 190 used in the vise arm assemblies 56a, 56b can be identical in construction to one another and for the sake of convenience, the arm assemblies 190 will be described as being identical to one another. However, the construction of the arm assemblies 190 need not be the same so that the construction of the arm assemblies 190 used in the vise arm assembly 56a of the stationary vise 50 can be different from one another as well as be different from the arm assemblies 190 used in the vise arm assembly 56b of the make/break vise 52.

Figure 28A:
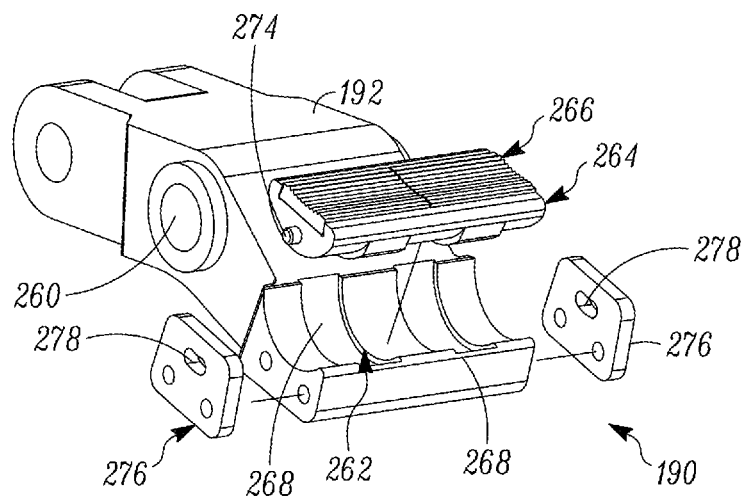
FIGS. 28A, 28B and 28C illustrate an embodiment of an arm assembly that can be used in either or both of the make/break vise and the stationary vise.
Figure 28B:
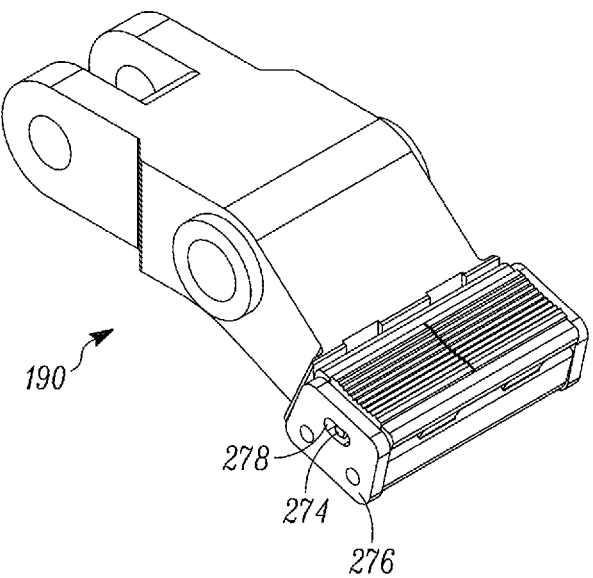
Figure 28C:
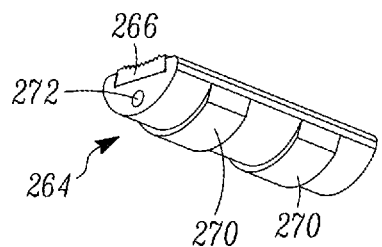

With reference to FIGS. 28A-C, the arm assembly 190 includes the arm 192 with a hole 260 for receiving the pivot pin 193 as discussed above for FIG. 23B. An end of the arm 192 includes a curved mounting section 262 that receives a die holder 264 supporting one or more tong dies 266. The mounting section 262 includes a plurality of spaced grooves 268 and, as best seen in FIG. 28C, the backside of the die holder 264 includes a corresponding plurality of tongues 270 that fit it the grooves 268 when assembled. The grooves 268 and tongues 270 permit the die holder 264 to rotate relative to the mounting section 262, while help to retain the side-to-side position of the die holder 264.

The die holder 264 includes a through hole 272 that receives a pin 274. End plates 276 are fixed to the die holder 264 to close the ends of the mounting section 262. Each end plate 276 includes a curved slot 278 which receives an end of the pin 274 as seen in FIG. 28B. When assembled, the end plates 276 help retain the tong dies 266 on the die holder 264, and retains the die holder 264 on the mounting section 262, while allowing the die holder 264 to rotate relative to the mounting section over the length of the slots 278 in the end plates 276. The rotation of the die holder 264 allows the die holder to self-adjust to the pipe to be gripped to ensure optimal grip of the tong dies 266 on the pipe surface.

Figure 29A:
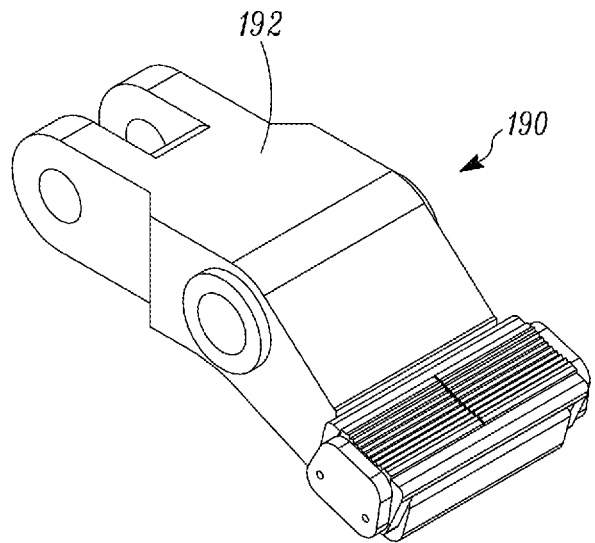
FIGS. 29A and 29B illustrate another embodiment of an arm assembly that can be used in either or both of the make/break vise and the stationary vise.
Figure 29B:
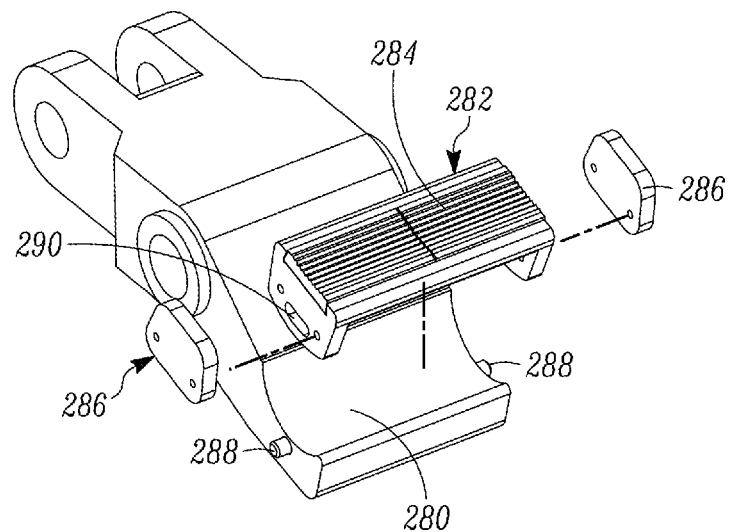

FIGS. 29A-B illustrate another embodiment where elements similar to those in FIGS. 28A-C are referenced using the same reference numbers. The arm 192 includes a mounting section 280, a die holder 282 holding one or more tong dies 284, and end plates 286. A pin or pins 288 project from the arm 192 near the mounting section 280, and curved slots 290 are formed in the die holder 282 at the ends thereof. In use, the die holder 282 is disposed in the mounting section 280 with the pins 288 disposed in the curved slots 290. The end plates 286 are then fixed to the ends of the die holder 282. The die holder 282 can therefore rotate relative to the mounting section over the length of the slots 290. The rotation of the die holder 264 allows the die holder to self-adjust to the pipe to be gripped to ensure optimal grip of the tong dies 284 on the pipe surface.

Figure 30A:
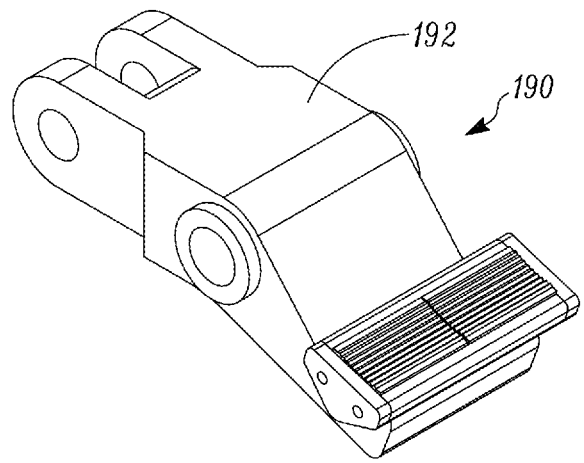
FIGS. 30A, 30B and 30C illustrate another embodiment of an arm assembly that can be used in either or both of the make/break vise and the stationary vise.
Figure 30B:
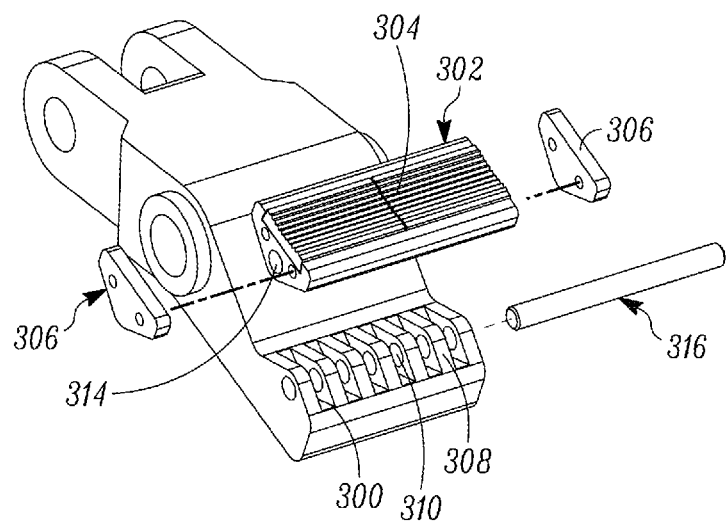
Figure 30C:
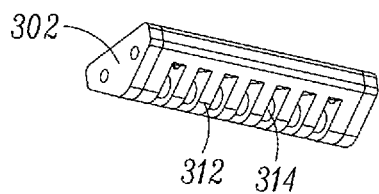

FIGS. 30A-C illustrate another embodiment where elements similar to those in FIGS. 28A-C are referenced using the same reference numbers. The arm 192 includes a mounting section 300, a die holder 302 holding one or more tong dies 304, and end plates 306. The mounting section 300 is formed with a plurality of spaced teeth 308 each provided with a hole 310, and as illustrated in FIG. 30C, the backside of the die holder 302 is formed with a plurality of teeth 312 each provided with a hole 314. The teeth 312 on the die holder 302 fit between the teeth 308 on the mounting section 300 with the holes 310, 314 aligned with each other. A hinge pin 316 then extends through the aligned holes 310, 314 to secure the die holder 302 to the arm 192. The plates 306 are then secured to the ends of the die holder 302. The die holder 302 can therefore rotate relative to the mounting section, which allows the die holder 302 to self-adjust to the pipe to be gripped to ensure optimal grip of the tong dies 304 on the pipe surface.

Figure 31A:
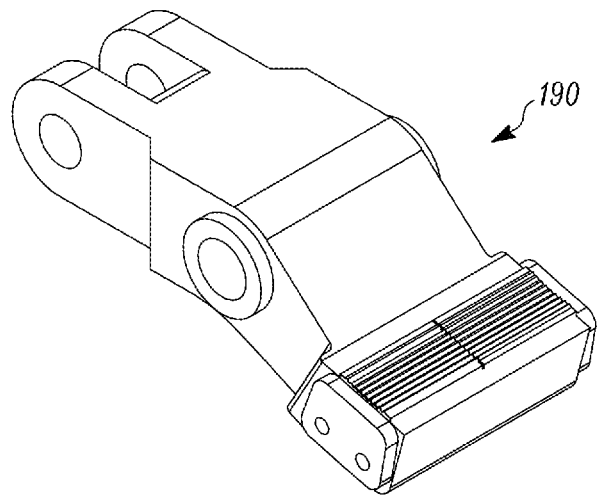
FIGS. 31A and 31B illustrate another embodiment of an arm assembly that can be used in either or both of the make/break vise and the stationary vise.
Figure 31B:
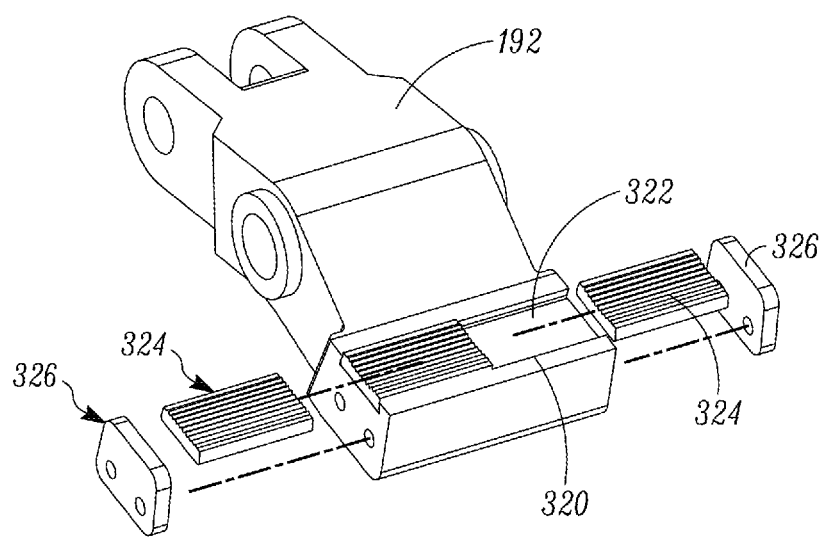

FIGS. 31A-B illustrate another embodiment where elements similar to those in FIGS. 28A-C are referenced using the same reference numbers. In this embodiment, the dies are not self-adjusting but are instead fixed in position on the arm 192. The arm includes a mounting section 320 formed with a channel 322 into which one or more tong dies 324 can be slid to mount the tong dies 324 to the arm 192. End plates 326 are then fastened to the arm 192 to cover the ends of the channel 322 and thereby lock the tong dies 324 in position.

Figure 32A:
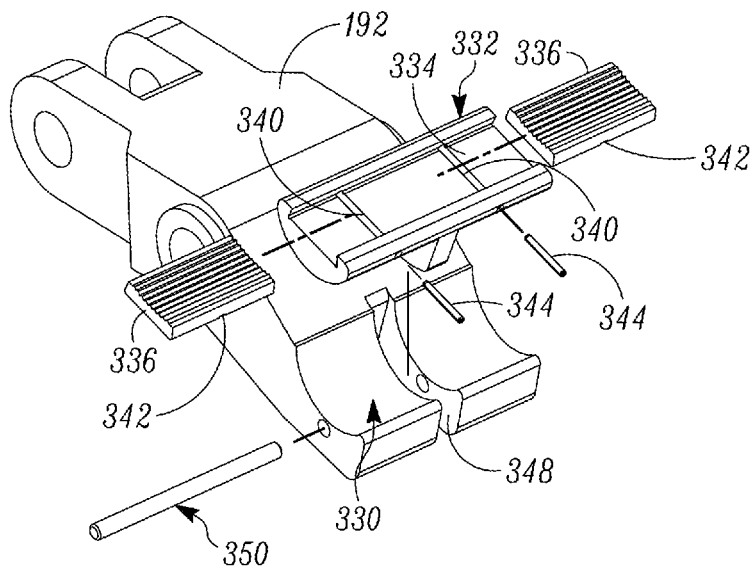
FIGS. 32A, 32B and 32C illustrate another embodiment of an arm assembly that can be used in either or both of the make/break vise and the stationary vise.
Figure 32B:
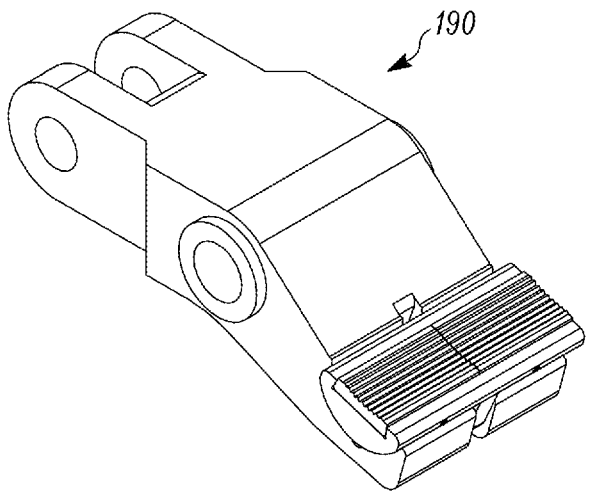
Figure 32C:
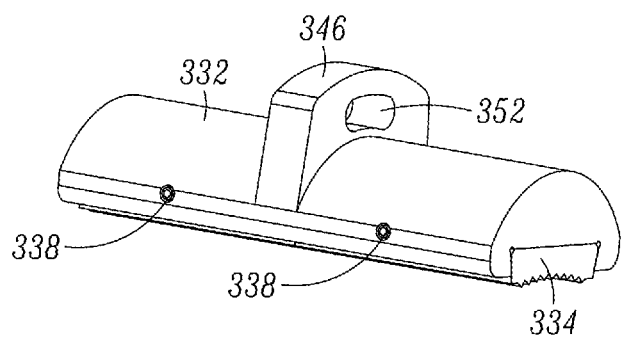

FIGS. 32A-C illustrate another embodiment where elements similar to those in FIGS. 28A-C are referenced using the same reference numbers. The arm 192 includes a mounting section 330, and a die holder 332 that is formed with a channel 334 into which one or more tong dies 336 can be slid to mount the tong dies 336 to the die holder 332. The die holder 332 includes holes 338 and grooves 340 in the channel 334. The base of each tong die 336 includes a groove 342 that in use is positioned opposite to and aligned with the grooves 340. Die pins 344 extend through the holes 338 and into the aligned grooves 340, 342 to lock the tong dies 336 to the die holder 332. The die holder 332 also includes a tongue 346 that extends into a channel 348 in the mounting section 330, and a pin 350 extends through the mounting section 330 and through a curved groove 352 formed in the tongue 346 to secure the die holder 332 to the arm 192. The die holder 332 can therefore rotate relative to the mounting section 330, which allows the die holder 332 to self-adjust to the pipe to be gripped to ensure optimal grip of the tong dies 336 on the pipe surface.

Figure 33A:
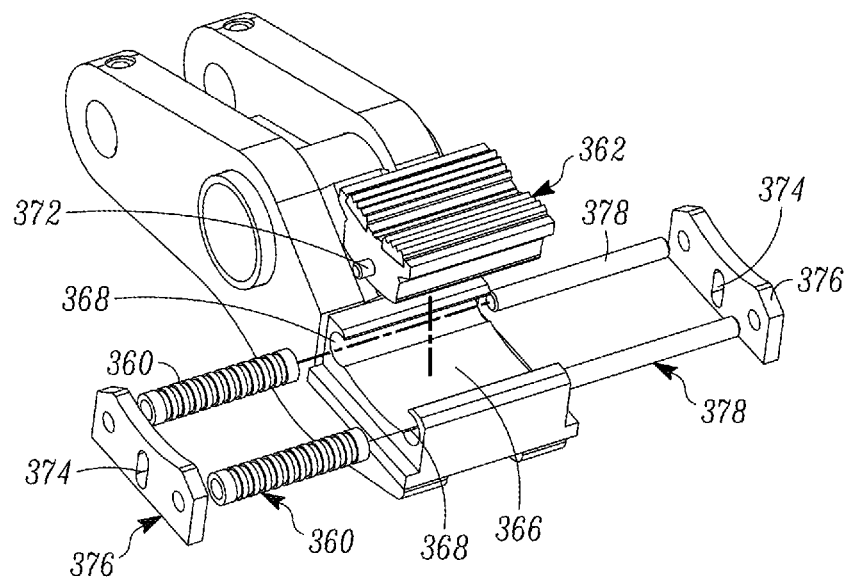
FIGS. 33A, 33B and 33C illustrate another embodiment of an arm assembly that can be used in either or both of the make/break vise and the stationary vise.
Figure 33B:
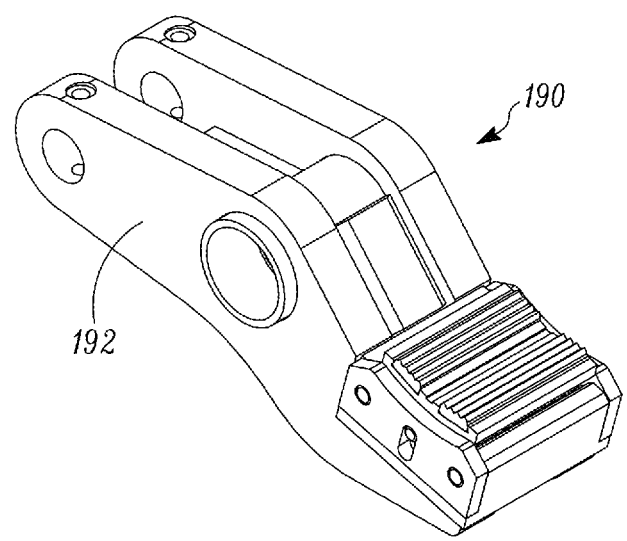
Figure 33C:
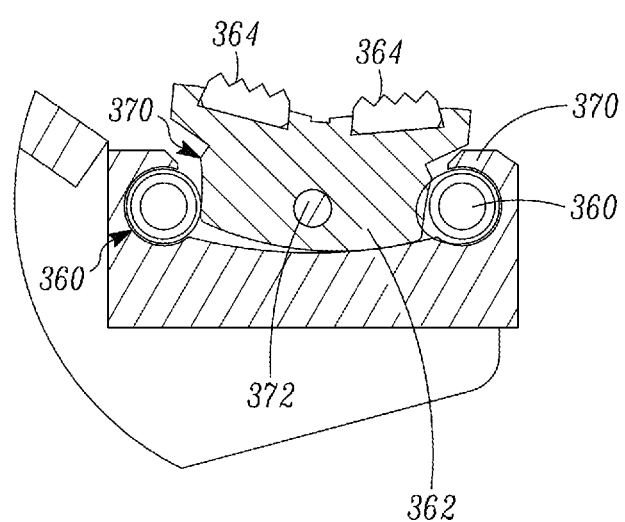

FIGS. 33A-C illustrate another embodiment where elements similar to those in FIGS. 28A-C are referenced using the same reference numbers. In this embodiment, cam rollers 360 are provided to help frictionally hold or clamp a die holder 362 holding one or more tong dies 364 in position after the die holder self-adjusts to the contour of the pipe being clamped. The cam rollers 360 have a profile in cross-section that is slightly eccentric and are designed to engage with the die holder to frictionally hold the die holder in place when a pipe is clamped.

The arm 192 includes a mounting section 366 that receives the die holder 362 and the cam rollers 360 as shown in FIG. 33C. In particular, the mounting section 366 includes a pair of curved sections 368 that receive the cam rollers 360. The fore and aft surfaces of the die holder 362 includes a projection with opposite contour surfaces 370 that are slightly inwardly concave to contact the cam rollers 360. The projection of the die holder 362 also includes a pin or pins 372 that in use are disposed within grooves 374 formed in end plates 376. The cam rollers 360 may be either hollow or solid, and in the illustrated embodiment roller pins 378 extend through the cam rollers 360 and into the endplates 376.

In use, the die holder 362 can float on the arm 192 and can pivot about the pin 372. When the pipe is clamped, the dies 364 first contact the pipe. As the pipe is contoured, either extreme of the die 364 may contact the pipe initially, causing rotation of the die holder 362 within the mounting section 366. As the cam rollers 360 and the contour surfaces 370 are in slight contact, the clamping caused by actuating the arm 192 causes the die holder 362 to retreat into the mounting section 366. This in turn causes the cam rollers 360 to rotate, causing the eccentric surfaces on the cam rollers 360 and the contour surface 370 to reduce clearance and in fact induce interference. The interference created causes a perpendicular force to be generated to clamp the die holder 362 in place. In this manner, the die holder 362 may adjust in any number of infinite positions to apply even clamp load to the pipe for the application of force for the range of pipe instead of having limited adjustment via a pivot or curved surface.

The pins 372 are placed within the grooves 374 to keep the die holder 362 from falling out of the mounting section 366. Any number of tong dies 364 may be used based in part on a number of factors, including the specific application.

The range of pipe to be clamped spans a great range of diameters, and pivot or curved mating surfaces have limited adjustability. However, the design in FIGS. 33A-C has unlimited adjustability for clamping onto pipe or any other number of eccentric surfaces, especially when pipe becomes out-of-round due to a number of torqueing operations.

Figure 34A:
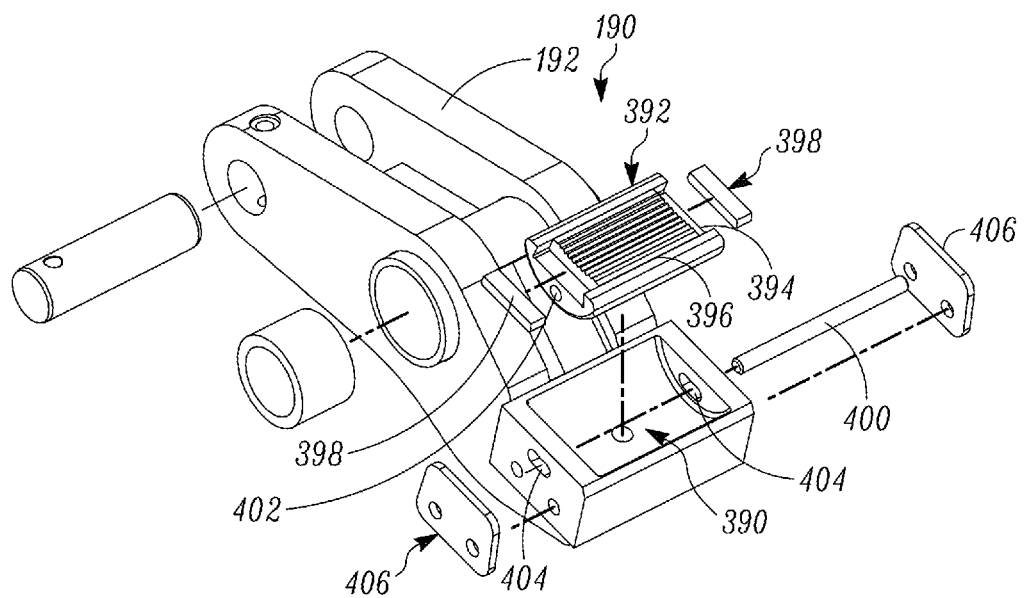
FIGS. 34A and 34B illustrate another embodiment of an arm assembly that can be used in either or both of the make/break vise and the stationary vise.
Figure 34B:
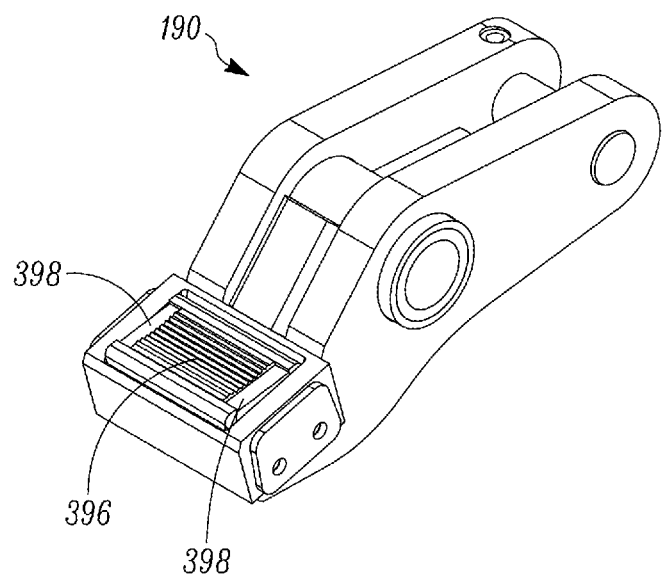

FIGS. 34A-B illustrate another embodiment where elements similar to those in FIGS. 28A-C are referenced using the same reference numbers. The arm 192 includes a mounting section 390, and a die holder 392 that is formed with a channel 394 into which one or more tong dies 396 can be slid to mount the tong dies 396 to the die holder 392. One or more die spacers 398 are slide into the channel 394 at one or both ends thereof to help retain the position of the tong dies 396 on the die holder 392. A pin 400 extends through a hole 402 in the die holder 392 and into curved grooves 404 formed in end walls of the mounting section 390. End plates 406 are secured to the end walls of the mounting section 390 and retain the pin 400 in the hole 402 and in the grooves 404.

In the embodiment in FIGS. 34A-B, the die holder 392 is self-adjusting to ensure optimal grip of the tong die(s) 394 on the pipe surface.

Figure 35:
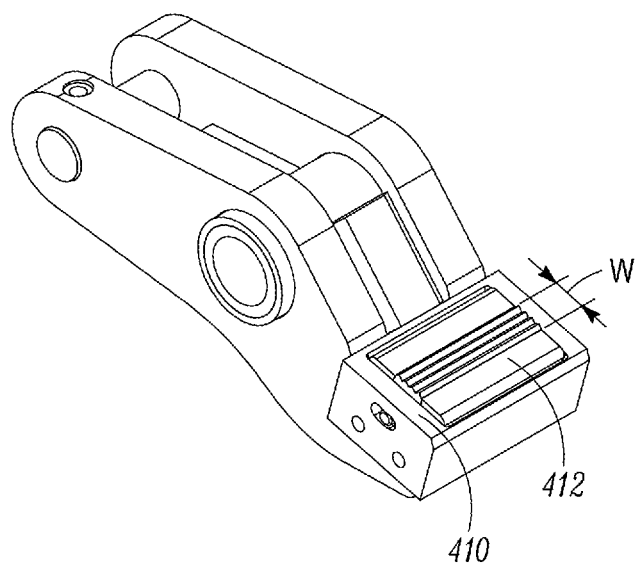
FIG. 35 illustrates another embodiment of an arm assembly that can be used in either or both of the make/break vise and the stationary vise.

FIG. 35 illustrates another embodiment where elements similar to those in FIGS. 28A-C are referenced using the same reference numbers. In this embodiment, a tong die 410 is mounted on a self-adjusting or fixed die holder 412. The die holder 412 can be any of the previously described die holders. The tong die 410 is narrower than the previously described tong dies in the sense that the width W of the serrations is narrower than the previously described dies so the tong die 410 contacts less of the pipe surface area.

Figure 36A:
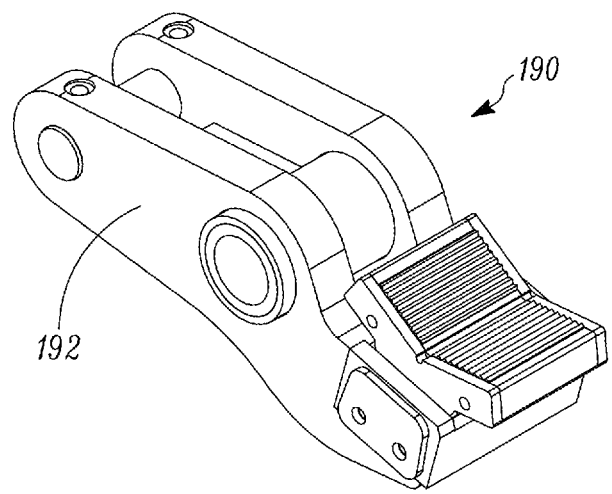
FIGS. 36A and 36B illustrate another embodiment of an arm assembly that can be used in either or both of the make/break vise and the stationary vise.
Figure 36B:
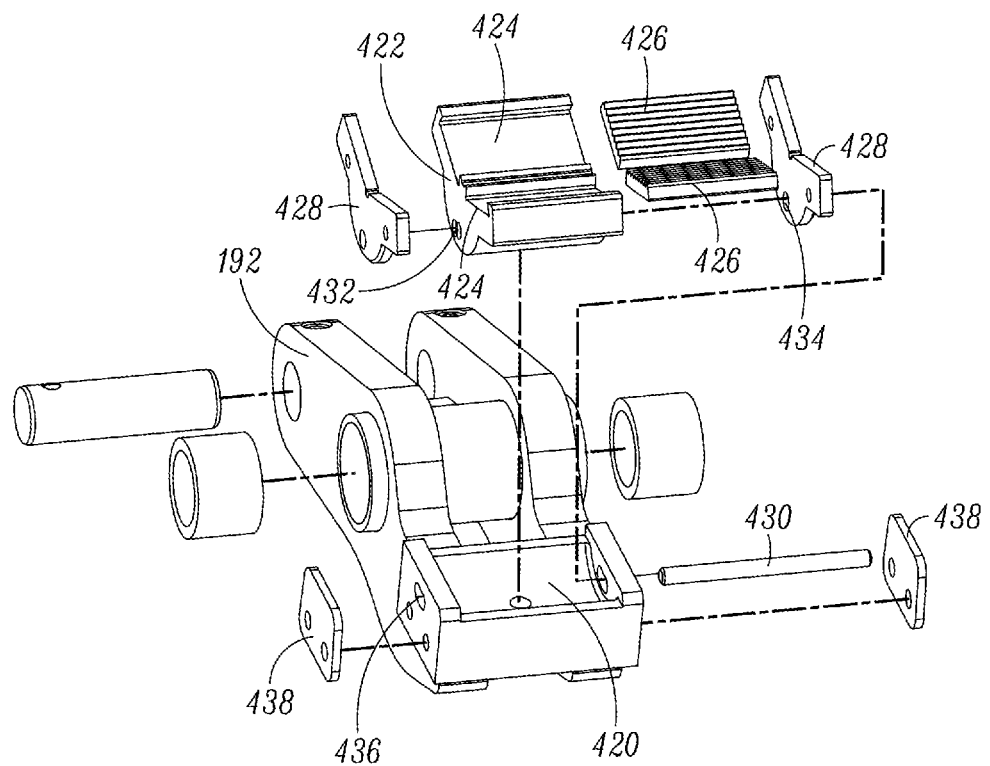

FIGS. 36A-B illustrate another embodiment where elements similar to those in FIGS. 28A-C are referenced using the same reference numbers. The arm 192 includes a mounting section 420, and a die holder 422 that is formed with a pair of channels 424 into which tong dies 426 can be slid to mount the tong dies 426 to the die holder 422. End plates 428 are secured to the ends of the die holder 422 to lock the tong dies 426 into the channels 424. In addition, a pin 430 extends through a hole 432 in the die holder 422, through holes 434 in the end plates 428 and into curved grooves 436 formed in end walls of the mounting section 420. End plates 438 are secured to the end walls of the mounting section 420 and retain the pin 430 in the holes 432, 434 and in the grooves 436.

In the embodiment in FIGS. 36A-B, the die holder 422 is self-adjusting to ensure optimal grip of the tong dies 426 on the pipe surface.

Figure 37A:
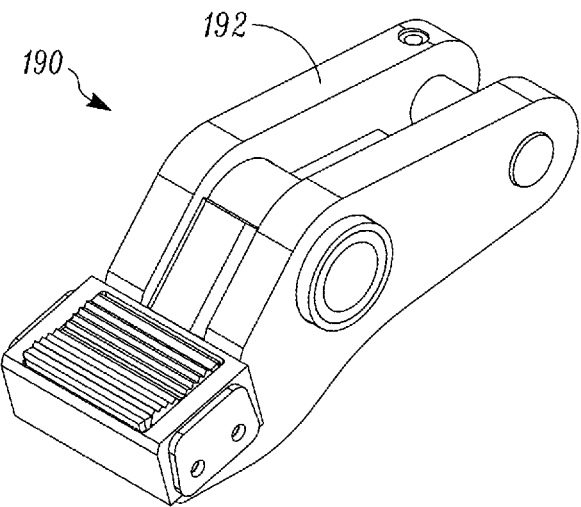
FIGS. 37A and 37B illustrate another embodiment of an arm assembly that can be used in either or both of the make/break vise and the stationary vise.
Figure 37B:
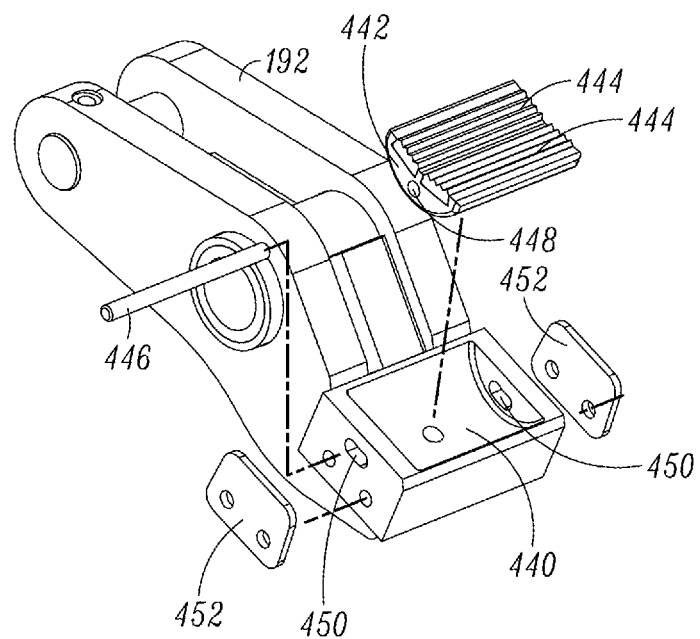

FIGS. 37A-B illustrate another embodiment where elements similar to those in FIGS. 28A-C are referenced using the same reference numbers. The arm 192 includes a mounting section 440, and a die holder 442 that is formed with a pair of channels into which tong dies 444 can be slid to mount the tong dies 444 to the die holder 442 so that the tong dies are angled toward each other. A pin 446 extends through a hole 448 in the die holder 442 and into curved grooves 450 formed in end walls of the mounting section 440. End plates 452 are secured to the end walls of the mounting section 440 and retain the pin 446 in the hole 448 and in the grooves 450. In this embodiment, the die holder 442 is self-adjusting to ensure optimal grip of the tong dies 444 on the pipe surface.

Figure 38:
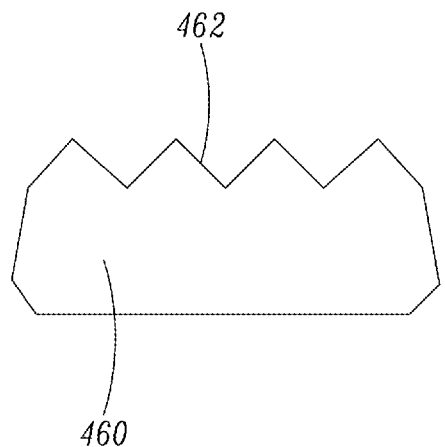
FIG. 38 illustrates an embodiment of a die that can be used on any one of the vise block assemblies or arm assemblies in FIGS. 25-37.

FIG. 38 is a close-up, detailed view of a tong die 460 that can be used on any one of the vise block assemblies or arm assemblies in FIGS. 25-37. The tong die 460 includes a pipe facing surface that is provided with gripping enhancement features. For example, the pipe facing surface can include a plurality of serrations 462. However, other gripping enhancement features can be used, such as knurls or the like.

Figure 39:
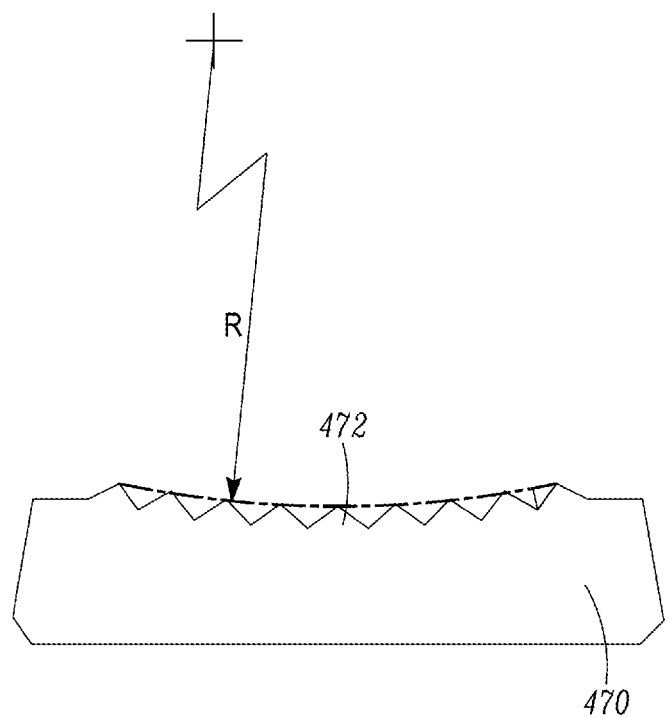
FIG. 39 illustrates another embodiment of a die that can be used on any one of the vise block assemblies or arm assemblies in FIGS. 25-37.

FIG. 39 is a close-up, detailed view of another embodiment of a tong die 470 that can be used on any one of the vise block assemblies or arm assemblies in FIGS. 25-37. The tong die 470 includes a pipe facing surface that is concave or inwardly curved so that it has a radius R. The pipe facing surface can also include a plurality of serrations 472, knurls or other gripping enhancement features.

Figure 41A:
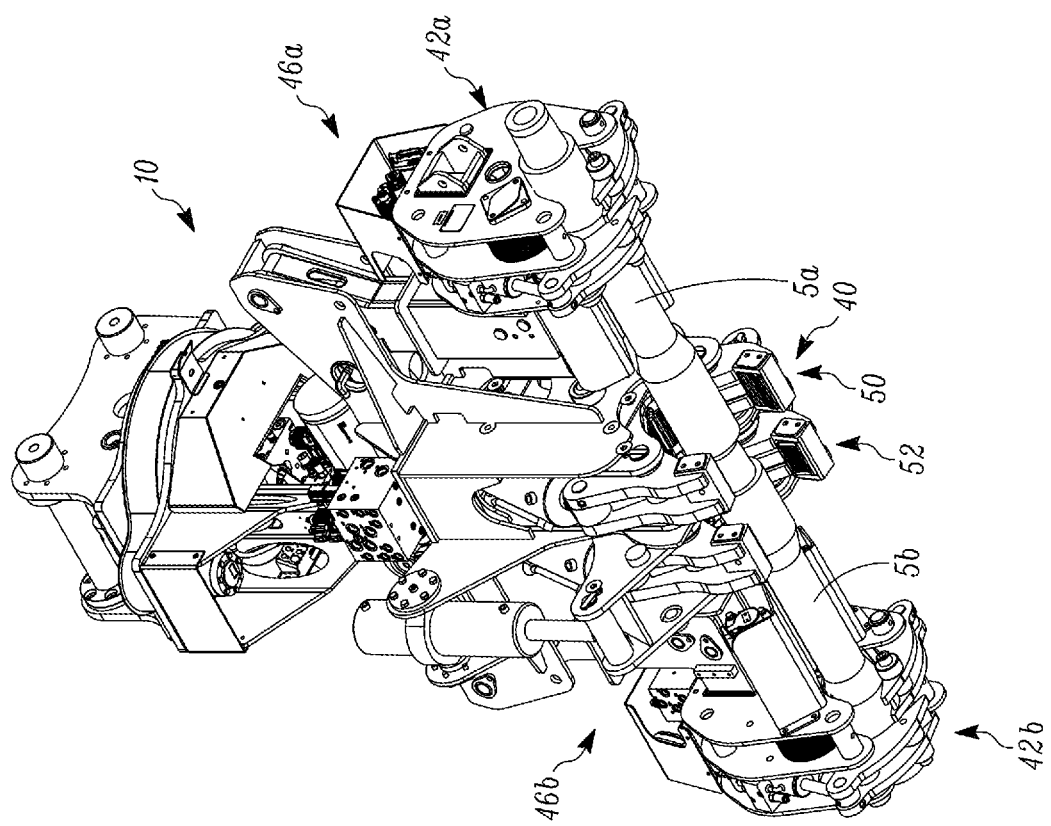
FIGS. 41A, 41B and 41C illustrate the pipe handling attachment described herein lifting the pipe up into the arms of the make/break vise and the stationary vise.
Figure 41B:
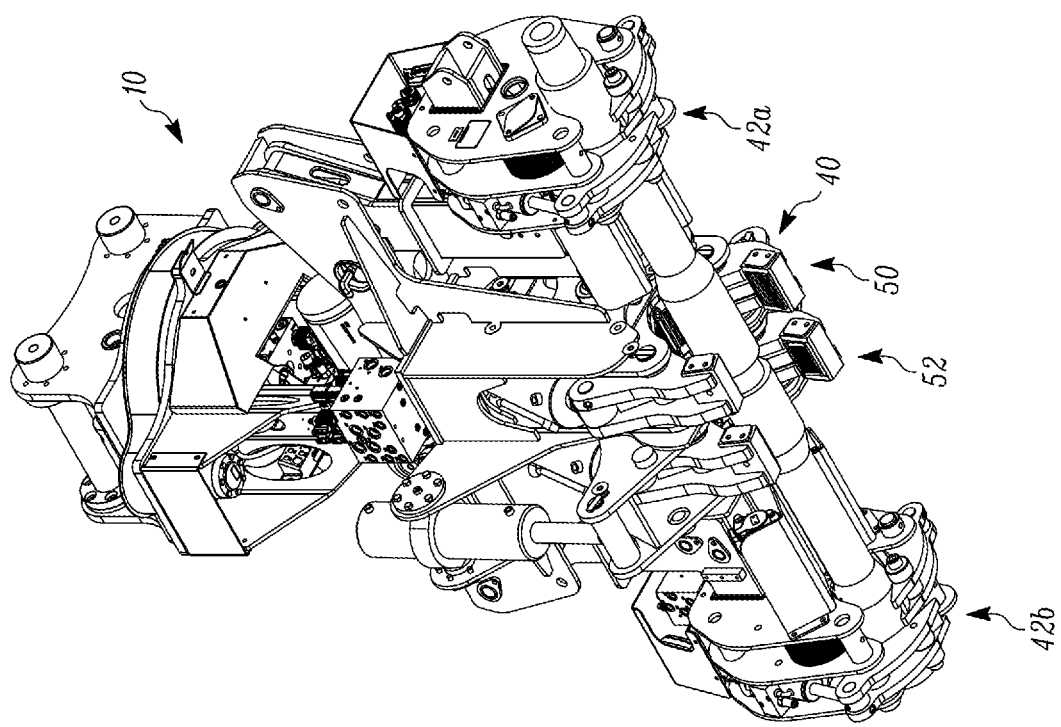
Figure 41C:
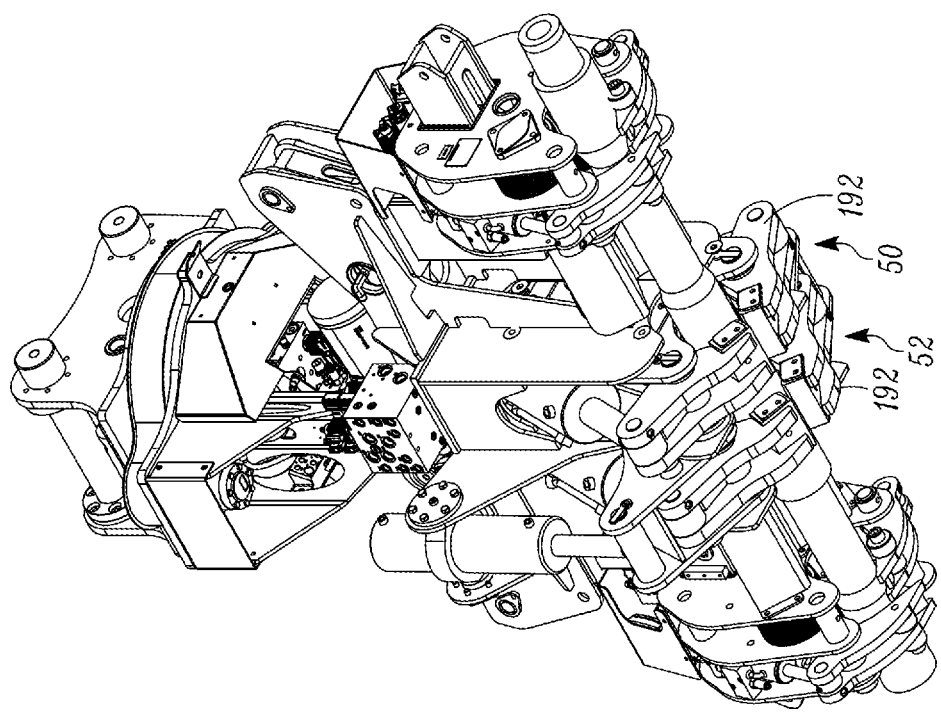

With reference to FIGS. 41A-C, another embodiment of using the attachment 10 is illustrated. A similar method can be implemented using the attachment 500 described in FIG. 40. In this embodiment, the attachment 10 is used to lift the pipe sections 5a, 5b and pull the pipe sections upwardly into the stationary vise 50 and the make/break vise 52 in order to torque the joint or initiate breaking of the joint using the vise assembly 40.

FIG. 41A shows the gull-beam assemblies 46a, 46 in their lowered positions and the lower gull-beam 62 thereof lowered in the y-direction. This positions the pipe roller gripping assemblies 42a, 42b to be able to be disposed around the pipe sections when the grab arms 94, 96 thereof are opened as shown in FIG. 17B. Once the pipe roller gripping assemblies 42a, 42b with the open grab arms are properly positioned relative to the pipe sections, the grab arms 94, 96 can then be closed as shown in FIG. 41A to grip the pipe sections. At the position shown in FIG. 41A, the pipe sections may be partially or fully outside of the vise assembly 40 so that the pipe sections cannot be gripped by the stationary vise 50 and the make/break vise 52.

FIG. 41B illustrates a position where the lower gull-beam 62 of one or both of the gull-beam assemblies 46a, 46 is raised upward in the y-direction using the actuator 64 described above for FIGS. 15A-B. Because the pipe roller gripping assemblies 42a, 42b are mounted on the lower gull-beams 62, the pipe roller gripping assemblies 42a, 42b are lifted upward in the y-direction. In addition, since the pipe sections are held by the pipe roller gripping assemblies 42a, 42b, the pipe sections are also lifted upward in the y-direction until, as shown in FIG. 41B, the joint between the pipe sections is disposed within the vise assembly 40.

Once the pipe sections are raised upward to the position shown in FIG. 41B, the grab arms 192 of the stationary vise 50 and the make/break vise 52 can then be closed around the respective tool joints of the pipe sections (as illustrated in FIG. 41C) so as to grip the pipe and torque the joint or initiate break-out using the stationary vise 50 and the make/break vise 52 as described above.

The attachments described herein can be used to break-out or make-up pipe of various diameters including, but not limited to, 4.5 inch to 8.5 inch diameter pipe. Also, the make/break vise of the attachments can be designed to operate with various torque values including, but not limited to, 30,000-60,000 lbs. of torque.

Any of the actuators described herein can be configured as hydraulic, pneumatic, electrical and/or mechanical actuators. In addition, any of the drive motors described herein can be configured as electric, hydraulic, or pneumatic motors.

Any of the attachments described herein can be used in any combination with any of the gull-beam assemblies, pipe roller gripping assemblies, vise block assemblies and arm assemblies described herein. In addition, any of the gull-beam assemblies, pipe roller gripping assemblies, vise block assemblies and arm assemblies described herein can be used individually in other attachments.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A pipe handling attachment configured for attachment to a prime mover, comprising:
   a head assembly that is configured to be attached to an arm of the prime mover;
   a main beam assembly pivotally mounted to the head assembly so that the main beam assembly is pivotable about a first pivot axis;
   at least one tilt actuator connected to the head assembly and to the main beam assembly to pivot the main beam assembly about the first pivot axis,
   a vise assembly mounted on the main beam assembly, the vise assembly includes a stationary vise and a make/break vise that is rotatable relative to the stationary vise;
   at least one pipe roller gripping assembly pivotally mounted on the main beam assembly, the at least one pipe roller gripping assembly is configured to grip a pipe and rotate a pipe gripped thereby about a longitudinal axis of the pipe;
   the at least one pipe roller gripping assembly is pivotally movable relative to the vise assembly and the main beam assembly between a lowered position and a raised position;
   at the lowered position the at least one pipe roller gripping assembly is disposed adjacent to a side of the vise assembly, and at the raised position the at least one pipe roller gripping assembly is further away from the vise assembly compared to when the at least one pipe roller gripping assembly is at the lowered position.

2. The pipe handling attachment of claim 1, wherein the at least one pipe roller gripping assembly is pivotable relative to the main beam assembly between the lowered position and the raised position about a second pivot axis, and the second pivot axis is parallel to the first pivot axis.

3. The pipe handling attachment of claim 2, comprising a pivot actuator that can extend and retract is connected at a first end thereof to the main beam assembly and connected at a second end thereof to the at least one pipe roller gripping assembly for pivoting the at least one pipe roller gripping assembly between the lowered position and the raised position, and the first end of the pivot actuator is disposed within the main beam assembly.

4. The pipe handling attachment of claim 3, comprising a gull-beam assembly that is pivotally attached to the main beam assembly so that the gull-beam assembly is pivotable about the second pivot axes, the at least one pipe roller gripping assembly is mounted on the gull-beam assembly, and the second end of the pivot actuator is connected to the gull-beam assembly.

5. A pipe handling attachment configured for attachment to a prime mover, comprising:
   an upper head assembly that is configured to be attached to an arm of the prime mover;
   a lower head assembly rotationally attached to the upper head assembly to permit the lower head assembly to rotate relative to the upper head assembly about a rotation axis;
   a main beam assembly pivotally mounted to the lower head assembly so that the main beam assembly is pivotable about a first pivot axis;
   at least one tilt actuator connected to the lower head assembly and to the main beam assembly to pivot the main beam assembly about the first pivot axis;
   a vise assembly mounted on the main beam assembly, the vise assembly includes a stationary vise and a make/break vise that is rotatable relative to the stationary vise;
   at least one gull-beam assembly that is pivotally mounted to the main beam assembly for pivoting movement downward and upward relative to the main beam assembly between a lowered position and a raised position about a second pivot axis which is parallel to the first pivot axis;
   a pivot actuator connected to the main beam assembly and connected to the at least one gull-beam assembly for pivoting the at least one gull-beam assembly about the second pivot axis; and
   a pipe roller gripping assembly mounted on the at least one gull-beam assembly, wherein at the lowered position of the at least one gull-beam assembly the pipe roller gripping assembly is positioned closer to the vise assembly compared to at the raised position of the at least one gull-beam assembly.

6. The pipe handling attachment of claim 5, comprising at least two of the gull-beam assemblies; each gull-beam assembly includes an upper gull-beam that is pivotally mounted to the main beam assembly and that has a longitudinal axis, and a lower gull-beam that is disposed in telescoping relation with the upper gull-beam and that is movable relative to the upper gull-beam in a direction parallel to the longitudinal axis; and one of the pipe roller gripping assemblies is mounted on each of the lower gull-beams.

7. The pipe handling attachment of claim 6, wherein each lower gull-beam includes a beam section that extends generally perpendicular to the longitudinal axis of the upper gull-beam, each pipe roller gripping assembly is mounted on the respective beam section, and each pipe roller gripping assembly is movable relative to the respective beam section in a direction generally parallel to the respective beam section.

8. The pipe handling attachment of claim 5, wherein the pipe roller gripping assembly includes:

a gripping mechanism that is configured to grip a pipe, and a drive mechanism that is configured to engage an outer surface of a pipe that is gripped by the gripping mechanism and rotate the pipe about a longitudinal axis of the pipe.

9. The pipe handling attachment of claim 8, wherein the drive mechanism of the pipe roller gripping assembly comprises an endless drive member that is positioned to engage the outer surface of the pipe.

10. A pipe handling attachment configured for attachment to a prime mover, comprising:

a head assembly that is configured to be attached to an arm of the prime mover;

a support assembly pivotally mounted to the head assembly so that the support assembly is pivotable about a first pivot axis;

at least one tilt actuator connected to the head assembly and to the support assembly to pivot the support assembly about the first pivot axis, a vise assembly mounted on the support assembly, the vise assembly includes a clamping vise and a make/break vise that is rotatable relative to the clamping vise;

a pipe roller gripping assembly mounted on the support assembly, the pipe roller gripping assembly is configured to grip a pipe and rotate a pipe gripped by the pipe roller gripping assembly about a longitudinal axis of the pipe; and the pipe roller gripping assembly is movable relative to the vise assembly and the support assembly between a lowered position and a raised position, at the lowered position the pipe roller gripping assembly is disposed adjacent to a side of the vise assembly, and at the raised position the at least one pipe roller gripping assembly is spaced axially outward from an end of the support assembly.

11. The pipe handling attachment of claim 10, wherein the pipe roller gripping assembly is pivotally mounted on the support assembly so that the pipe roller gripping assembly is pivotable relative to the support assembly between the lowered position and the raised position about a second pivot axis which is parallel to the first pivot axis.

12. The pipe handling attachment of claim 11, further comprising a pivot actuator that can extend and retract connected to the support assembly and connected to the pipe roller gripping assembly for pivoting the pipe roller gripping assembly between the lowered position and the raised position.

13. The pipe handling attachment of claim 12, comprising a gull-beam assembly that is pivotally attached to the support assembly so that the gull-beam assembly is pivotable about the second pivot axis, the pipe roller gripping assembly is mounted on the gull-beam assembly, and the pivot actuator is connected to the support assembly and connected to the gull-beam assembly.

14. The pipe handling attachment of claim 5, wherein the pivot actuator can extend and retract.

\* \* \* \* \*